US008635923B2

(12) United States Patent
Misu et al.

(10) Patent No.: US 8,635,923 B2
(45) Date of Patent: Jan. 28, 2014

(54) VEHICLE DRIVE SYSTEM

(75) Inventors: Takahiro Misu, Nagoya (JP); Kyosuke Mori, Kariya (JP); Wataru Hagimoto, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/483,740

(22) Filed: May 30, 2012

(65) Prior Publication Data

US 2012/0304789 A1 Dec. 6, 2012

(30) Foreign Application Priority Data

May 30, 2011 (JP) .................. 2011-120015
May 30, 2011 (JP) .................. 2011-120016
May 30, 2011 (JP) .................. 2011-120017

(51) Int. Cl.
*F16H 3/08* (2006.01)
(52) U.S. Cl.
USPC .............................. 74/325; 74/329
(58) Field of Classification Search
USPC ........................... 74/325, 329, 331
See application file for complete search history.

(56) References Cited

U.S. PATENT DOCUMENTS

| 2002/0040818 | A1* | 4/2002 | Maruyama ............. 180/65.2 |
| 2008/0282824 | A1 | 11/2008 | Van Druten et al. |
| 2010/0311540 | A1 | 12/2010 | Hellenbroich |
| 2011/0239819 | A1 | 10/2011 | Shibahata |

FOREIGN PATENT DOCUMENTS

| JP | 2002-340112 A | 11/2002 | |
| JP | 2003237393 A * | 8/2003 | ............. B60K 17/04 |
| JP | 2004-034727 A | 2/2004 | |
| JP | 2004034727 A * | 2/2004 | ............. B60K 17/02 |
| JP | 2009-107626 A | 5/2009 | |
| JP | 2011-235748 A | 11/2011 | |
| WO | WO 2007/011212 A1 | 1/2007 | |
| WO | 2008 138387 A1 | 11/2008 | |
| WO | 2010 070706 A1 | 6/2010 | |

OTHER PUBLICATIONS

Extended European Search Report dated Dec. 11, 2012, issued by the European Patent Office in corresponding European Patent Application No. 12170005.8-2421/ 2530356. (13 pages).
Partial European Search Report dated Sep. 12, 2012, issued in corresponding European Patent Application No. 12170005.8-2421. (6 pages).

* cited by examiner

*Primary Examiner* — Ha D Ho
(74) *Attorney, Agent, or Firm* — Buchanan Ingersoll & Rooney PC

(57) ABSTRACT

A vehicle drive system includes an input shaft to which a driving force of a first driving source is inputted, a first shaft idly rotating relative to the input shaft and being connectable with the input shaft, the first shaft being provided with a plurality of drive gears, a single drive gear idly rotating relative to the input shaft and being connectable with the input shaft, a second shaft arranged parallel to the input shaft and being provided with a first idler gear and a second idler gear, an output shaft arranged parallel to the input shaft and outputting the driving force to a wheel, and a plurality of driven gears idly rotating relative to the output shaft and being connectable with the output shaft, the plurality of driven gears engaging with the plurality of drive gears, respectively.

8 Claims, 49 Drawing Sheets

FIG. 3

| Pattern | Clutch | First connecting-disconnecting mechanism | | Second connecting-disconnecting mechanism | | Third connecting-disconnecting mechanism | Reverse idler gear | Mode |
|---|---|---|---|---|---|---|---|---|
| | | F | R | F | R | | | |
| (1) | × | × | × | × | × | × | × | Neutral |
| (2) | ○ | × | ○ | ○ | × | × | × | 1st speed |
| (3) | ○ | ○ | × | ○ | × | × | × | 2nd speed |
| (4) | ○ | × | ○ | × | ○ | × | × | 2.5th speed |
| (5) | ○ | × | ○ | × | × | ○ | × | 3rd speed |
| (6) | ○ | ○ | × | × | ○ | × | × | 4th speed |
| (7) | ○ | ○ | × | × | × | ○ | × | 5th speed |

"○" indicates engaged and/or connected states.
"×" indicates disengaged and/or disconnected states.

FIG. 14

| Pattern | Clutch | First connecting-disconnecting mechanism | | Second connecting-disconnecting mechanism | | Third connecting-disconnecting mechanism | Reverse idler gear | Mode |
| --- | --- | --- | --- | --- | --- | --- | --- | --- |
| | | F | R | F | R | | | |
| (1) | × | × | × | × | × | × | × | Neutral |
| (2) | ○ | ○ | × | × | × | × | × | Stop (start/power generation) mode |
| (3) | × | × | × | ○ | × | × | × | 1st speed EV driving |
| (4) | × | × | × | × | ○ | × | × | 2nd speed EV driving |
| (5) | × | × | ○ | × | × | ○ | × | 3rd speed EV driving |
| (6) | ○ | ○ | × | ○ | × | × | × | 1st speed HV driving |
| (7) | ○ | × | ○ | ○ | × | × | × | 2nd speed HV driving |
| (8) | ○ | × | ○ | × | ○ | × | × | 2.5th speed HV driving |
| (9) | ○ | × | × | × | × | ○ | × | 3rd speed HV driving |
| (10) | ○ | ○ | × | × | ○ | × | × | 4th speed HV driving |
| (11) | ○ | ○ | × | × | × | ○ | × | 5th speed HV driving |

"○" indicates engaged and/or connected states.
"×" indicates disengaged and/or disconnected states.

FIG. 32

| Pattern | Clutch | Main connecting-disconnecting mechanism | 1st mechanism for 1st gear train F | 1st mechanism for 1st gear train R | 1st mechanism for 2nd gear train F | 1st mechanism for 2nd gear train R | 2nd mechanism for 1st gear train | Reverse idler gear | Mode |
|---|---|---|---|---|---|---|---|---|---|
| (1) | × | × | × | × | × | × | × | × | Neutral |
| (2) | ○ | ○ | ○ | × | × | × | × | × | Stop (start/power generation) mode |
| (3) | × | × | × | × | ○ | × | × | × | 1st speed EV driving |
| (4) | × | × | × | × | × | ○ | × | × | 2nd speed EV driving |
| (5) | ○ | ○ | × | ○ | ○ | × | × | × | 1st speed HV driving |
| (6) | ○ | ○ | ○ | × | × | ○ | × | × | 2nd speed HV driving |
| (7) | ○ | ○ | × | ○ | × | ○ | × | × | 2.5th speed HV driving |
| (8) | ○ | × | × | × | ○ | × | ○ | × | 3rd speed HV driving |
| (8)' | ○ | ○ | ○ | × | × | ○ | ○ | × | Pre-3rd HV driving |
| (9) | ○ | ○ | ○ | × | × | × | × | × | 4th speed HV driving |
| (10) | ○ | × | × | × | × | ○ | ○ | × | 5th speed HV driving |
| (10)' | ○ | ○ | ○ | × | ○ | × | ○ | × | Pre-5th HV driving |

"○" indicates engaged and/or connected states.
"×" indicates disengaged and/or disconnected states.

VEHICLE DRIVE SYSTEM

CROSS REFERENCE TO RELATED APPLICATIONS

This application is based on and claims priority under 35 U.S.C. §119 to Japanese Patent Applications 2011-120017, 2011-120015, and 2011-120016, filed on May 30, 2011, the entire contents of which are incorporated herein by reference.

TECHNICAL FIELD

This disclosure generally relates to a vehicle drive system for driving a vehicle.

BACKGROUND DISCUSSION

A known vehicle drive system is configured to input rotations of an engine via a clutch to a transmission to allow the transmission to convert the rotations inputted to the transmission; therefore, the rotations converted by the transmission is outputted therefrom to drive a vehicle. Generally, a multiple-speed transmission having two parallel shafts is applied as the transmission of the known vehicle drive system. The two parallel shafts of the multiple-speed transmission correspond to input and output shafts. Multiple drive gears having a different number of gear teeth from one another are axially arranged at the input shaft of the multiple-speed transmission. Multiple driven gears engaging with the drive gears, respectively, are axially arranged at the output shaft of the multiple-speed transmission. Thus, the multiple-speed transmission having the two parallel shafts is configured to establish multiple gear stages by the selection of the drive gear and the driven gear. In those circumstances, for example, in a case where the transmission having the two parallel shafts is applied alone in the vehicle drive system and the number of gear stages to be established is increased, the number of drive gears and driven gears axially arranged at the parallel shafts increases, thus increasing an axial length of a housing of the transmission. For example, in a known vehicle drive system disclosed in WO2007/011212A (which will be hereinafter referred to as Reference 1), in order to restrain an increase of an axial length of a housing of a transmission (a gearbox) having two parallel shafts, a single planetary gear is arranged between a clutch and the transmission. Consequently, according to the vehicle drive system of Reference 1, a multiple-speed transmission establishing a multiple number of gear stages by use of the planetary gear arranged between the clutch and the transmission, and reducing the axial length of the housing is attained.

However, according to the vehicle drive system disclosed in Reference 1, a dry brake is included in a ring gear of the planetary gear; therefore, the vehicle drive system has a complex configuration. In addition, costs of the vehicle drive system and the weight of the vehicle drive system may increase. Moreover, energy loss due to a brake drag may be caused.

A need thus exists for a vehicle drive system which is not susceptible to the drawbacks mentioned above.

SUMMARY

According to an aspect of this disclosure, a vehicle drive system includes an input shaft to which a driving force of a first driving source is inputted, a first shaft arranged coaxially with the input shaft to idly rotate relative to the input shaft and being connectable with the input shaft, the first shaft being provided with a plurality of drive gears having a different number of gear teeth from one another, a single drive gear arranged coaxially with the input shaft to idly rotate relative to the input shaft and being connectable with the input shaft, a second shaft arranged parallel to the input shaft and being provided with a first idler gear and a second idler gear that have a different number of gear teeth from each other, the first idler gear engaging with a predetermined drive gear of the plurality of drive gears, the second idler gear engaging with the single drive gear, an output shaft arranged parallel to the input shaft and outputting the driving force to a wheel, and a plurality of driven gears arranged coaxially with the output shaft to idly rotate relative to the output shaft and being connectable with the output shaft, the plurality of driven gears engaging with the plurality of drive gears, respectively.

According to another aspect of the disclosure, a vehicle drive system includes a first gear train for transmitting a driving force outputted from a first drive source as a torque to an output shaft, the first gear train establishing a plurality of shift stages, a second gear train for transmitting a driving force outputted from a second drive source as a torque to the output shaft, the second gear train establishing a plurality of shift stages, and a main connecting-disconnecting mechanism connecting and disconnecting a predetermined rotational element provided at the first gear train and a predetermined rotational element provided at the second gear train.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a chart schematically showing modes of the vehicle drive system according to the first embodiment disclosed here;

FIG. 14 is a chart schematically showing modes of the vehicle drive system according to the third embodiment disclosed here;

FIG. 32 is a chart schematically showing drive modes of the vehicle drive system according to the ninth embodiment disclosed here;

DETAILED DESCRIPTION

Figure 1:
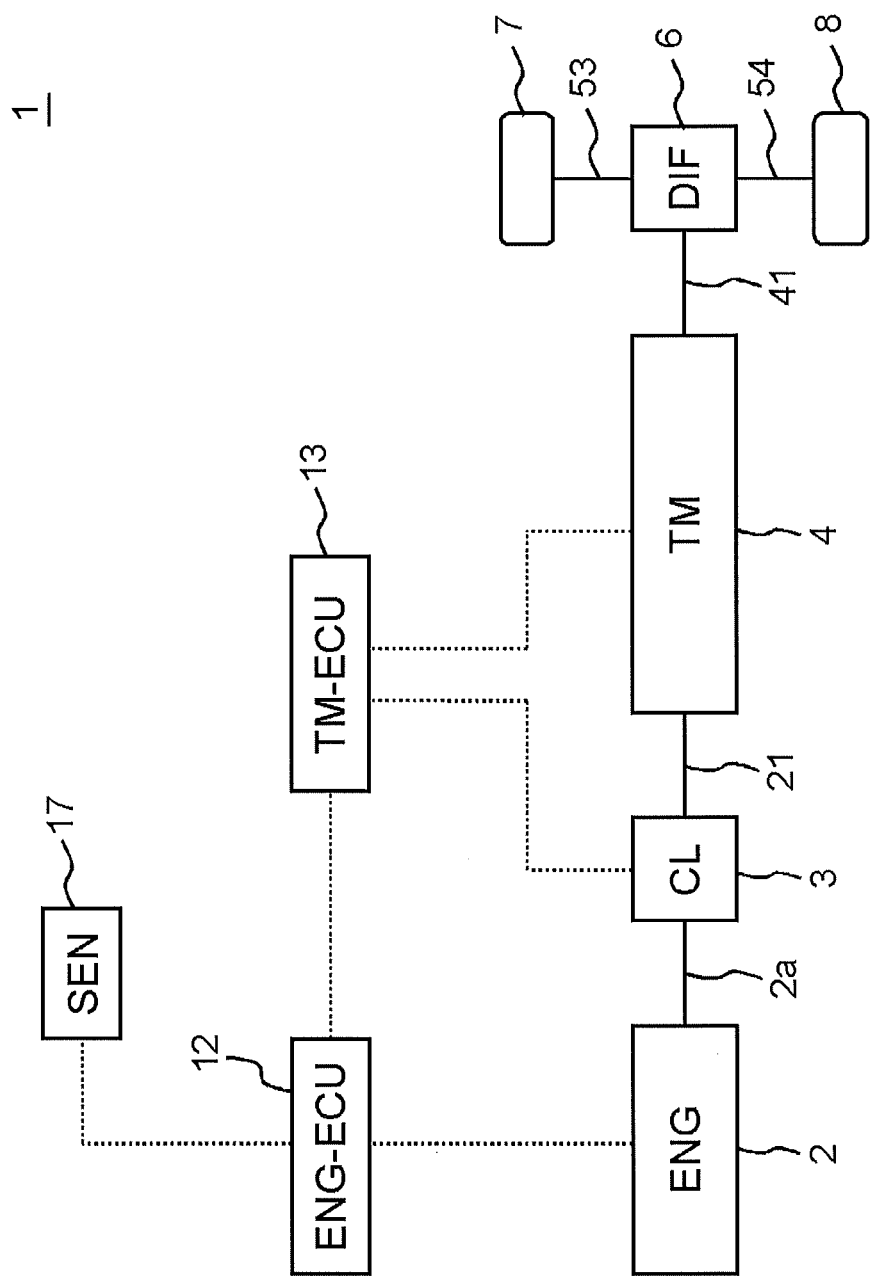
FIG. 1 is a block diagram schematically illustrating a configuration of a vehicle drive system according to a first embodiment disclosed here.

Reference numbers are applied to the attached drawings of this disclosure in order to allow technical features of the disclosure to be easily understood and the reference numbers are not intended to limit the disclosure to examples illustrated in the drawings.

A vehicle drive system 1 according to a first embodiment of the disclosure will be explained as follows with reference to the attached drawings.

As illustrated in FIG. 1, the vehicle drive system 1 is a drive system driving a vehicle including an engine 2 serving as a first driving source (the first driving source may be a motor). The engine 2 outputs a driving force (torque) by energy of combustion of fuel. The vehicle drive system 1 includes a clutch 3, a transmission 4, and a differential mechanism 6 on a power transmitting path between the engine 2 and wheels 7 and 8. The vehicle drive system 1 includes an engine control device 12, a transmission control device 13, and a sensor 17 that function as control systems controlling the engine 2, the transmission 4, and the differential mechanism 6.

Figure 2:
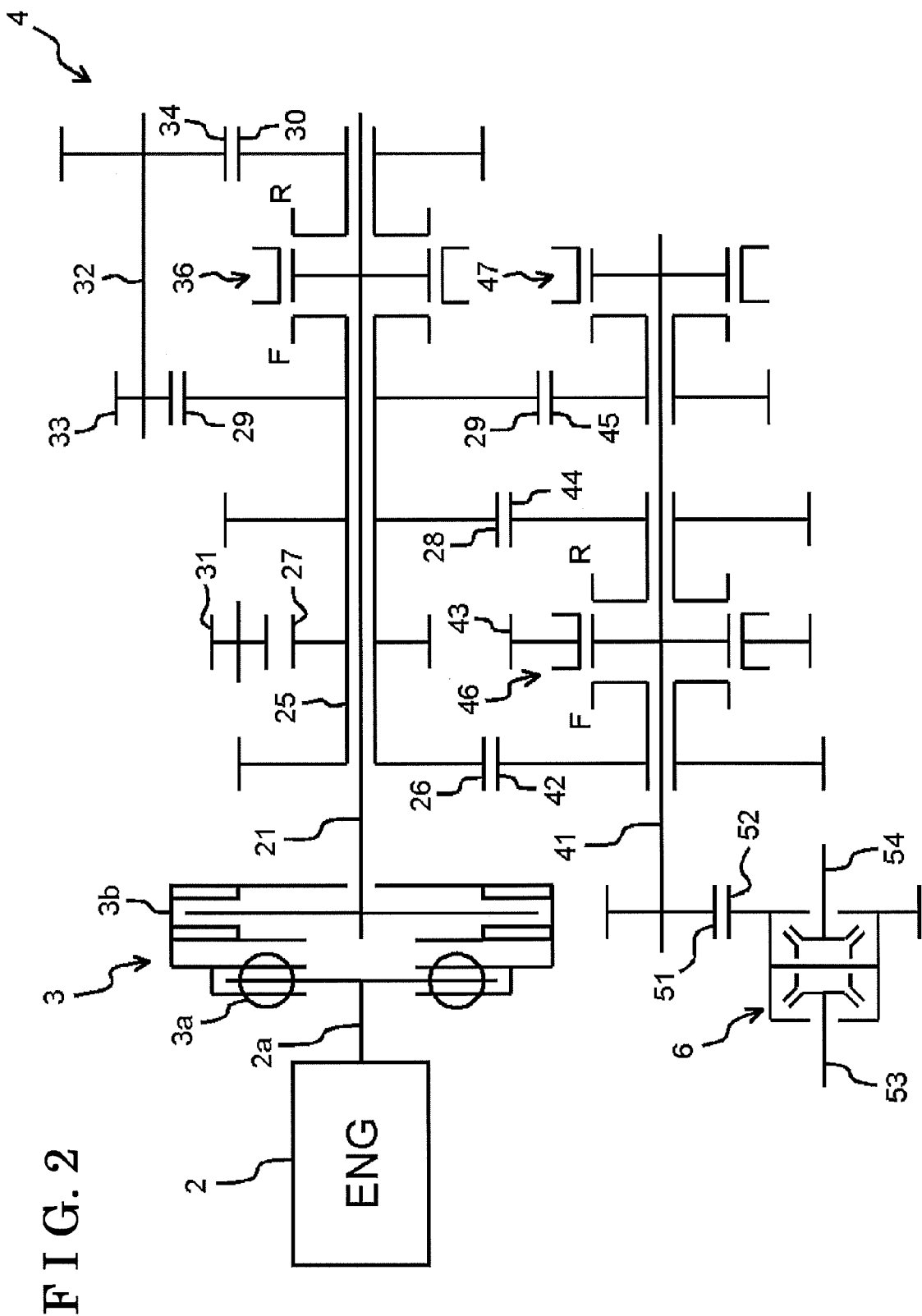
FIG. 2 is a schematic view illustrating a configuration of a power transmitting path of the vehicle drive system according to the first embodiment disclosed here.

The engine 2 is, for example, an internal combustion engine outputting the driving force (torque) via a crankshaft 2a by the energy of combustion of the fuel, for example, hydrocarbon fuel such as gasoline and diesel oil (light oil) (see FIGS. 1 and 2). The driving force of the engine 2 is transmitted from the crankshaft 2a to an input-side member of the clutch 3. The engine 2 includes various sensors (for example, an engine rotation sensor) and actuators (for example, actuators driving an injector and a throttle valve). The engine 2 is connected to the engine control device 12 so as to communicate therewith and is controlled thereby.

The clutch 3 is arranged on the power transmitting path between the engine 2 and the transmission 4. The clutch 3 is configured to connect and disconnect the engine 2 and the transmission 4 to/from each other so that the driving force (torque) is transmitted from the engine 2 to the transmission 4 (see FIGS. 1 and 2). The clutch 3 includes a damper portion 3a and a clutch portion 3b on the power transmitting path between the crankshaft 2a and an input shaft 21 of the transmission 4. The damper portion 3a absorbs a fluctuating torque, which is generated between the input-side member of the clutch 3 and an intermediate member of the clutch 3, by means of an elastic force. The input-side member of the clutch 3 integrally rotates with the crankshaft 2a. The intermediate member of the clutch 3 is connected to an output-side portion of the damper portion 3a and to an input-side portion of the clutch portion 3b. The intermediate member is engaged with an output-side member of the clutch 3; thereby, the driving force is transmitted from the intermediate member via the clutch portion 3b to the input shaft 21 of the transmission 4. The output-side member of the clutch portion 3 integrally rotates with the input shaft 21 of the transmission 4. Engaging and disengaging operations of the clutch 3 are conducted by a clutch actuator driven and controlled by the transmission control device 13.

The transmission 4 is a gear mechanism to convert rotations of the engine 2 to transmit the driving force (torque) from the engine 2 to the differential mechanism 6 (see FIGS. 1 and 2). The transmission 4 includes three parallel shafts of the input shaft 21, an output shaft 41 arranged substantially parallel to the input shaft 21, and a shaft 32 (serving as a second shaft) for first and second idler gears 33 and 34. The shaft 32 is arranged substantially parallel to the input shaft 21. The transmission 4 having the three parallel shafts is configured as a transmission with five forward gear stages. The transmission 4 includes the input shaft 21, a shaft 25 (serving as a first shaft), a first drive gear 26, a second drive gear 27 (serving as a fourth drive gear), a third drive gear 28 (serving as a second drive gear), a fourth drive gear 29 (serving as a third drive gear), a fifth drive gear 30 (serving as a single drive gear), a reverse idler gear 31, the shaft 32, the first idler gear 33, the second idler gear 34, a first connecting-disconnecting mechanism 36, the output shaft 41, a first driven gear 42, a second driven gear 43 (serving as a fourth driven gear), a third driven gear 44 (serving as a second driven gear), a fourth driven gear 45 (serving as a third driven gear), a second connecting-disconnecting mechanism 46, and a third connecting-disconnecting mechanism 47 on the power transmitting path between the input shaft 21 and the output shaft 41.

The input shaft 21 is a shaft to which the driving force is inputted from the engine 2. The input shaft 21 integrally rotates with the output-side member of the clutch 3 (see FIGS. 1 and 2). The first drive gear 26, the second drive gear 27, the third drive gear 28, the fourth drive gear 29, the first connecting-disconnecting mechanism 36, and the fifth drive gear 30 are arranged at an outer circumferential side of the input shaft 21 in the mentioned order from a side where the clutch 3 (the engine 2) is axially provided. The input shaft 21 is rotationally supported by a housing of the transmission 4. The shaft 25 having a cylindrical shape being hollow therein is supported by the input shaft 21 so as to idly rotate relative to the input shaft 21. The shaft 25 integrally rotates with the first drive gear 26, the second drive gear 27, the third drive gear 28, and the fourth drive gear 29. The fifth drive gear 30 is supported by the input shaft 21 so as to idly rotate relative to the input shaft 21. The input shaft 21 is configured to be selectively connected to the shaft 25 and the fifth drive gear 30 by means of the first connecting-disconnecting mechanism 36 arranged between the fourth drive gear 29 (the shaft 25) and the fifth drive gear 30.

The shaft 25 having the cylindrical shape is positioned coaxially with the input shaft 21 and is supported by the input shaft 21 so as to idly rotate relative to the input shaft 21 (see FIG. 2). The first drive gear 26, the second drive gear 27, the third drive gear 28, and the fourth drive gear 29 are arranged at the outer circumferential side of the shaft 25 in the mentioned order from the side where the clutch 3 (the engine 2) is axially provided. The shaft 25 integrally rotates with the first drive gear 26, the second drive gear 27, the third drive gear 28, and the fourth drive gear 29. The shaft 25 is configured to be selectively connected to the fourth drive gear 29 and the fifth drive gear 30 by means of the first connecting-disconnecting mechanism 36 arranged between the fourth drive gear 29 and the fifth drive gear 30.

The first drive gear 26 is a gear driving the first driven gear 42 (see FIG. 2). The first drive gear 26 integrally rotates via the shaft 25 with the second drive gear 27, the third drive gear 28, and the fourth drive gear 29. The first drive gear 26 is positioned coaxially with the input shaft 21 and is supported via the shaft 25 by the input shaft 21 so as to idly rotate relative to the input shaft 21. The first drive gear 26 engages with the first driven gear 42. A diameter of the first drive gear 26 is designed to be smaller than a diameter of the third drive gear 28.

When the second drive gear 27 is meshed with the reverse idler gear 31, the second drive gear 27 drives the second driven gear 43 via the reverse idler gear 31 (see FIG. 2). In a case where the vehicle is driven to move in a rearward direction thereof, the second drive gear 27 engages with the reverse idler gear 31. In a case where the vehicle is driven to move in directions other than the rearward direction, the second drive gear 27 does not engage with the reverse idler gear 31. The second drive gear 27 integrally rotates via the shaft 25 with the first drive gear 26, the third drive gear 28, and the fourth drive gear 29. The second drive gear 27 is positioned coaxially with the input shaft 21 and is supported via the shaft 25 by the input shaft 21 so as to idly rotate relative to the input shaft 21.

The third drive gear 28 is a gear driving the third driven gear 44 (see FIG. 2). The third drive gear 28 integrally rotates via the shaft 25 with the first drive gear 26, the second drive gear 27, and the fourth drive gear 29. The third drive gear 28 is positioned coaxially with the input shaft 21 and is supported via the shaft 25 by the input shaft 21 so as to idly rotate relative to the input shaft 21. The third drive gear 28 engages with the third driven gear 44. The diameter of the third drive gear 28 is designed to be larger than the diameter of the first drive gear 26. In addition, the diameter of the third drive gear 28 is designed to be smaller than a diameter of the fourth drive gear 29.

The fourth drive gear 29 is a gear driving the fourth driven gear 45 (see FIG. 2). The fourth drive gear 29 integrally rotates via the shaft 25 with the first drive gear 26, the second drive gear 27, and the third drive gear 28. The fourth drive gear 29 is positioned coaxially with the input shaft 21 and is supported via the shaft 25 by the input shaft 21 so as to idly rotate relative to the input shaft 21. The fourth drive gear 29 engages with the first idler gear 33 and the fourth driven gear 45. The diameter of the fourth drive gear 29 is designed to be larger than the diameter of the third drive gear 28 and larger than a diameter of the fifth drive gear 30.

The fifth drive gear 30 is a gear driving the second idler gear 34 (see FIG. 2). The fifth drive gear 30 is positioned coaxial with the input shaft 21 so as to idly rotate relative to the input shaft 21. The fifth drive gear 30 is configured to connect to the first input shaft 21 by means of the first connecting-disconnecting mechanism 36. The fifth drive gear 30 engages with the second idler gear 34. The diameter of the fifth drive gear 30 is designed to be smaller than the diameter of the fourth drive gear 29.

When the reverse idler gear 31 is meshed with the second drive gear 27 and the second driven gear 43, the reverse idler gear 31 drives the second driven gear 43 in accordance with the rotation of the second drive gear 27 (see FIG. 2). The reverse idler gear 31 is movable in an axial direction of the input shaft 21. In a case where the vehicle is driven to move in the rearward direction, the reverse idler gear 31 engages with the second drive gear 27 and the second driven gear 43. In a case where the vehicle is moved in the directions other than the rearward direction, the reverse idler gear 31 does not engage with the second drive gear 27 and the second driven gear 43 and idly rotates relative to the input shaft 21. The reverse idler gear 31 is rotationally supported by the housing of the transmission 4. The reverse idler gear 31 is moved in the axial direction by a gear shifting actuator. The gear shifting actuator is driven and controlled by the transmission control device 13.

The shaft 32 is arranged substantially parallel to the input shaft 21 in an area where the fourth drive gear 29 and the fifth drive gear 30 are arranged in the axial direction (see FIG. 2). The shaft 32 is rotationally supported by the housing of the transmission 4. The first idler gear 33 and the second idler gear 34 are arranged at an outer circumferential side of the shaft 32 in the mentioned order from the side where the clutch 3 (the engine 2) is axially provided. The shaft 32 integrally rotates with the first idler gear 33 and the second idler gear 34.

The first idler gear 33 is a gear driving the fourth drive gear 29 (see FIG. 2). The first idler gear 33 integrally rotates with the shaft 32 and the second idler gear 34. The first idler gear 33 is rotationally supported via the shaft 32 by the housing of the transmission 4. The first idler gear 33 engages with the fourth drive gear 29. A diameter of the first idler gear 33 is designed to be smaller than a diameter of the second idler gear 34.

The second idler gear 34 is a gear receiving the rotation of the fifth drive gear 30 (see FIG. 2). The second idler gear 34 integrally rotates with the shaft 32 and the first idler gear 33. The second idler gear 34 is rotationally supported via the shaft 32 by the housing of the transmission 4. The second idler gear 34 engages with the fifth drive gear 30. The diameter of the second idler gear 34 is designed to be larger than the diameter of the first idler gear 33.

The first connecting-disconnecting mechanism 36 is configured to select one of the shaft 25 and the fifth drive gear 30 to connect and disconnect the selected one of the shaft 25 and the fifth drive gear 30 to/from the input shaft 21 (see FIG. 2). The first connecting-disconnecting mechanism 36 is arranged between the fourth drive gear 29 (the shaft 25) and the fifth drive gear 30. The first connecting-disconnecting mechanism 36 moves a sleeve, which is splined to the input shaft 21, toward a front side (which will be hereinafter referred to as an F-side) of the first connecting-disconnecting mechanism 36; thereby, the sleeve is splined to the shaft 25. As a result, the input shaft 21 is connected to the shaft 25 so as to integrally rotate with the shaft 25. Meanwhile, the first connecting-disconnecting mechanism 36 moves the sleeve splined to the input shaft 21, toward a rear side (which will be hereinafter referred to as an R-side) of the first connecting-disconnecting mechanism 36; thereby, the sleeve is splined to the fifth drive gear 30. As a result, the input shaft 21 is connected to the fifth drive gear 30 so as to integrally rotate with the fifth drive gear 30. The connection and disconnection between the input shaft 21 and the shaft 25 or between the input shaft 21 and the fifth drive gear 30 are established by the first connecting-disconnecting mechanism 36 driven by the gear shifting actuator. The gear shifting actuator is driven and controlled by the transmission control device 13.

The output shaft 41 receives the driving force inputted from the engine 2 via the clutch 3 to the transmission 4 and outputs the driving force to the differential mechanism 6 (see FIGS. 1 and 2). The first driven gear 42, the second connecting-disconnecting mechanism 46 (including the second driven gear 43), the third driven gear 44, the fourth driven gear 45, and the third connecting-disconnecting mechanism 47 are arranged at an outer circumferential side of the output shaft 41 in the mentioned order from the side where the engine 2 is axially provided (from the left side of FIG. 2). The output shaft 41 is rotatably supported by the housing of the transmission 4. The first driven gear 42 is supported by the output shaft 41 so as to idly rotate relative to the output shaft 41. The output shaft 41 is configured to be selectively connected to the first driven gear 42 and the third driven gear 44 by means of the second connecting-disconnecting mechanism 46 arranged between the first driven gear 42 and the third driven gear 44. The output shaft 41 integrally rotates with the second driven gear 43 by means of the second connecting-disconnecting mechanism 46, the second driven gear 43 being attached to a sleeve splined to the output shaft 41. The third driven gear 44 is supported by the output shaft 41 so as to idly rotate relative to the output shaft 41. The fourth driven gear 45 is supported by the output shaft 41 so as to idly rotate relative to the output shaft 41. The output shaft 41 is configured to be connected to the fourth driven gear 45 by means of the third connecting-disconnecting mechanism 47. An output drive gear 51 is mounted to a first axial end portion of the output shaft 41 so as to be closer to the engine 2 than the first driven gear 42 (the output drive gear 51 is mounted to the output shaft 41 so as to be located at the left side in FIG. 2). The output shaft 41 integrally rotates with the output drive gear 51. Alternatively, the output drive gear 51 may be mounted to a second axial end portion of the output shaft 41 so as to be positioned in a side opposite to the side where the engine 2 is axially provided and so as to be further away from the engine 2 than the third connecting-disconnecting mechanism 47 (the output drive gear 51 may be mounted to the output shaft 41 so as to be located at the right side in FIG. 2).

The first driven gear 42 is a gear driven by the first drive gear 26 (see FIG. 2). The first driven gear 42 is positioned coaxially with the output shaft 41 and is supported by the output shaft 41 so as to idly rotate relative to the output shaft 41. The first driven gear 42 is configured to be connected to the output shaft 41 by means of the second connecting-disconnecting mechanism 46. The first driven gear 42 engages with the first drive gear 26. A diameter of the first driven gear 42 is designed to be larger than a diameter of the third driven gear 44.

When the second driven gear 43 is meshed with the reverse idler gear 31, the second driven gear 43 is driven by the second drive gear 27 via the reverse idler gear 31 (see FIG. 2). When the vehicle is driven to move in the rearward direction, the second driven gear 43 engages with the reverse idler gear 31. Meanwhile, when the vehicle is driven to move in the directions other than the rearward direction, the second driven gear 43 does not engage with the reverse idler gear 31. The second driven gear 43 is attached to the sleeve splined to the output shaft 41, by means of the second connecting-disconnecting mechanism 46. The second driven gear 43 integrally rotates with the sleeve and the output shaft 41.

The third driven gear 44 is a gear driven by the third drive gear 28 (FIG. 2). The third driven gear 44 is supported by the output shaft 41 so as to idly rotate relative to the output shaft 41. The third driven gear 44 is configured to be connected to the output shaft 41 by means of the second connecting-disconnecting mechanism 46. The third driven gear 44 engages with the third drive gear 28. The diameter of the third driven gear 44 is designed to be smaller than the diameter of the first driven gear 42. In addition, the diameter of the third driven gear 44 is designed to be larger than a diameter of the fourth driven gear 45.

The fourth driven gear 45 is a gear driven by the fourth drive gear 29 (see FIG. 2). The fourth driven gear 45 is supported by the output shaft 41 so as to idly rotate relative to the output shaft 41. The fourth driven gear 45 is configured to be connected to the output shaft 41 by means of the third connecting-disconnecting mechanism 47. The fourth driven gear 45 engages with the fourth drive gear 29. The diameter of the fourth driven gear 45 is designed to be smaller than the diameter of the third driven gear 44.

The second connecting-disconnecting mechanism 46 is configured to select one of the first driven gear 42 and the third driven gear 44 to connect and disconnect the selected one of the first driven gear 42 and the third driven gear 44 to/from the out put shaft 41 (see FIG. 2). The second connecting-disconnecting mechanism 46 is arranged between the first driven gear 42 and the third driven gear 44. The second connecting-disconnecting mechanism 46 moves the sleeve splined to the output shaft 41, toward a front side (which will be hereinafter referred to as an F-side) of the second connecting-disconnecting mechanism 46; thereby, the sleeve is splined to the first driven gear 42. As a result, the first driven gear 42 is connected to the output shaft 41 so as to integrally rotate therewith. The second connecting-disconnecting mechanism 46 moves the sleeve splined to the output shaft 41, toward a rear side (which will be hereinafter referred to as an R-side) of the second connecting-disconnecting mechanism 46; thereby, the sleeve is splined to the third driven gear 44. As a result, the third driven gear 44 is connected to the output shaft 41 so as to integrally rotate therewith. The second driven gear 43 is attached to the sleeve in the second connecting-disconnecting mechanism 46 so as to integrally rotate with the sleeve. The connection and disconnection between the output shaft 41 and the first driven gear 42 or between the output shaft 41 and the third driven gear 44 are established by the second connecting-disconnecting mechanism 46 driven by the gear shifting actuator. The gear shifting actuator is driven and controlled by the transmission control device 13.

The third connecting-disconnecting mechanism 47 is configured to connect and disconnect the fourth driven gear 45 to/from the output shaft 41 (see FIG. 2). A sleeve splined to the output shaft 41 is engaged with the fourth driven gear 45 by the third connecting-disconnecting mechanism 47. As a result, the fourth driven gear 45 is connected to the output shaft 41 so as to integrally rotate therewith. In addition, the sleeve splined to the output shaft 41 is released from the fourth driven gear 45 by the third connecting-disconnecting mechanism 47. As a result, the fourth driven gear 45 is disconnected from the output shaft 41 so as to rotate relative thereto. The connection and disconnection between the output shaft 41 and the fourth driven gear 45 are established by the third connecting-disconnecting mechanism 47 driven by the gear shifting actuator. The gear shifting actuator is driven and controlled by the transmission control device 13.

The differential mechanism 6 transmits the driving force inputted from the output shaft 41 of the transmission 4, to shafts 53 and 54 so that the shafts 53 and 54 rotate at different speeds (FIGS. 1 and 2). The differential mechanism 6 includes the output drive gear 51 integrally rotating with the output shaft 41 of the transmission 4. The differential mechanism 6 includes a ring gear 52 engaging with the output drive gear 51. The driving force inputted from the ring gear 52 is divided between the shafts 53 and 54 by the differential mechanism 6 so that the shafts 53 and 54 rotate at the different speeds. The shaft 53 integrally rotates with the wheel 7 and the shaft 54 integrally rotates with the wheel 8.

The engine control device 12 is a computer (an electric control unit) controlling the operation of the engine 2 (see FIG. 1). The engine control device 12 is connected to the sensor 17 formed by various sensors (for example, a vehicle speed sensor and a throttle position sensor), the various actuators (for example, the actuators driving the injector and the throttle valve) included in the engine 2, the various sensors (for example, the engine rotation sensor) included in the engine 2, and the transmission control device 13 so as to communicate with the various sensors 17, the various actuators of the engine 2, and the various sensors of the engine 2, and the transmission control device 13. The engine control device 12 performs control processing on the basis of a predetermined program (including a data base and a map) depending on predetermined conditions of the vehicle. The engine control device 12 outputs a control signal to the transmission control device 13 on the basis of the predetermined program (including the date base and the map) depending on the predetermined conditions of the vehicle. The engine control device 12 controls start or stop of the engine 2. In addition, the engine control device 12 controls the operation of the clutch 3 via the transmission control device 13 to control the connecting and disconnecting operations of the first connecting-disconnecting mechanism 36, the connecting and disconnecting operations of the second connecting-disconnecting mechanism 46, the connecting and disconnecting operations of the third connecting-disconnecting mechanism 47, and the axial movement of the reverse idler gear 31.

The transmission control device 13 is a computer (an electric control unit) controlling the operations of the clutch 3 and the transmission 4 (including the first connecting-disconnecting mechanism 36, the second connecting-disconnecting mechanism 46, the third connecting-disconnecting mechanism 47, and the reverse idler gear 31 that are shown in FIG. 2) (see FIG. 1). The transmission control device 13 is connected to various actuators, various sensors (for example, a rotation sensor), and the engine control device 12 so as to communicate with the various actuators, the various sensors, and the engine control device 12. The transmission control device 13 receives the control signal from the engine control device 12 and performs control processing on the basis of a predetermined program (including a data base and a shift map).

Next, modes of the vehicle drive system 1 according to the first embodiment will be explained as follows with reference to FIGS. 3 to 10.

Figure 4:
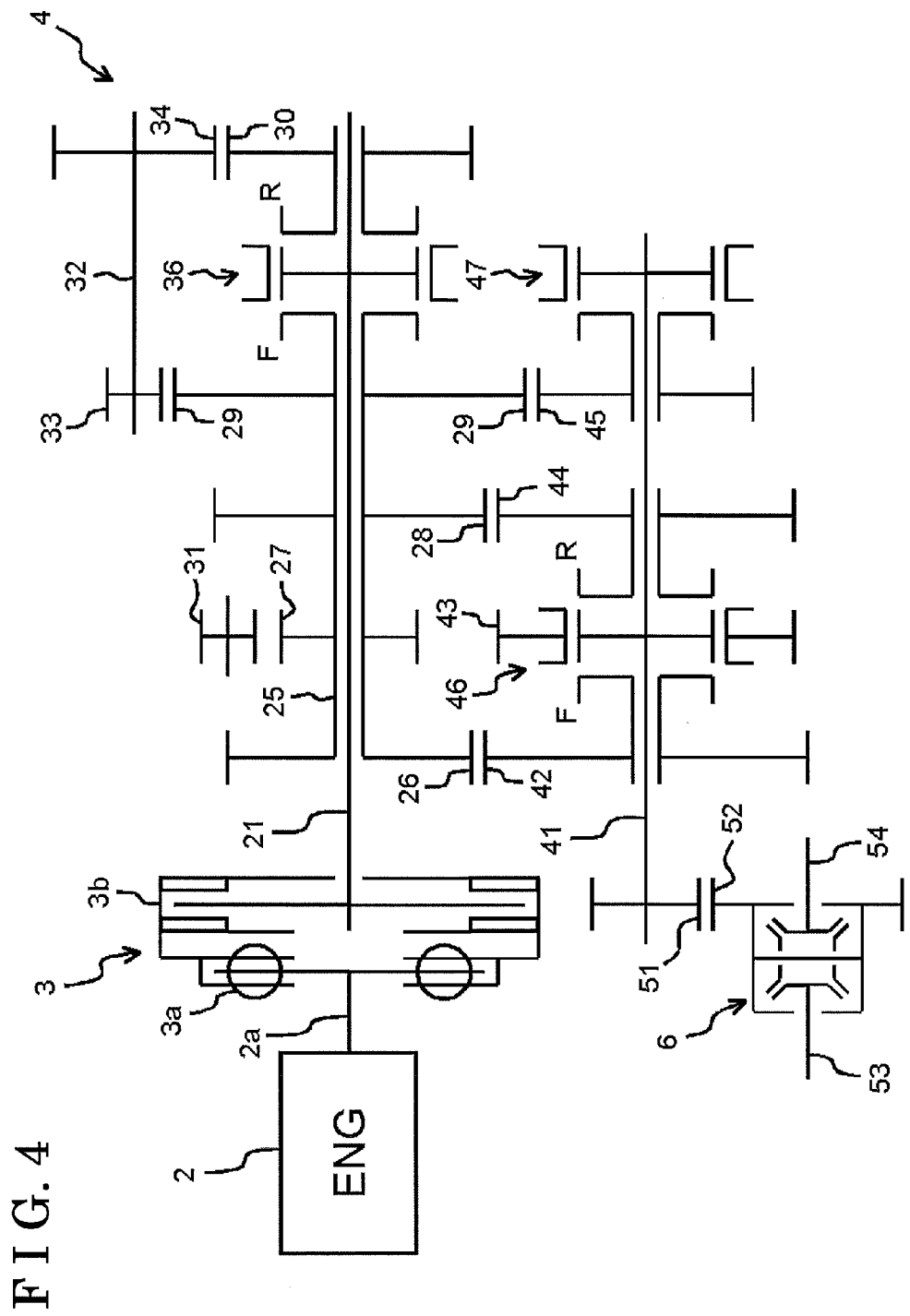
FIG. 4 is a schematic view illustrating a power transmitting path of the vehicle drive system according to the first embodiment when the vehicle drive system is in a neutral mode.

[Neutral mode] As illustrated in FIGS. 3 and 4, in a state where the vehicle drive system 1 is in a neutral mode, the clutch 3 is in an OFF state (a disengaged state), the first connecting-disconnecting mechanism 36 is in a neutral state, the second connecting-disconnecting mechanism 46 is in a neutral state, the third connecting-disconnecting mechanism 47 is in an OFF state (a disconnected state), and the reverse idler gear 31 is in an OFF state (a disengaged state). In those circumstances, the driving force is not transmitted between the engine 2 and the differential mechanism 6.

Figure 5:
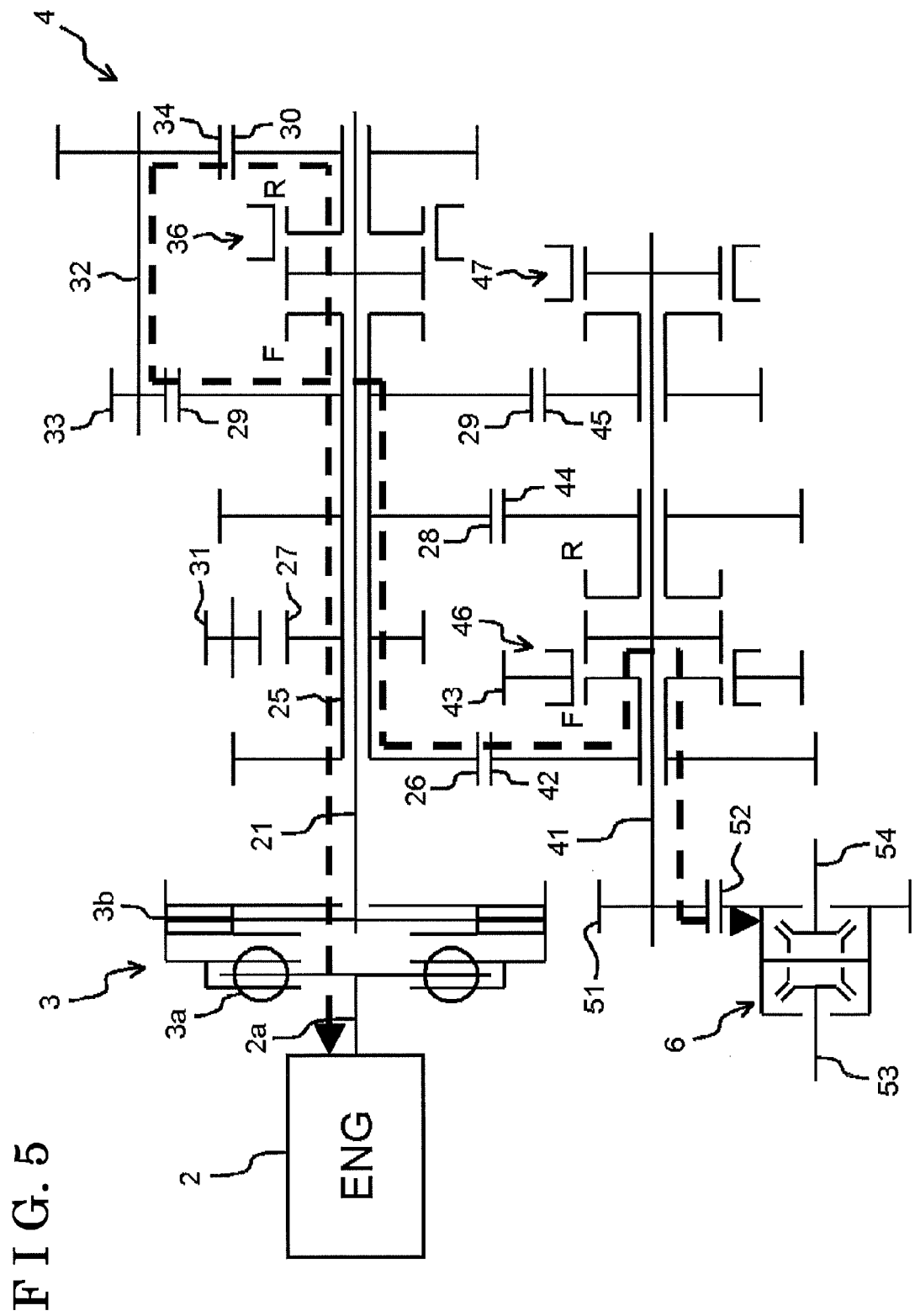
FIG. 5 is a schematic view illustrating a power transmitting path of the vehicle drive system according to the first embodiment when the vehicle drive system is in a 1st speed mode.

[1st speed mode] As illustrated in FIGS. 3 and 5, in a state where the vehicle drive system 1 is in a 1st speed mode, the clutch 3 is in an ON state (an engaged state), the first connecting-disconnecting mechanism 36 is in an ON state (a connected state) at the R-side, the second connecting-disconnecting mechanism 46 is in an ON state (a connected state) at the F-side, the third connecting-disconnecting mechanism 47 is in the OFF state (the disconnected state), and the reverse idler gear 31 is in the OFF state (the disengaged state). In those circumstances, a power transmitting path is configured between the engine 2 and the differential mechanism 6 via the crankshaft 2a, the clutch 3, the input shaft 21, the first connecting-disconnecting mechanism 36, the fifth drive gear 30, the second idler gear 34, the shaft 32, the first idler gear 33, the fourth drive gear 29, the shaft 25, the first drive gear 26, the first driven gear 42, the second connecting-disconnecting mechanism 46, and the output shaft 41. As a result, the engine 2 may drive the vehicle or may exert a braking effect upon the vehicle (engine braking).

Figure 6:
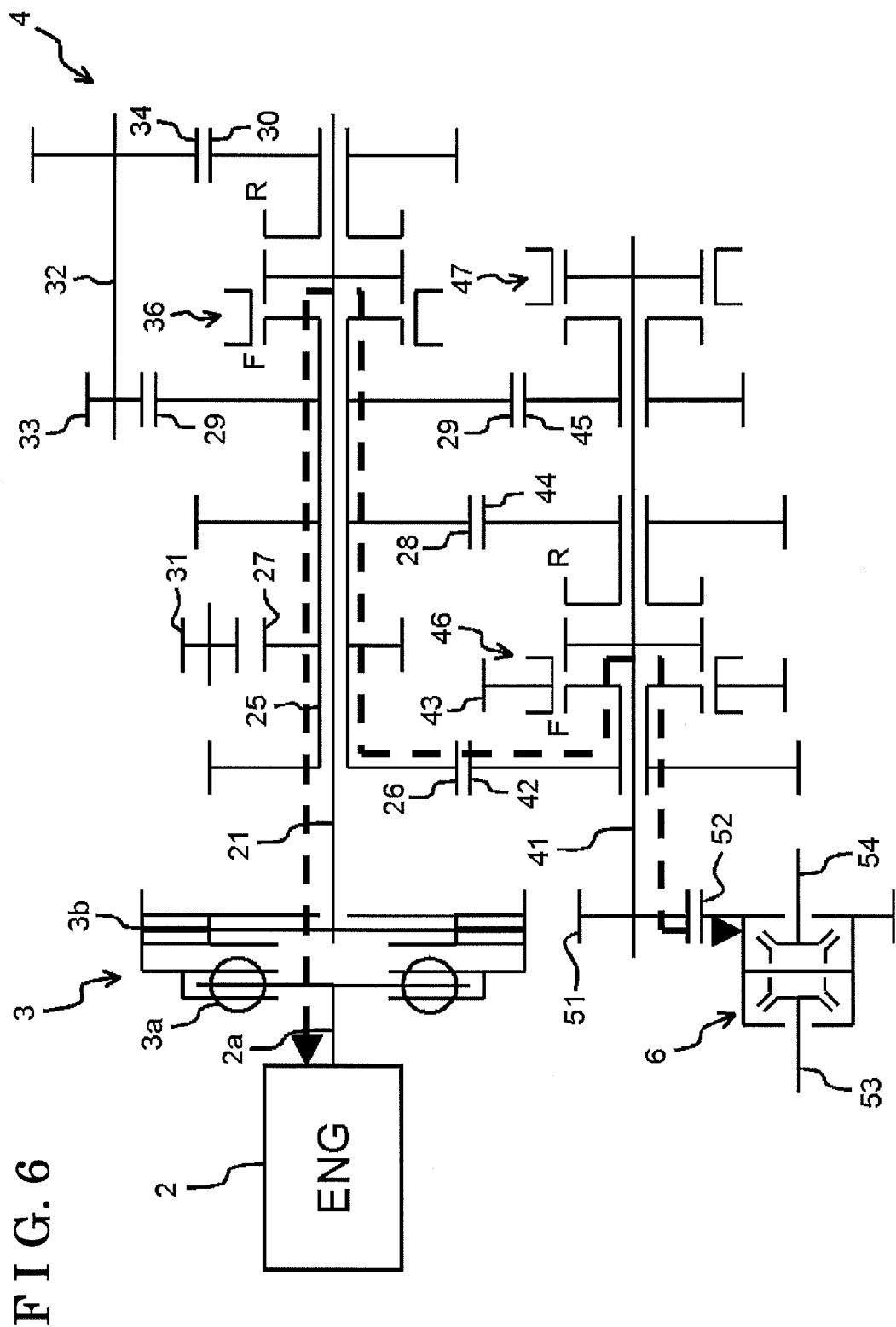
FIG. 6 is a schematic view illustrating a power transmitting path of the vehicle drive system according to the first embodiment when the vehicle drive system is in a 2nd speed mode.

[2nd speed mode] As illustrated in FIGS. 3 and 6, in a state where the vehicle drive system 1 is in a 2nd speed mode, the clutch 3 is in the ON state (the engaged state), the first connecting-disconnecting mechanism 36 is in an ON state (a connected state) at the F-side, the second connecting-disconnecting mechanism 46 is in the ON state (the connected state) at the F-side, the third connecting-disconnecting mechanism 47 is in the OFF state (the disconnected state), and the reverse idler gear 31 is in the OFF state (the disengaged state). In those circumstances, a power transmitting path is configured between the engine 2 and the differential mechanism 6 via the crankshaft 2a, the clutch 3, the input shaft 21, the first connecting-disconnecting mechanism 36, the shaft 25, the first drive gear 26, the first driven gear 42, the second connecting-disconnecting mechanism 46, and the output shaft 41. As a result, the engine 2 may drive the vehicle or may exert the braking effect upon the vehicle (engine braking).

Figure 7:
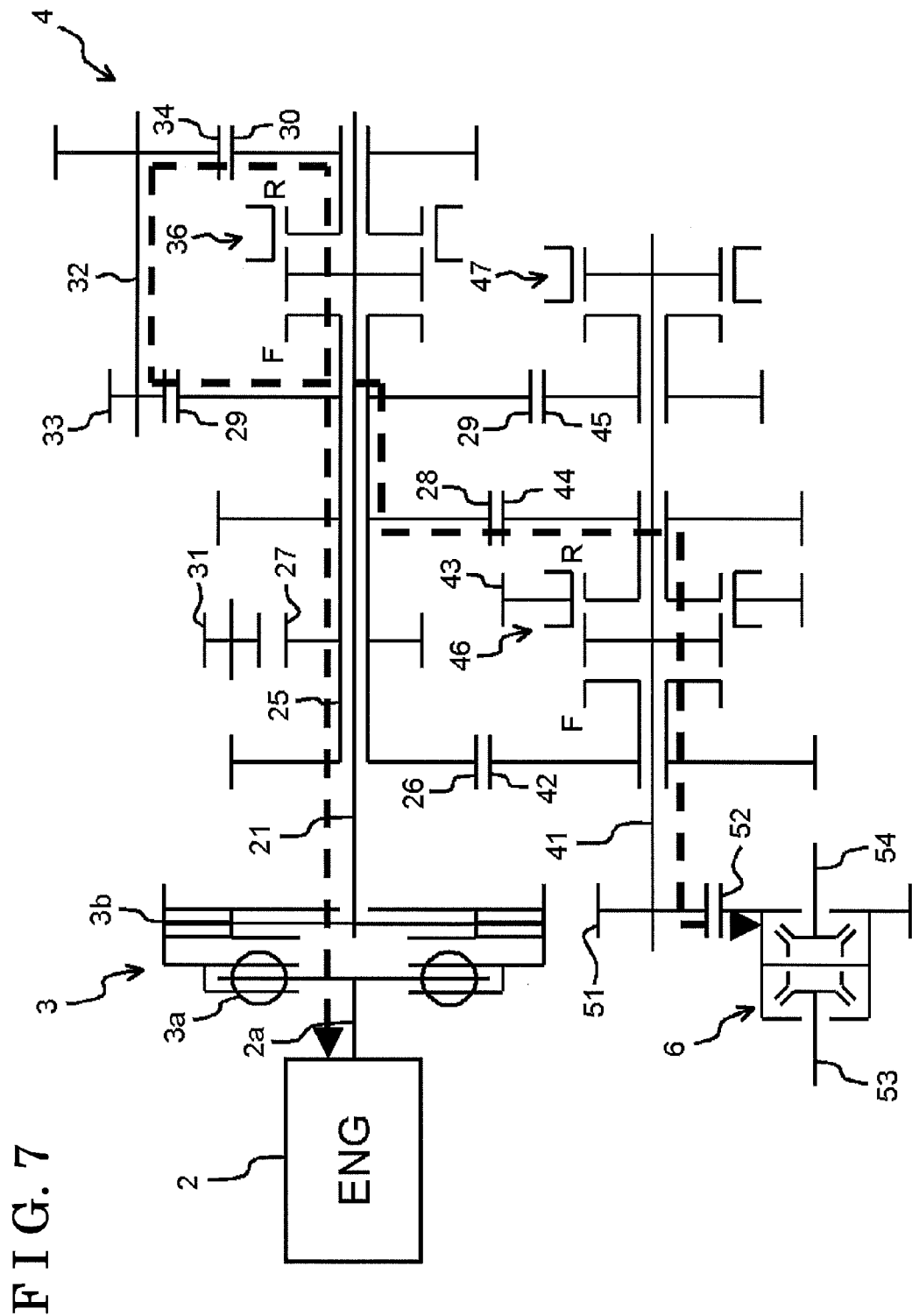
FIG. 7 is a schematic view illustrating a power transmitting path of the vehicle drive system according to the first embodiment when the vehicle drive system is in a 2.5th speed mode.

[2.5th speed mode] As illustrated in FIGS. 3 and 7, in a state where the vehicle drive system 1 is in a 2.5th speed mode, the clutch 3 is in the ON state (the engaged state), the first connecting-disconnecting mechanism 36 is in the ON state (the connected state) at the R-side, the second connecting-disconnecting mechanism 46 is in an ON state (a connected state) at the R-side, the third connecting-disconnecting mechanism 47 is in the OFF state (the disconnected state), and the reverse idler gear 31 is in the OFF state (the disengaged state). In those circumstances, a power transmitting path is configured between the engine 2 and the differential mechanism 6 via the crankshaft 2a, the clutch 3, the input shaft 21, the first connecting-disconnecting mechanism 36, the fifth drive gear 30, the second idler gear 34, the shaft 32, the first idler gear 33, the fourth drive gear 29, the shaft 25, the third drive gear 28, the third driven gear 44, the second connecting-disconnecting mechanism 46, and the output shaft 41. As a result, the engine 2 may drive the vehicle or may exert the braking effect upon the vehicle (engine braking). In addition, the 2.5th speed mode of the vehicle drive system 1 may be omitted.

Figure 8:
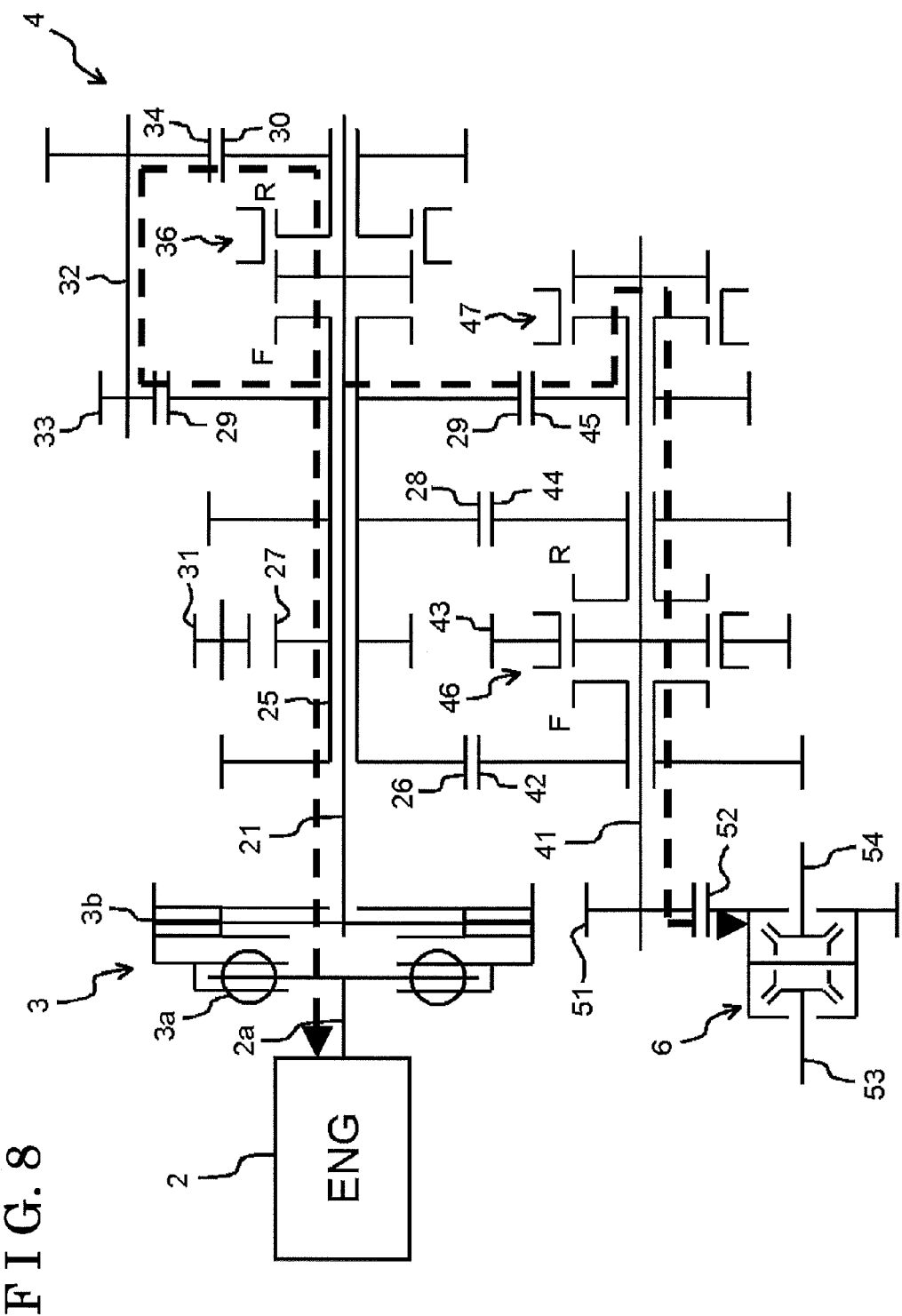
FIG. 8 is a schematic view illustrating a power transmitting path of the vehicle drive system according to the first embodiment when the vehicle drive system is in a 3rd speed mode.

[3rd speed mode] As illustrated in FIGS. 3 and 8, in a state where the vehicle drive system 1 is in a 3rd speed mode, the clutch 3 is in the ON state (the engaged state), the first connecting-disconnecting mechanism 36 is in the ON state (the connected state) at the R-side, the second connecting-disconnecting mechanism 46 is in the neutral state, the third connecting-disconnecting mechanism 47 is in an ON state (a connected state), and the reverse idler gear 31 is in the OFF state (the disengaged state). In those circumstances, a power transmitting path is configured between the engine 2 and the differential mechanism 6 via the crankshaft 2a, the clutch 3, the input shaft 21, the first connecting-disconnecting mechanism 36, the fifth drive gear 30, the second idler gear 34, the shaft 32, the first idler gear 33, the fourth drive gear 29, the fourth driven gear 45, the third connecting-disconnecting mechanism 47, and the output shaft 41. As a result, the engine 2 may drive the vehicle or may exert the braking effect upon the vehicle (engine braking).

Figure 9:
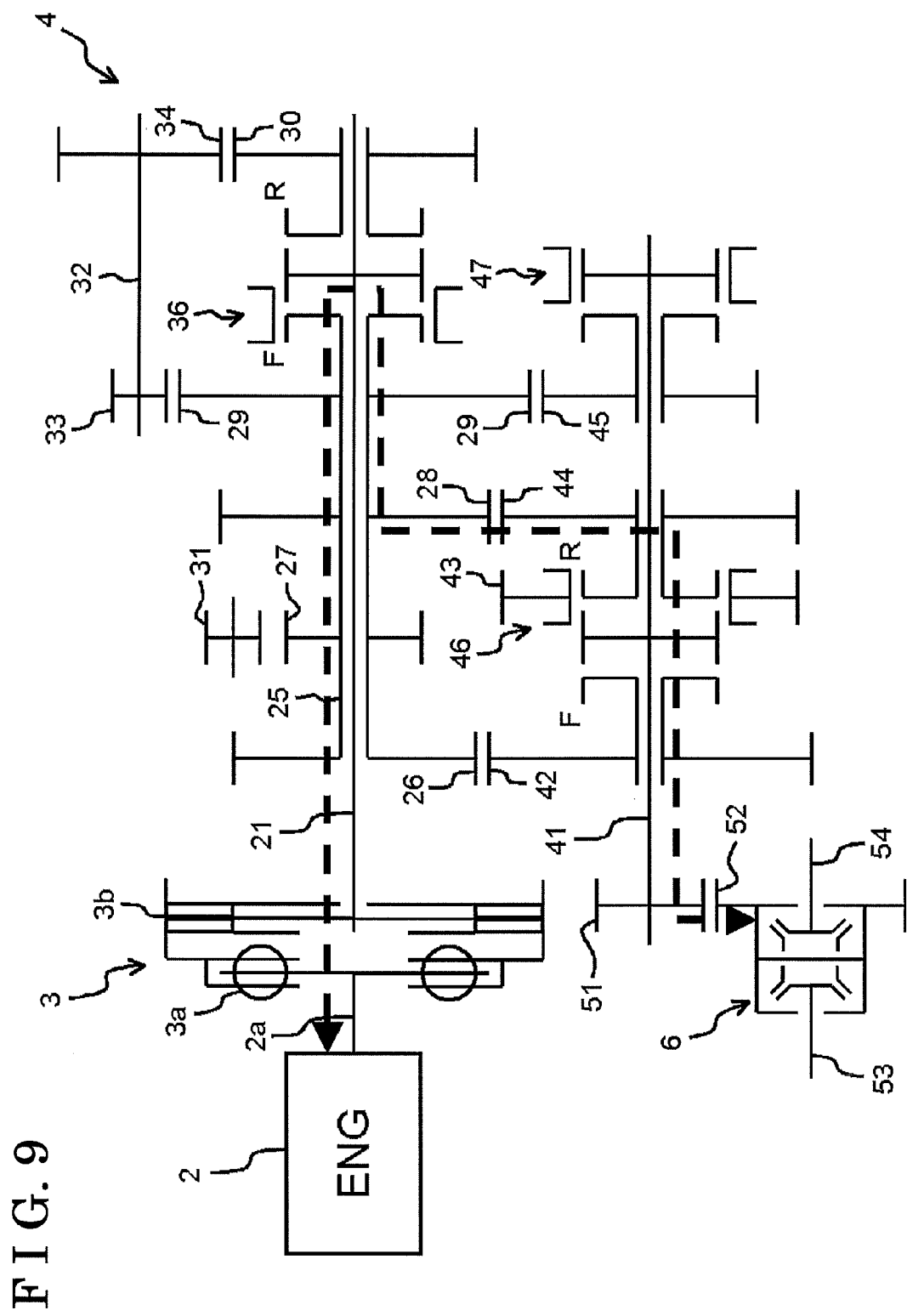
FIG. 9 is a schematic view illustrating a power transmitting path of the vehicle drive system according to the first embodiment when the vehicle drive system is in a 4th speed mode.

[4th speed mode] As illustrated in FIGS. 3 and 9, in a state where the vehicle drive system 1 is in a 4th speed mode, the clutch 3 is in the ON state (the engaged state), the first connecting-disconnecting mechanism 36 is in the ON state (the connected state) at the F-side, the second connecting-disconnecting mechanism 46 is in the ON state (the connected state) at the R-side, the third connecting-disconnecting mechanism 47 is in the OFF state (the disconnected state), and the reverse idler gear 31 is in the OFF state (the disengaged state). In those circumstances, a power transmitting path is configured between the engine 2 and the differential mechanism 6 via the crankshaft 2a, the clutch 3, the input shaft 21, the first connecting-disconnecting mechanism 36, the shaft 25, the third drive gear 28, the third driven gear 44, the second connecting-disconnecting mechanism 46, and the output shaft 41. As a result, the engine 2 may drive the vehicle or may exert the braking effect upon the vehicle (engine braking).

Figure 10:
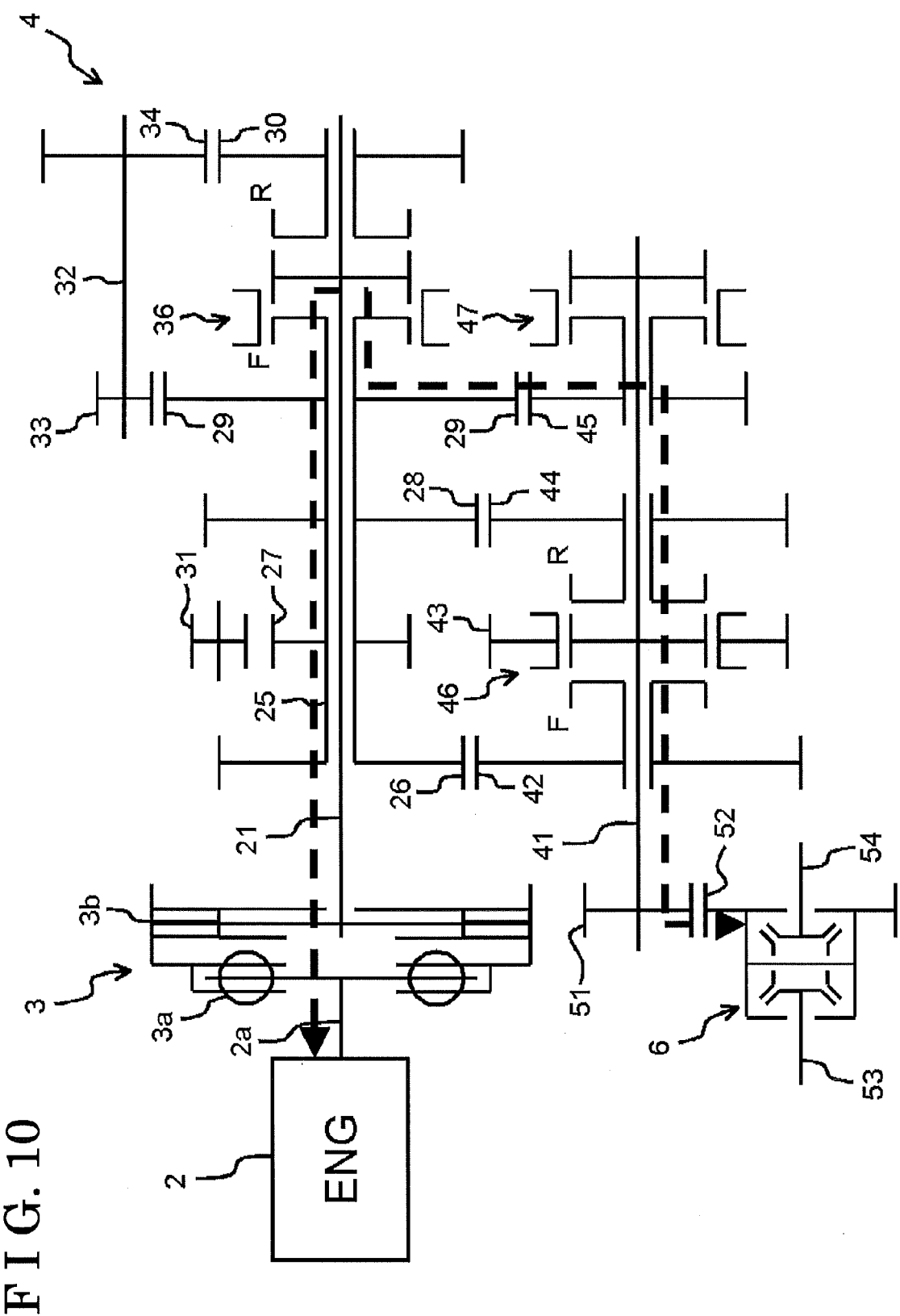
FIG. 10 is a schematic view illustrating a power transmitting path of the vehicle drive system according to the first embodiment when the vehicle drive system is in a 5th speed mode.

[5th speed mode] As illustrated in FIGS. 3 and 10, in a state where the vehicle drive system 1 is in a 5th speed mode, the clutch 3 is in the ON state (the engaged state), the first connecting-disconnecting mechanism 36 is in the ON state (the connected state) at the F-side, the second connecting-disconnecting mechanism 46 is in the neutral state, the third connecting-disconnecting mechanism 47 is in the ON state (the connected state), and the reverse idler gear 31 is in the OFF state (the disengaged state). In those circumstances, a power transmitting path is configured between the engine 2 and the differential mechanism 6 via the crankshaft 2a, the clutch 3, the input shaft 21, the first connecting-disconnecting mechanism 36, the shaft 25, the fourth drive gear 29, the fourth driven gear 45, the third connecting-disconnecting mechanism 47, and the output shaft 41. As a result, the engine 2 may drive the vehicle or may exert the braking effect upon the vehicle (engine braking).

According to the vehicle drive system 1 of the first embodiment, the transmission 4 is simply configured by the three parallel shafts (the input shaft 21, the output shaft 41, and the shaft 32) without using a planetary gear. As a result, the weight and costs of the vehicle drive system 1 may be minimized and the vehicle drive system 1 including the five-speed transmission 4 may be obtained.

In addition, according to the vehicle drive system 1 of the first embodiment, for example, in a case where the first connecting-disconnecting mechanism 36 is brought into the ON state and the reverse idler gear 31 is brought into the ON state, the vehicle may be driven in the rearward direction by the engine 2.

Figure 11:
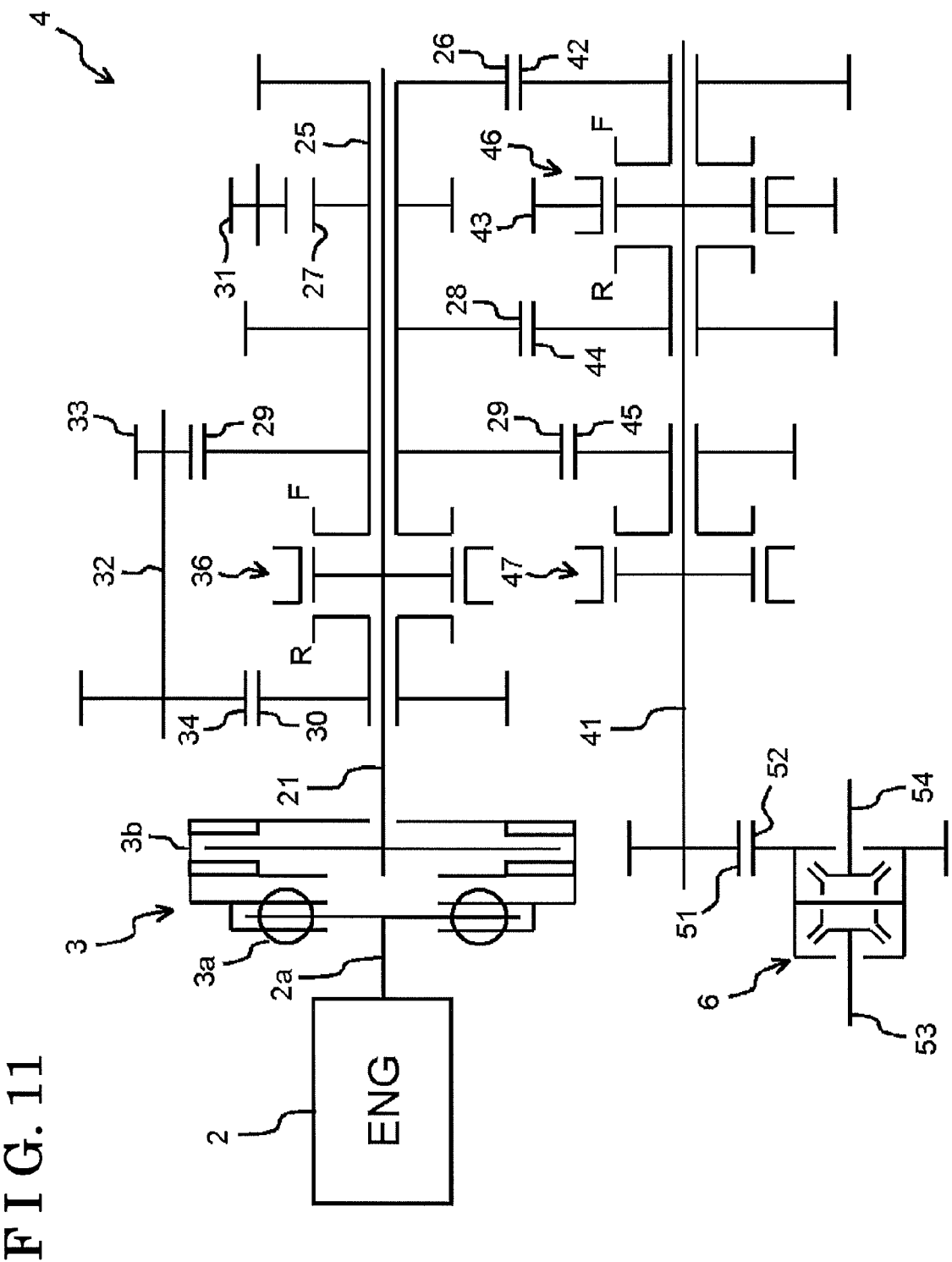
FIG. 11 is a schematic view illustrating a configuration of a power transmitting path of the vehicle drive system according to a second embodiment disclosed here.

The vehicle drive system 1 according to a second embodiment of the disclosure will be explained as follows with reference to FIG. 11.

The second embodiment is a modified example of the first embodiment. According to the vehicle drive system 1 of the first embodiment, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side where the engine 2 is axially provided (see FIG. 2). On the other hand, according to the vehicle drive system 1 of the second embodiment, as illustrated in FIG. 11, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side opposite to the side where the engine 2 is axially provided. Further, according to the vehicle drive system 1 of the first embodiment, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side where the engine 2 is axially provided (see FIG. 2). On the other hand, according to the vehicle drive system 1 of the second embodiment, as illustrated in FIG. 11, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side opposite to the side where the engine 2 is axially provided. Furthermore, according to the vehicle drive system 1 of the first embodiment, the first idler gear 33 and the second idler gear 34 are arranged along the shaft 32 in the mentioned order from the side where the engine 2 is axially provided (see FIG. 2). On the other hand, according to the vehicle drive system 1 of the second embodiment, as illustrated in FIG. 11, the first idler gear 33 and the second idler gear 34 are arranged along the shaft 32 in the mentioned order from the side opposite to the side where the engine 2 is axially provided. Other configurations and effects of the vehicle drive system 1 of the second embodiment are similar to those of the vehicle drive system 1 of the first embodiment.

The vehicle drive system 1 of the second embodiment has effects similar to those of the vehicle drive system 1 of the first embodiment.

The vehicle drive system 1 according to a third embodiment of the disclosure will be explained as follows with reference to FIGS. 12 to 25.

The third embodiment is a modified example of the first embodiment. The vehicle drive system 1 of the third embodiment includes the engine 2 serving as the first driving source and outputting the driving force by the energy of combustion of the fuel, and a motor generator 5 serving as a second driving source and outputting a driving force by an electric energy. In the third embodiment, the vehicle drive system 1 configured as described above is applied to a hybrid vehicle.

Figure 12:
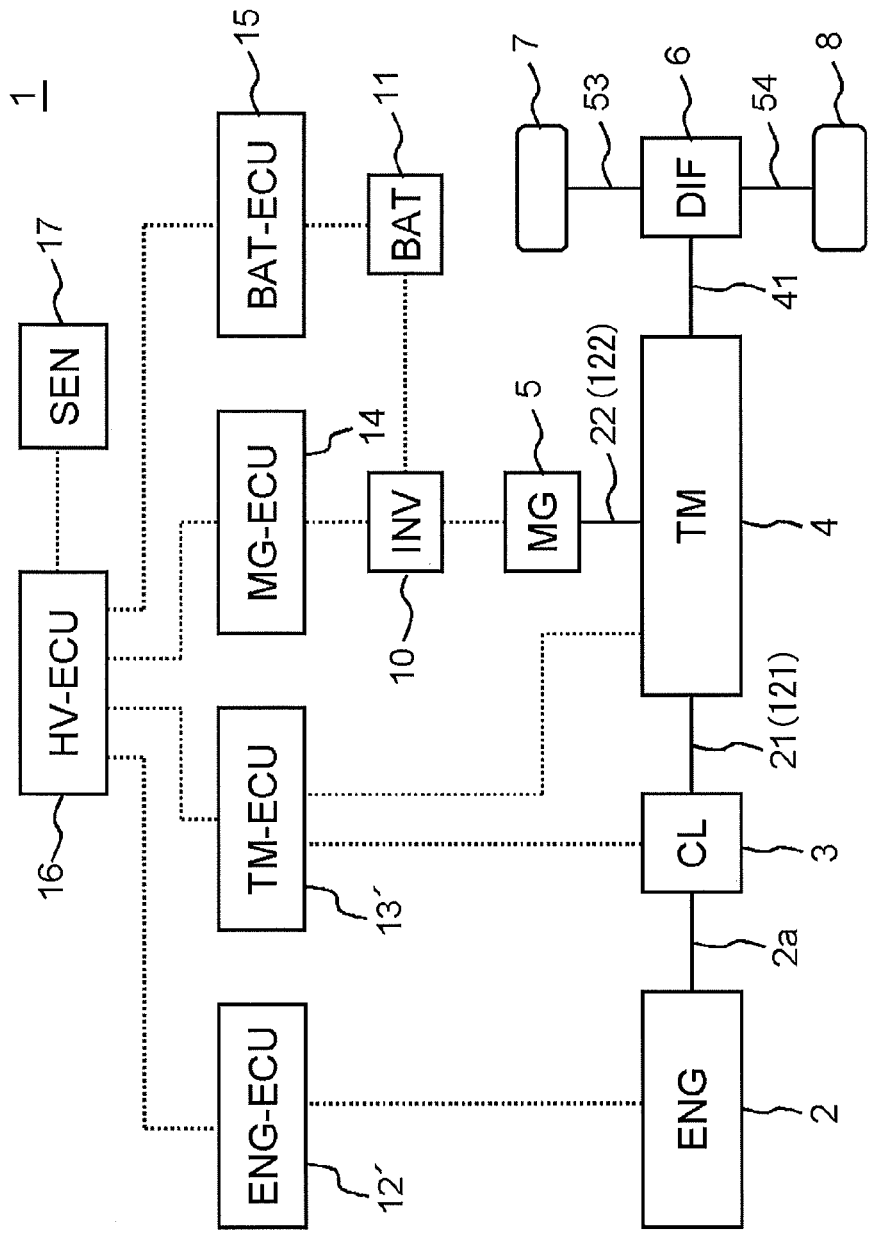
FIG. 12 is a block diagram schematically illustrating a configuration of the vehicle drive system according to third and ninth embodiments disclosed here.

As illustrated in FIG. 12, the vehicle drive system 1 is a drive system driving the hybrid vehicle and including the engine 2 (the first driving source) outputting the driving force by the energy of combustion of the fuel, and the motor generator 5 (the second driving source) outputting the driving force by the electric force. The vehicle drive system 1 includes the clutch 3, the transmission 4, the motor generator 5, and the differential mechanism 6 on the power transmitting path between the engine 2 and the wheels 7 and 8. The vehicle drive system 1 includes an inverter 10, a battery 11, an engine control device 12', a transmission control device 13', a motor generator control device 14, a battery control device 15, a hybrid control device 16, and the sensor 17 that function as control systems controlling the engine 2, the clutch 3, the transmission 4, and the motor generator 5.

The engine 2, the clutch 3, the differential mechanism 6, and the wheels 7 and 8 in the third embodiment are similar to the engine 2 (in FIG. 1), the clutch 3 (in FIG. 1), the differential mechanism 6 (in FIG. 1), and the wheels 7 and 8 (in FIG. 1) of the first embodiment.

Figure 13:
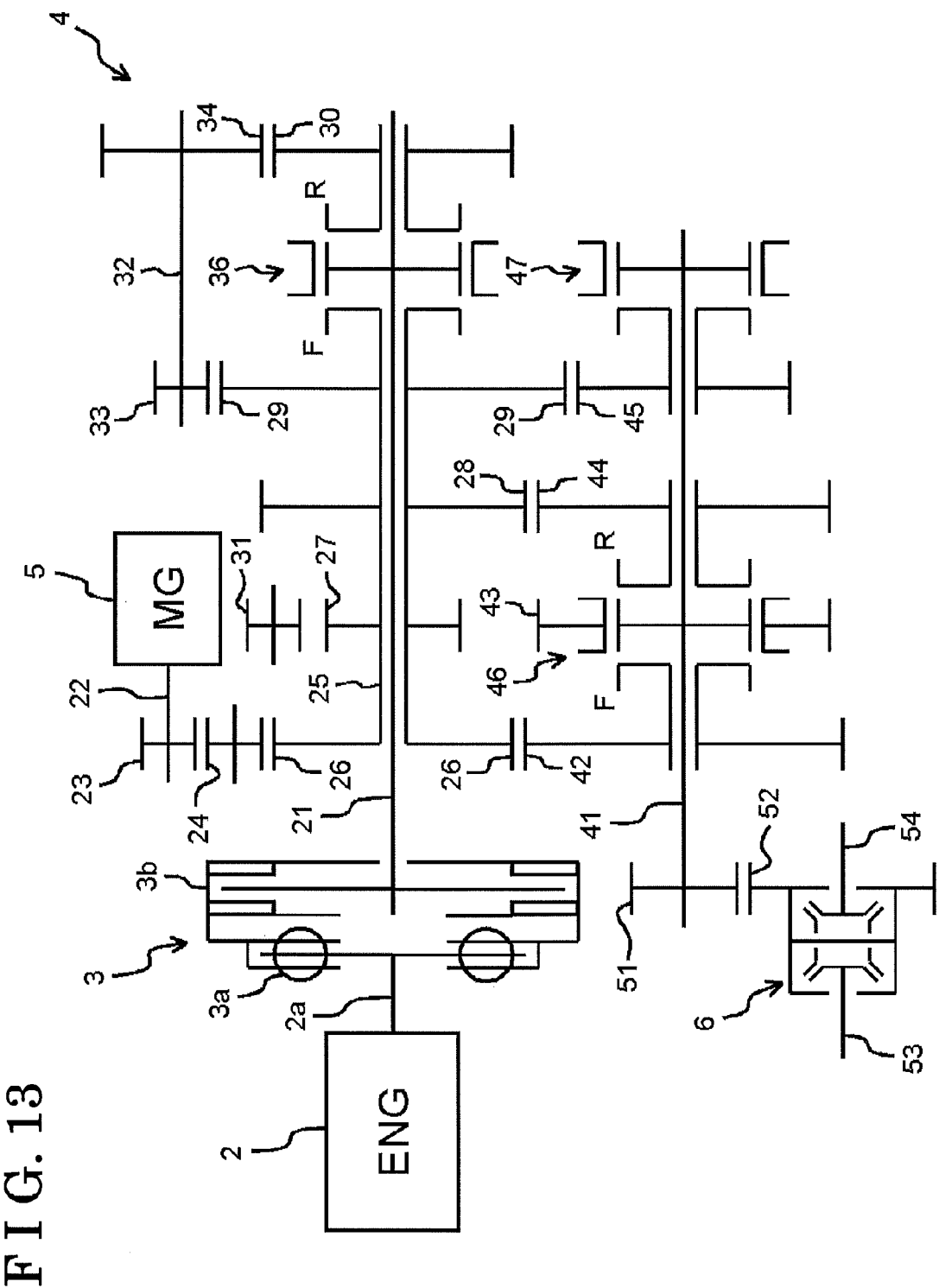
FIG. 13 is a schematic view illustrating a configuration of a power transmitting path of the vehicle drive system according to the third embodiment disclosed here.

The transmission 4 is a gear mechanism converting rotations of one of the engine 2 and the motor generator 5 to transmit the driving force from one of the engine 2 and the motor generator 5 to the differential mechanism 6 or converting rotations of both the engine 2 and the motor generator 5 to transmit the driving forces from both the engine 2 and the motor generator 5 to the differential mechanism 6 (see FIGS. 12 and 13). The transmission 4 of the third embodiment is formed by the five-speed transmission having the three parallel shafts in the same way as the transmission 4 (in FIG. 2) of the first embodiment. Further, an input shaft 22, an input drive gear 23, and an input idler gear 24 are added to the transmission 4 of the third embodiment.

The input shaft 22 is a shaft to which the driving force of the motor generator 5 is inputted (see FIGS. 12 and 13). The input shaft 22 is rotatably supported by the housing of the transmission 4. The input shaft 22 integrally rotates with the input drive gear 23.

The input drive gear 23 is a gear driving the input idler gear 24 by the driving force of the motor generator 5 (see FIG. 13). The input drive gear 23 integrally rotates with the input shaft 22. The input drive gear 23 engages with the input idler gear 24.

The input idler gear 24 is a gear driving the first drive gear 26 by the driving force from the input drive gear 23 (see FIG. 13). The input idler gear 24 is rotationally supported by the housing of the transmission 4. The input idler gear 24 engages with the input drive gear 23 and the first drive gear 26.

The motor generator 5 is a synchronous generator-motor serving as an electric motor and a generator (see FIGS. 12 and 13). The motor generator 5 supplies electric power through the inverter 10 to the battery 11. An output shaft of the motor generator 5 is connected to the input shaft 22, thereby integrally rotating with the input shaft 22. The motor generator 5 generates electric power by using the driving force transmitted from the engine 2 through the transmission 4 to the motor generator 5, thereby charging the battery 11. Further, the motor generator 5 regenerates electric power by using the driving force transmitted from the wheels 7 and 8 through the shafts 53 and 54, the differential mechanism 6, and the transmission 4 to the motor generator 5, thereby charging the battery 11. Furthermore, the motor generator 5 outputs the driving force by using electric power from the battery 11. Various sensors are included in the motor generator 5. The various sensors are, for example, an angular sensor detecting a rotational angle of the output shaft of the motor generator 5, and an output-shaft speed sensor detecting rotations of the output shaft of the motor generator 5. The various sensors of the motor generator 5 are connected to the motor generator control device 14 so as to communicate therewith. The motor generator 5 is controlled via the inverter 10 by the motor generator control device 14.

The inverter 10 is a control unit receiving a control signal from the motor generator control device 14 to control the operations (driving operation, electric power generation, and electric power regeneration) of the motor generator 5 (see FIG. 12). The inverter 10 is electrically connected via a boost converter to the battery 11.

The battery 11 is a second cell that is a rechargeable battery (see FIG. 12). The battery 11 is electrically connected via the boost converter and the inverter 10 to the motor generator 5.

The engine control device 12' is a computer (an electric control unit) controlling the operation of the engine 2 (see FIG. 12). The engine control device 12' is connected to various actuators (for example, actuators driving an injector and a throttle valve) included in the engine 2, various sensors (for example, an engine rotation sensor) included in the engine 2, and the hybrid control device 16 so as to communicate with the various actuators of the engine 2, the various sensors of the engine 2, and the hybrid control device 16. The engine control device 12' receives a control signal from the hybrid control device 16 and performs control processing on the basis of a predetermined program (including a data base and a map).

The transmission control device 13' is a computer (an electric control unit) controlling the operations of the clutch 3 and the transmission 4 (including the first connecting-disconnecting mechanism 36, the second connecting-disconnecting mechanism 46, and the third connecting-disconnecting mechanism 47, and the reverse idler gear 31 that are shown in FIG. 13) (see FIG. 12). The transmission control device 13' is connected to various actuators, various sensors, and the hybrid control device 16 so as to communicate with the various actuators, the various sensors, and the hybrid control device 16. The transmission control device 13' receives a control signal from the hybrid control device 16 and performs control processing on the basis of a predetermined program (including a map and a shift map).

The motor generator control device 14 is a computer (an electric control unit) controlling the operations of the motor generator 5 via the inverter 10 (see FIG. 12). The motor generator control device 14 is connected to the inverter 10, the various sensors (for example, the angular sensor) included in the motor generator 5, and the hybrid control device 16 so as to communicate with the inverter 10, the various sensors of the motor generator 5, and the hybrid control device 16. The motor generator control device 14 receives a control signal from the hybrid control device 16 and performs control processing on the basis of a predetermined program (including a data base and a map).

The battery control device 15 is a computer (an electric control unit) controlling charge and discharge conditions of the battery 11 (see FIG. 12). The battery control device 15 is connected to the hybrid control device 16 so as to communicate therewith. The battery control device 15 receives a control signal from the hybrid control device 16 and performs control processing on the basis of a predetermined program (including a data base and a map).

The hybrid control device 16 is a computer (an electric control unit) controlling the operations of the engine control device 12', the transmission control device 13', the motor generator control device 14, and the battery control device 15 (see FIG. 12). The hybrid control device 16 is connected to the various sensors 17 (for example, the vehicle speed sensor and the throttle position sensor), the engine control device 12', the transmission control device 13', the motor generator control device 14, and the battery control device 15 so as to communicate with the various sensors 17, the engine control device 12', the transmission control device 13', the motor generator control device 14, and the battery control device 15. The hybrid control device 16 outputs the control signals to the engine control device 12', the transmission control device 13', the motor generator control device 14, and the battery control device 15 on the basis of a predetermined program (including a data base and a map) depending on predetermined conditions of the hybrid vehicle. The hybrid control device 16 controls start or stop of the engine 2 via the engine control device 12'. Further, the hybrid control device 16 controls the operation of the clutch 3, the connecting and disconnecting operations of the first connecting-disconnecting mechanism 36, the connecting and disconnecting operations of the second connecting-disconnecting mechanism 46, the connecting and disconnecting operations of the third connecting-disconnecting mechanism 47, and the axial movement of the reverse idler gear 31 via the transmission control device 13'. Moreover, the hybrid control device 16 controls the driving operation, the electric power generation, and the electric power regeneration of the motor generator 5 via the motor generator control device 14. In addition, the hybrid control device 16 controls the battery 11 via the battery control device 15.

Next, modes of the vehicle drive system 1 according to the third embodiment will be explained as follows with reference to FIGS. 14 to 25.

Figure 15:
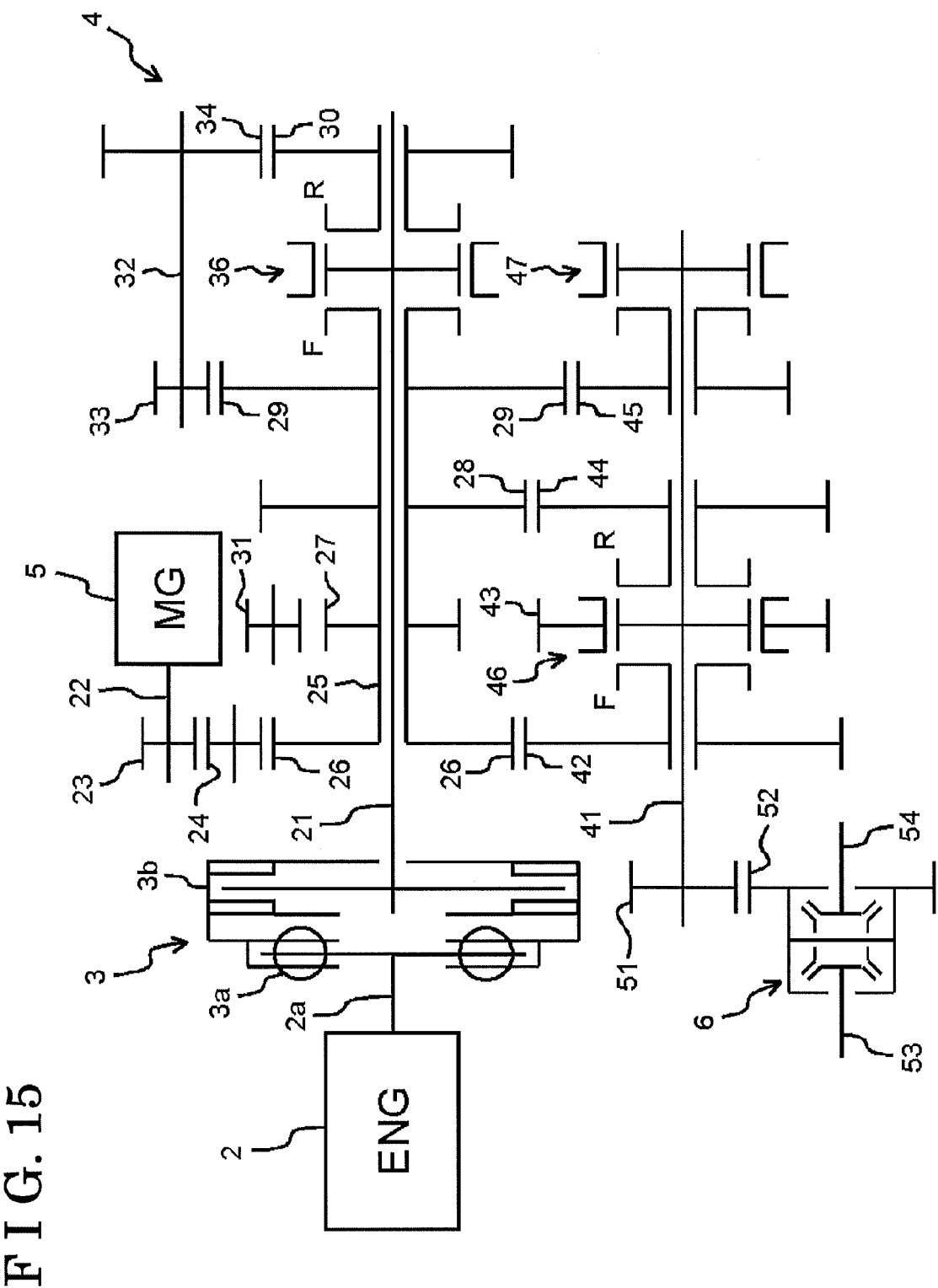
FIG. 15 is a schematic view illustrating a power transmitting path of the vehicle drive system according to the third embodiment when the vehicle drive system is in the neutral mode.

[Neutral mode] As illustrated in FIGS. 14 and 15, in a state where the vehicle drive system 1 is in the neutral mode, the clutch 3 is in the OFF state (the disengaged state), the first connecting-disconnecting mechanism 36 is in the neutral state, the second connecting-disconnecting mechanism 46 is in the neutral state, the third connecting-disconnecting mechanism 47 is in the OFF state (the disconnected state), and the reverse idler gear 31 is in the OFF state (the disengaged state). In those circumstances, the driving forces are not transmitted among the engine 2, the motor generator 5, and the differential mechanism 6.

Figure 16:
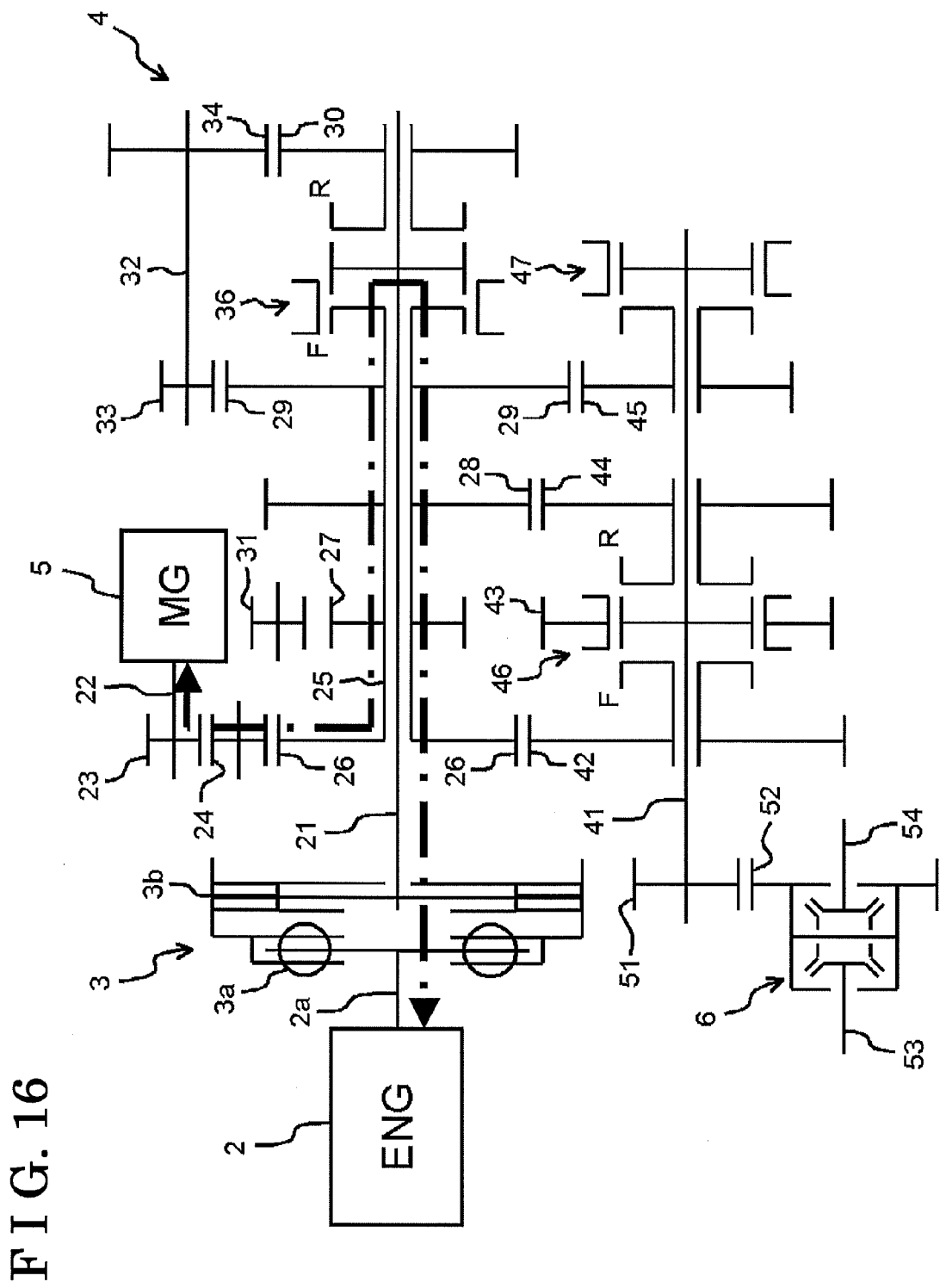
FIG. 16 is a schematic view illustrating a power transmitting path of the vehicle drive system according to the third embodiment when the vehicle drive system is in a stop (start/power generation) mode.

[Stop (start/power generation) mode] As illustrated in FIGS. 14 and 16, in a state where the vehicle is in a stop (start/power generation) mode), that is, in a state where the motor generator 5 starts the engine 2 by using the driving force and generates electric power by using the driving force of the engine 2 while the vehicle is not moving, the clutch 3 is in the ON state (the engaged state), the first connecting-disconnecting mechanism 36 is in the ON state (the connected state) at the F-side, the second connecting-disconnecting mechanism 46 is in the neutral state, the third connecting-disconnecting mechanism 47 is in the OFF state (the disconnected state), and the reverse idler gear 31 is in the OFF state (the disengaged state). In those circumstances, a power transmitting path is configured between the engine 2 and the motor generator 5 via the crankshaft 2a, the clutch 3, the input shaft 21, the first connecting-disconnecting mechanism 36, the shaft 25, the first drive gear 26, the input idler gear 24, the input drive gear 23, and the input shaft 22. Meanwhile, power transmitting paths are not configured between the engine 2 and the differential mechanism 6 and between the motor generator 5 and the differential mechanism 6. At this time, for example, the motor generator 5 is driven when the engine 2 is stopped; thereby, the engine 2 may be started by the motor generator 5. On the other hand, for example, the engine 2 is rotating under the aforementioned condition where the power transmitting paths are not configured between the engine 2 and the differential mechanism 6 and between the motor generator 5 and the differential mechanism 6. At this time, the motor generator 5 may generate electric power.

Figure 17:
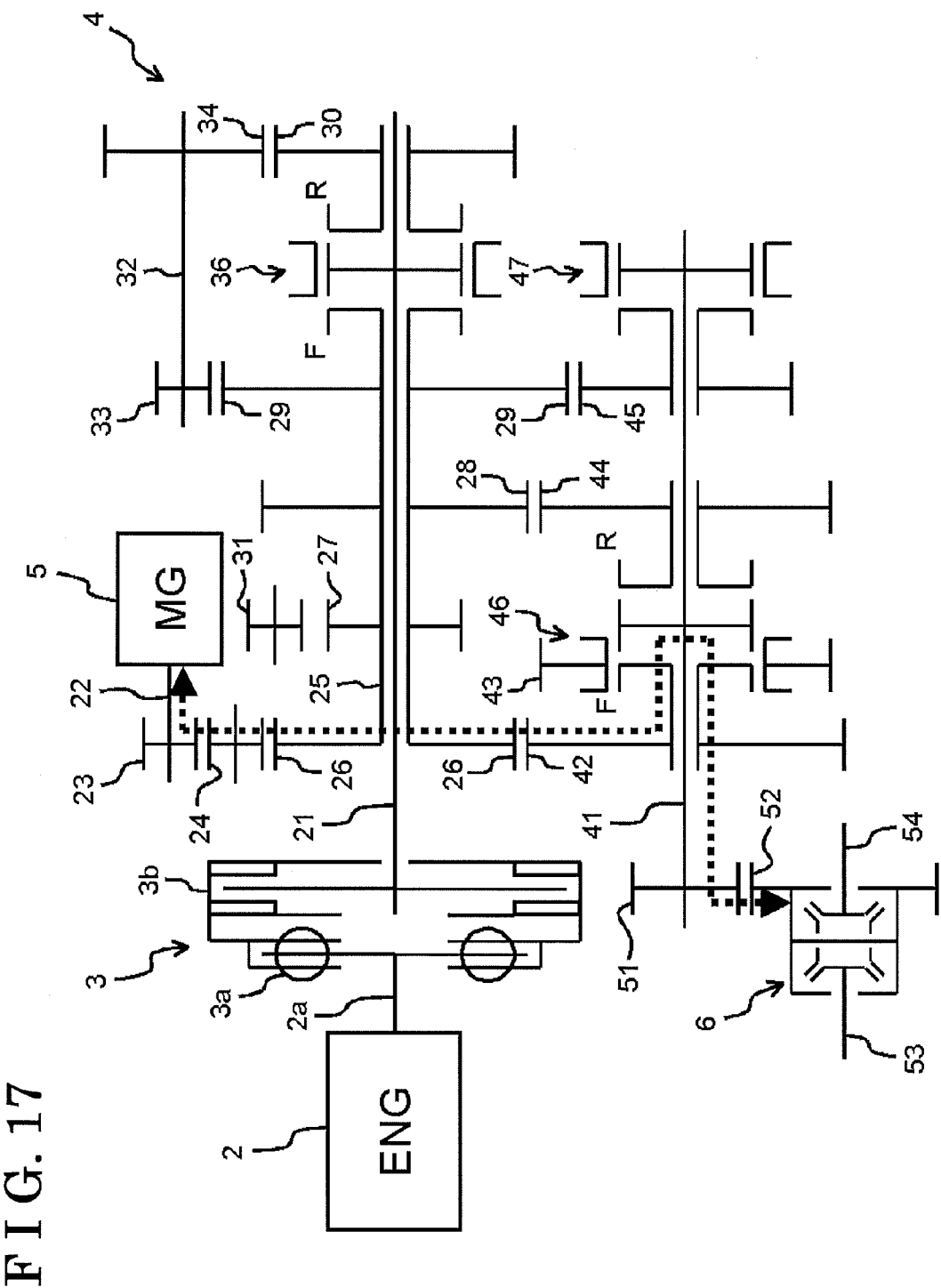
FIG. 17 is a schematic view illustrating a power transmitting path of the vehicle drive system according to the third embodiment when the vehicle drive system is in a 1st speed electric driving mode.

[1st speed electric driving mode] As illustrated in FIGS. 14, and 17, in a state where the vehicle drive system 1 is in a 1st speed electric driving mode (corresponding to a 1st speed EV driving mode), the clutch 3 is in the OFF state (the disengaged state), the first connecting-disconnecting mechanism 36 is in the neutral state, the second connecting-disconnecting mechanism 46 is in the ON state (the connected state) at the F-side, the third connecting-disconnecting mechanism 47 is in the OFF state (the disconnected state), and the reverse idler gear 31 is in the OFF state (the disengaged state). In those circumstances, a power transmitting path is configured between the motor generator 5 and the differential mechanism 6 via the input shaft 22, the input drive gear 23, the input idler gear 24, the first drive gear 26, the first driven gear 42, the second connecting-disconnecting mechanism 46, and the output shaft 41. Meanwhile, the power transmitting paths are not configured between the engine 2 and the motor generator 5 and between the engine 2 and the differential mechanism 6. As a result, the motor generator 5 may drive the hybrid vehicle or may regenerate electric power. The EV (Electric Vehicle) driving mode corresponds to a state where the hybrid vehicle is driven only by the motor generator 5.

Figure 18:
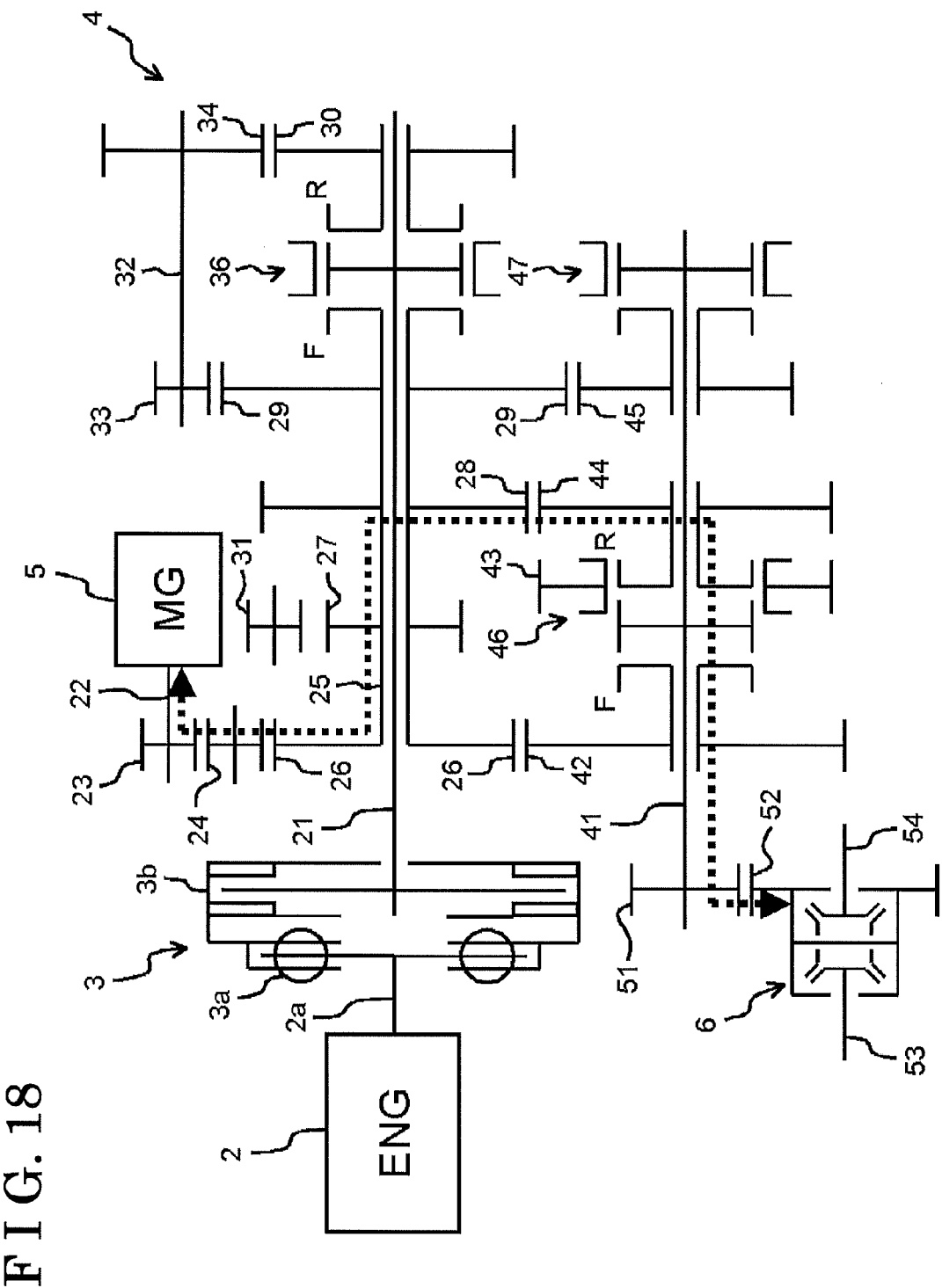
FIG. 18 is a schematic view illustrating a power transmitting path of the vehicle drive system according to the third embodiment when the vehicle drive system is in a 2nd speed electric driving mode.

[2nd speed electric driving mode] As illustrated in FIGS. 14 and 18, in a state where the vehicle drive system 1 is in a 2nd speed electric driving mode (corresponding to a 2nd speed EV driving mode), the clutch 3 is in the OFF state (the disconnected state), the first connecting-disconnecting mechanism 36 is in the neutral state, the second connecting-disconnecting mechanism 46 is in the ON state (the connected state) at the R-side, the third connecting-disconnecting mechanism 47 is in the OFF state (the disconnected state), and the reverse idler gear 31 is in the OFF state (the disengaged state). In those circumstances, a power transmitting path is configured between the motor generator 5 and the differential mechanism 6 via the input shaft 22, the input drive gear 23, the input idler gear 24, the first drive gear 26, the shaft 25, the third drive gear 28, the third driven gear 44, the second connecting-disconnecting mechanism 46, and the output shaft 41. Meanwhile, the power transmitting paths are not configured between the engine 2 and the motor generator 5 and between the engine 2 and the differential mechanism 6. As a result, the motor generator 5 may drive the hybrid vehicle or may regenerate electric power.

Figure 19:
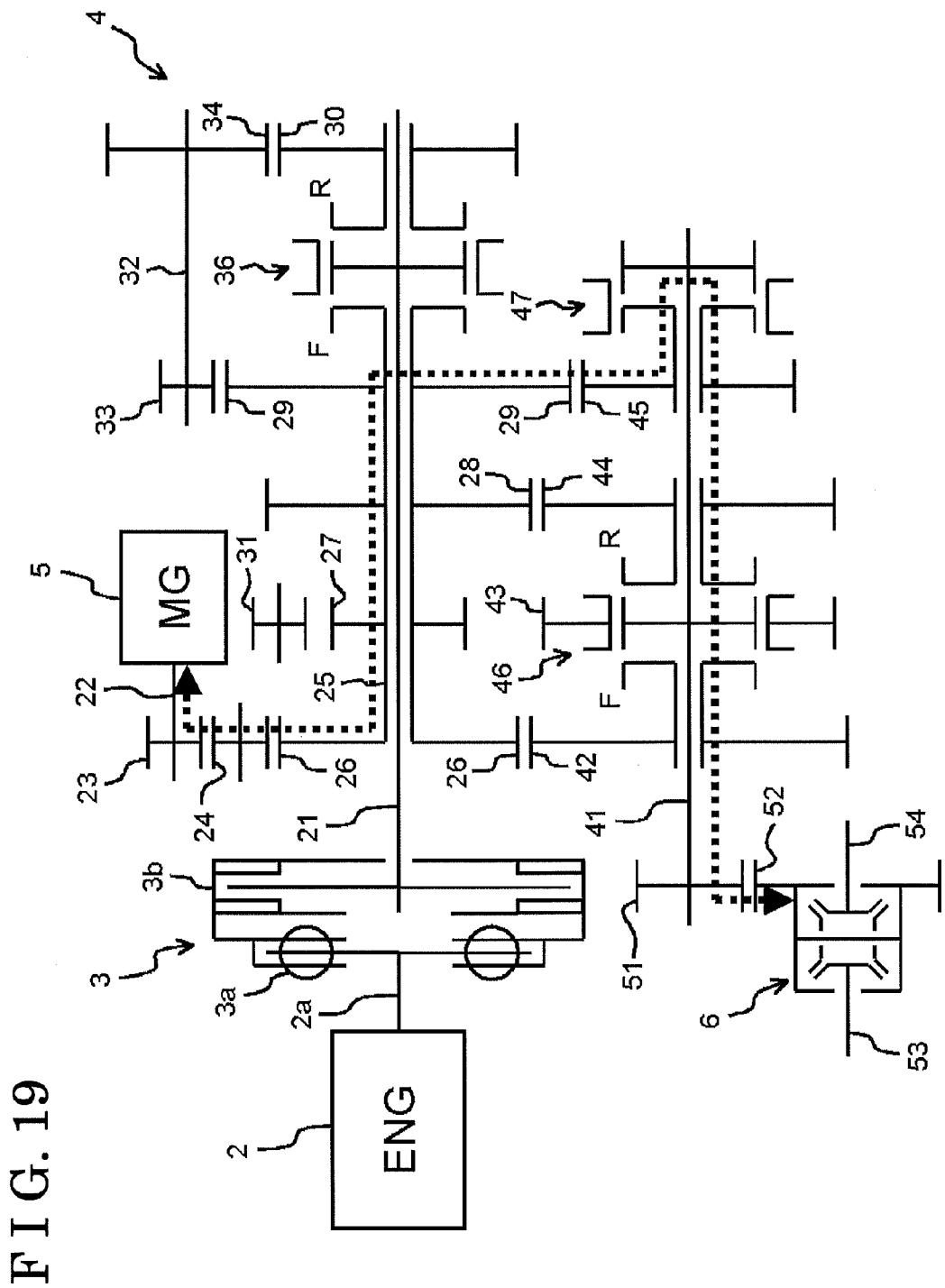
FIG. 19 is a schematic view illustrating a power transmitting path of the vehicle drive system according to the third embodiment when the vehicle drive system is in a 3rd speed electric driving mode.

[3rd speed electric driving mode] As illustrated in FIGS. 14 and 19, in a state where the vehicle drive system 1 is in a 3rd speed electric driving mode (corresponding to a 3rd speed EV driving mode, the clutch 3 is in the OFF state (the disengaged state), the first connecting-disconnecting mechanism 36 is in the neutral state, the second connecting-disconnecting mechanism 46 is in the neutral state, the third connecting-disconnecting mechanism 47 is in the ON state (the connected state), and the reverse idler gear 31 is in the OFF state (the disengaged state). In those circumstances, a power transmitting path is configured between the motor generator 5 and the differential mechanism 6 via the input shaft 22, the input drive gear 23, the input idler gear 24, the first drive gear 26, the shaft 25, the fourth drive gear 29, the fourth driven gear 45, the third connecting-disconnecting mechanism 47, and the output shaft 41. Meanwhile, the power transmitting paths are not configured between the engine 2 and the motor generator 5 and between the engine 2 and the differential mechanism 6. As a result, the motor generator 5 may drive the hybrid vehicle or may regenerate electric power.

Figure 20:
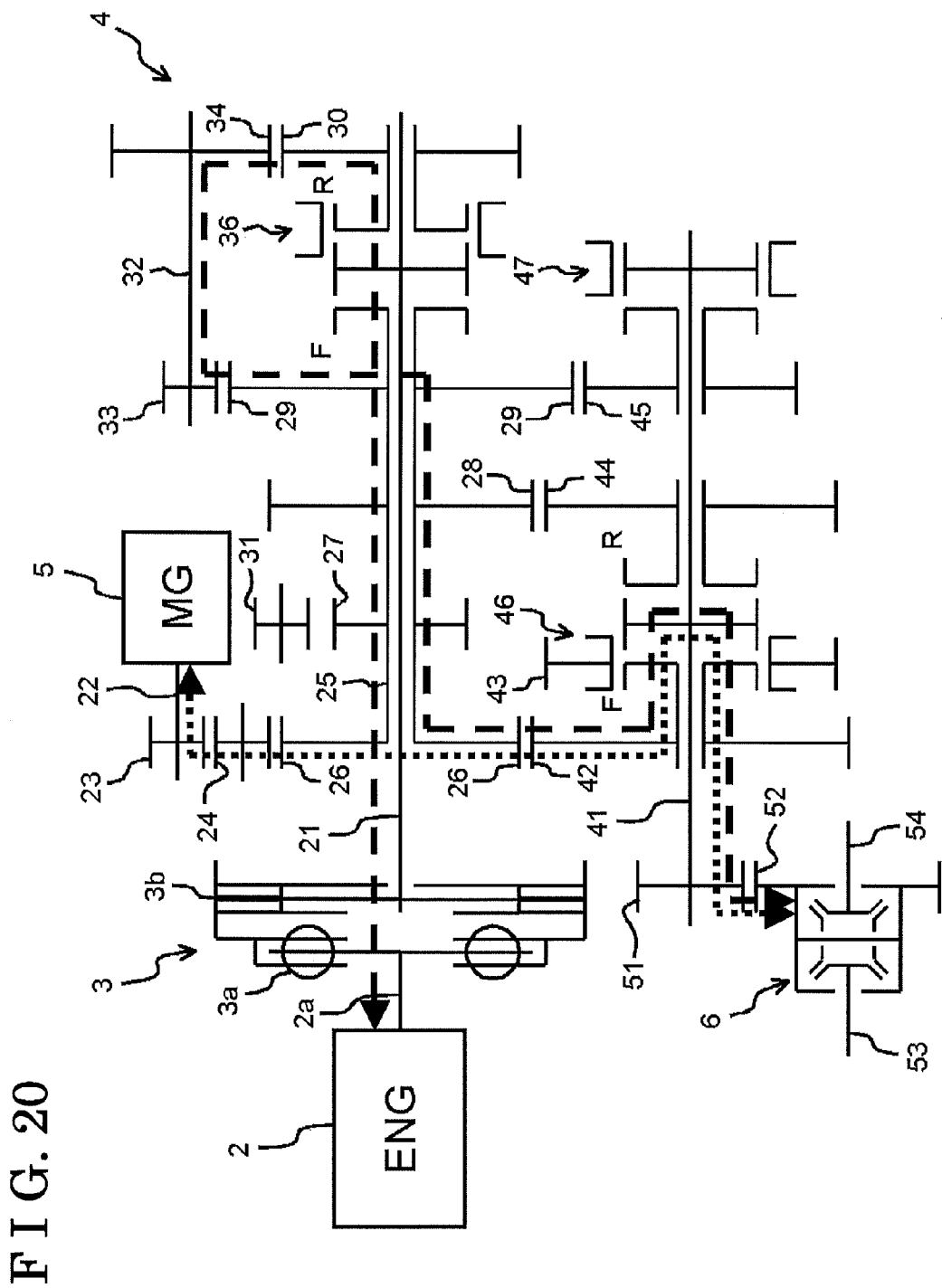
FIG. 20 is a schematic view illustrating a power transmitting path of the vehicle drive system according to the third embodiment when the vehicle drive system is in a 1st speed hybrid driving mode.

[1st speed hybrid driving mode] As illustrated in FIGS. 14 and 20, in a state where the vehicle drive system 1 is in a 1st speed hybrid driving mode (corresponding to a 1st speed HV driving mode), the clutch 3 is in the ON state (the engaged state), the first connecting-disconnecting mechanism 36 is in the ON state (the connected state) at the R-side, the second connecting-disconnecting mechanism 46 is in the ON (the connected state) at the F-side, the third connecting-disconnecting mechanism 47 is in the OFF state (the disconnected state), and the reverse idler gear 31 is in the OFF state (the disengaged state). In those circumstances, the power transmitting path is configured between the engine 2 and the differential mechanism 6 via the crankshaft 2a, the clutch 3, the input shaft 21, the first connecting-disconnecting mechanism 36, the fifth drive gear 30, the second idler gear 34, the shaft 32, the first idler gear 33, the fourth drive gear 29, the shaft 25, the first drive gear 26, the first driven gear 42, the second connecting-disconnecting mechanism 46, and the output shaft 41. Moreover, the power transmitting path is configured between the motor generator 5 and the differential mechanism 6 via the input shaft 22, the input drive gear 23, the input idler gear 24, the first drive gear 26, the first driven gear 42, the second connecting-disconnecting mechanism 46, and the output shaft 41. As a result, the engine 2 may drive the hybrid vehicle or may exert the braking effect on the hybrid vehicle (engine braking). In addition, the motor generator 5 may drive the hybrid vehicle or may regenerate electric power. The HV (Hybrid Vehicle) driving mode corresponds to a state where the hybrid vehicle is driven by both the engine 2 and the motor generator 5.

Figure 21:
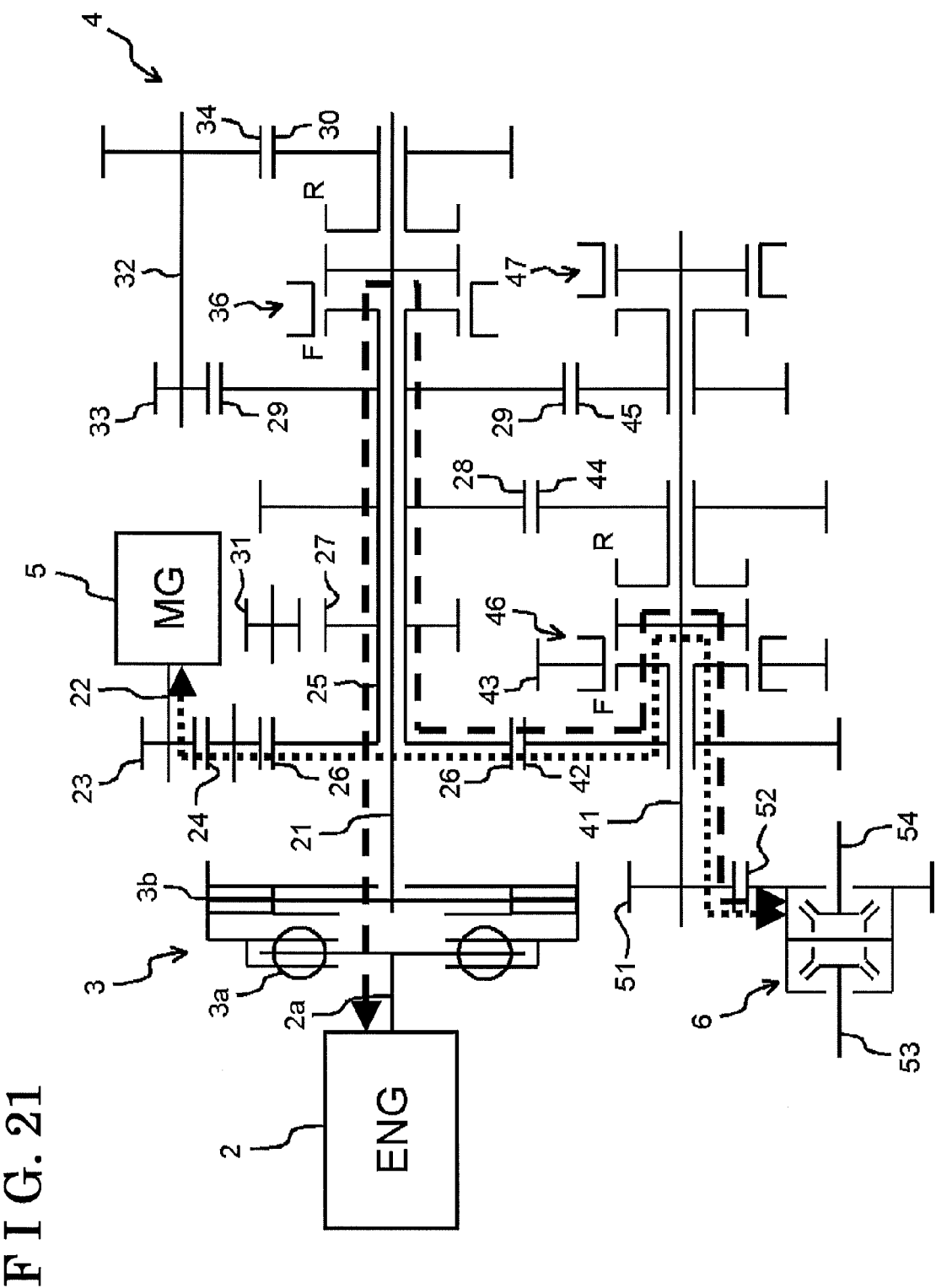
FIG. 21 is a schematic view illustrating a power transmitting path of the vehicle drive system according to the third embodiment when the vehicle drive system is in a 2nd speed hybrid driving mode.

[2nd speed hybrid driving mode] As illustrated in FIGS. 14 and 21, in a state where the vehicle drive system 1 is in a 2nd speed hybrid driving mode (corresponding to a 2nd speed HV driving mode), the clutch 3 is in the ON state (the engaged state), the first connecting-disconnecting mechanism 36 is in the ON state (the connected state) at the F-side, the second connecting-disconnecting mechanism 46 is in the ON (the connected state) at the F-side, the third connecting-disconnecting mechanism 47 is in the OFF state (the disconnected state), and the reverse idler gear 31 is in the OFF state (the disengaged state). In those circumstances, the power transmitting path is configured between the engine 2 and the differential mechanism 6 via the crankshaft 2a, the clutch 3, the input shaft 21, the first connecting-disconnecting mechanism 36, the shaft 25, the first drive gear 26, the first driven gear 42, the second connecting-disconnecting mechanism 46, and the output shaft 41. Moreover, the power transmitting path is configured between the motor generator 5 and the differential mechanism 6 via the input shaft 22, the input drive gear 23, the input idler gear 24, the first drive gear 26, the first driven gear 42, the second connecting-disconnecting mechanism 46, and the output shaft 41. As a result, the engine 2 may drive the hybrid vehicle or may exert the braking effect on the hybrid vehicle (engine braking). In addition, the motor generator 5 may drive the hybrid vehicle or may regenerate electric power.

Figure 22:
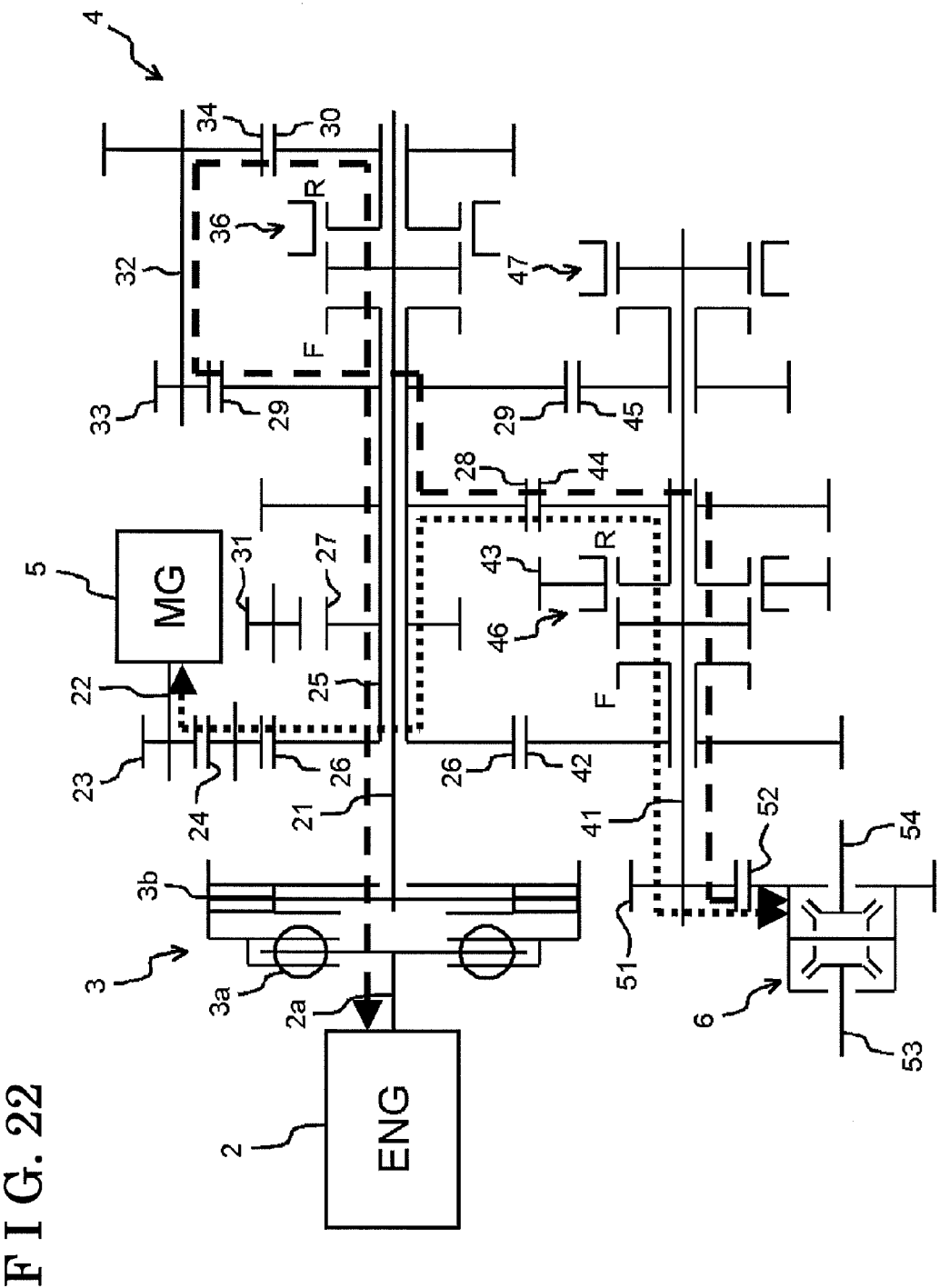
FIG. 22 is a schematic view illustrating a power transmitting path of the vehicle drive system according to the third embodiment when the vehicle drive system is in a 2.5th speed hybrid driving mode.

[2.5th speed hybrid driving mode] As illustrated in FIGS. 14 and 22, in a state where the vehicle drive system 1 is in a 2.5th speed hybrid driving mode (corresponding to a 2.5th speed HV driving mode), the clutch 3 is in the ON state (the engaged state), the first connecting-disconnecting mechanism 36 is in the ON state (the connected state) at the R-side, the second connecting-disconnecting mechanism 46 is in the ON state (the connected state) at the R-side, the third connecting-disconnecting mechanism 47 is in the OFF state (the disconnected state), and the reverse idler gear 31 is in the OFF state (the disengaged state). In those circumstances, the power transmitting path is configured between the engine 2 and the differential mechanism 6 via the crankshaft 2a, the clutch 3, the input shaft 21, the first connecting-disconnecting mechanism 36, the fifth drive gear 30, the second idler gear 34, the shaft 32, the first idler gear 33, the fourth drive gear 29, the shaft 25, the third drive gear 28, the third driven gear 44, the second connecting-disconnecting mechanism 46, and the output shaft 41. Moreover, the power transmitting path is configured between the motor generator 5 and the differential mechanism 6 via the input shaft 22, the input drive gear 23, the input idler gear 24, the first drive gear 26, the shaft 25, the third drive gear 28, the third driven gear 44, the second connecting-disconnecting mechanism 46, and the output shaft 41. As a result, the engine 2 may drive the hybrid vehicle or may exert the braking effect on the hybrid vehicle (engine braking). In addition, the motor generator 5 may drive the hybrid vehicle or may regenerate electric power. In addition, the 2.5th speed HV driving mode may be omitted.

Figure 23:
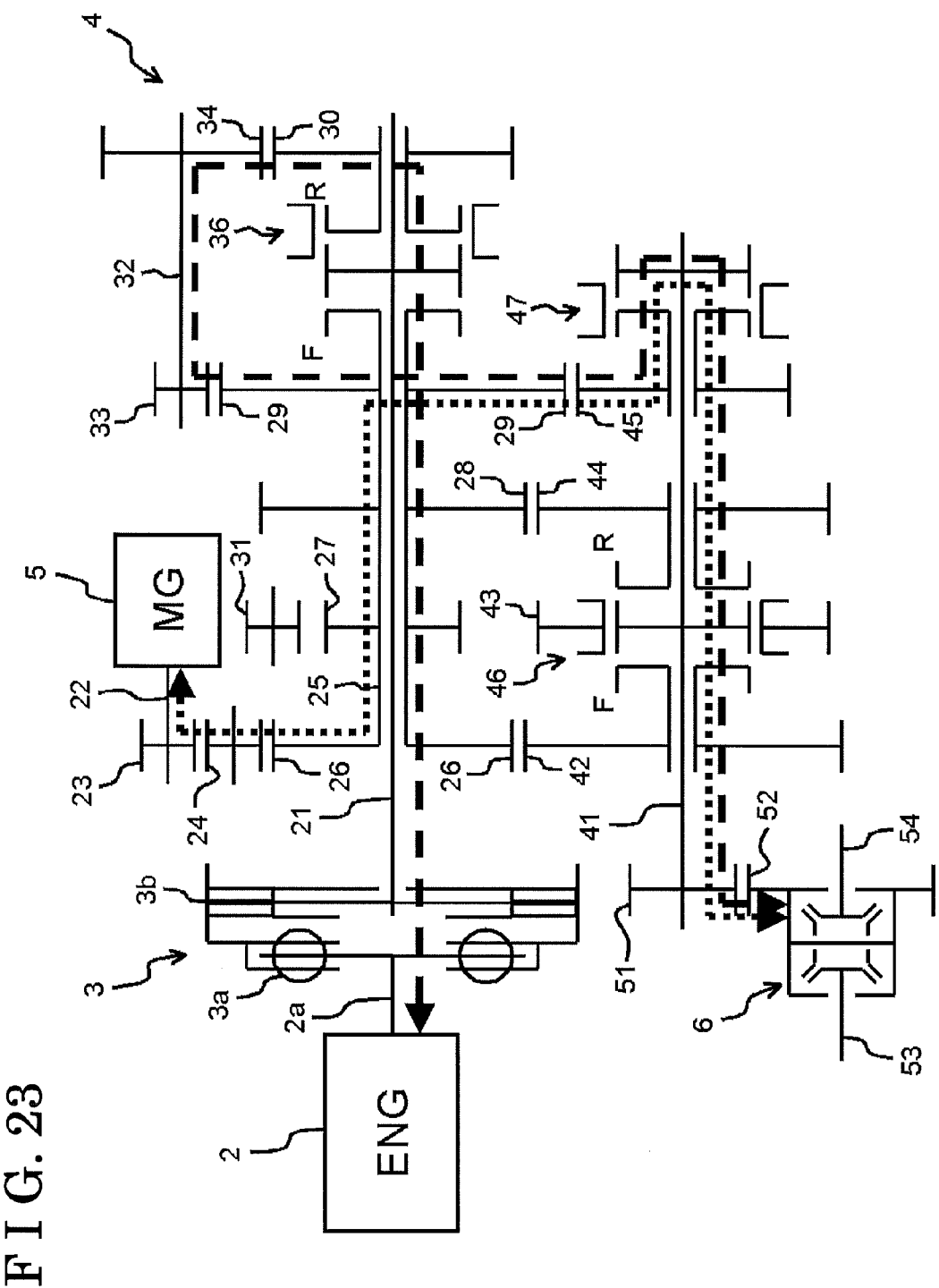
FIG. 23 is a schematic view illustrating a power transmitting path of the vehicle drive system according to the third embodiment when the vehicle drive system is in a 3rd speed hybrid driving mode.

[3rd speed hybrid driving mode] As illustrated in FIGS. 14 and 23, in a state where the vehicle drive system 1 is in a 3rd speed hybrid driving mode (corresponding to a 3rd speed HV driving mode), the clutch 3 is in the ON state (the engaged state), the first connecting-disconnecting mechanism 36 is in the ON state (the connected state) at the R-side, the second connecting-disconnecting mechanism 46 is in the neutral state, the third connecting-disconnecting mechanism 47 is in the ON state (the connected state), and the reverse idler gear 31 is in the OFF state (the disengaged state). In those circumstances, the power transmitting path is configured between the engine 2 and the differential mechanism 6 via the crankshaft 2a, the clutch 3, the input shaft 21, the first connecting-disconnecting mechanism 36, the fifth drive gear 30, the second idler gear 34, the shaft 32, the first idler gear 33, the fourth drive gear 29, the fourth driven gear 45, the third connecting-disconnecting mechanism 47, and the output shaft 41. Moreover, the power transmitting path is configured between the motor generator 5 and the differential mechanism 6 via the input shaft 22, the input drive gear 23, the input idler gear 24, the first drive gear 26, the shaft 25, the fourth drive gear 29, the fourth driven gear 45, the third connecting-disconnecting mechanism 47, and the output shaft 41. As a result, the engine 2 may drive the hybrid vehicle or may exert the braking effect on the hybrid vehicle (engine braking). In addition, the motor generator 5 may drive the hybrid vehicle or may regenerate electric power.

Figure 24:
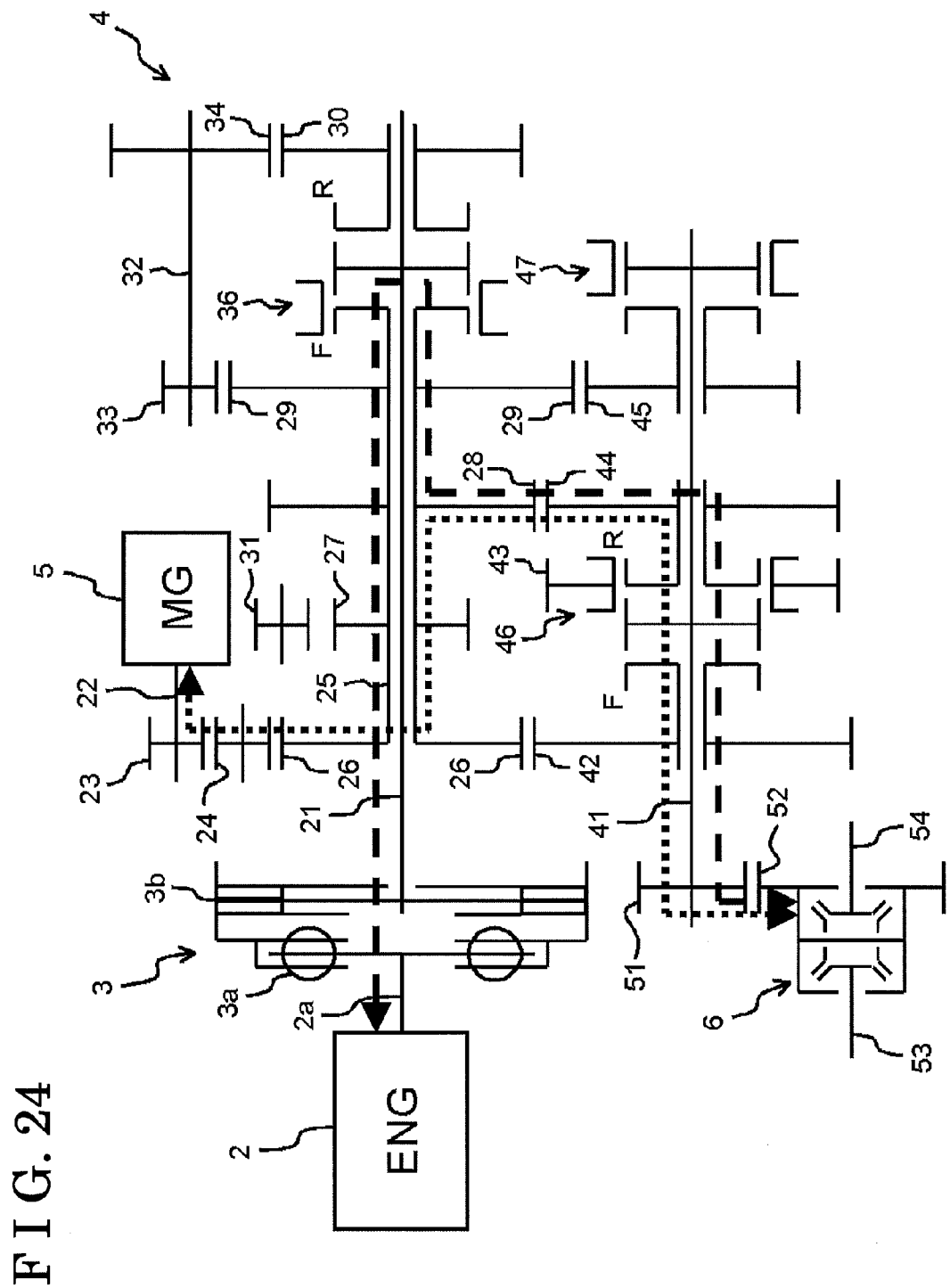
FIG. 24 is a schematic view illustrating a power transmitting path of the vehicle drive system according to the third embodiment when the vehicle drive system is in a 4th speed hybrid driving mode.

[4th speed hybrid driving mode] As illustrated in FIGS. 14 and 24, in a state where the vehicle drive system 1 is in a 4th speed hybrid driving mode (corresponding to a 4th speed HV driving mode), the clutch 3 is in the ON state (the engaged state), the first connecting-disconnecting mechanism 36 is in the ON state (the connected state) at the F-side, the second connecting-disconnecting mechanism 46 is in the ON state (the connected state) at the R-side, the third connecting-disconnecting mechanism 47 is in the OFF state (the disconnected state), and the reverse idler gear 31 is in the OFF state (the disengaged state). In those circumstances, the power transmitting path is configured between the engine 2 and the differential mechanism 6 via the crankshaft 2a, the clutch 3, the input shaft 21, the first connecting-disconnecting mechanism 36, the shaft 25, the third drive gear 28, the third driven gear 44, the second connecting-disconnecting mechanism 46, and the output shaft 41. Moreover, the power transmitting path is configured between the motor generator 5 and the differential mechanism 6 via the input shaft 22, the input drive gear 23, the input idler gear 24, the first drive gear 26, the shaft 25, the third drive gear 28, the third driven gear 44, the second connecting-disconnecting mechanism 46, and the output shaft 41. As a result, the engine 2 may drive the hybrid vehicle or may exert the braking effect on the hybrid vehicle (engine braking). In addition, the motor generator 5 may drive the hybrid vehicle or may regenerate electric power.

Figure 25:
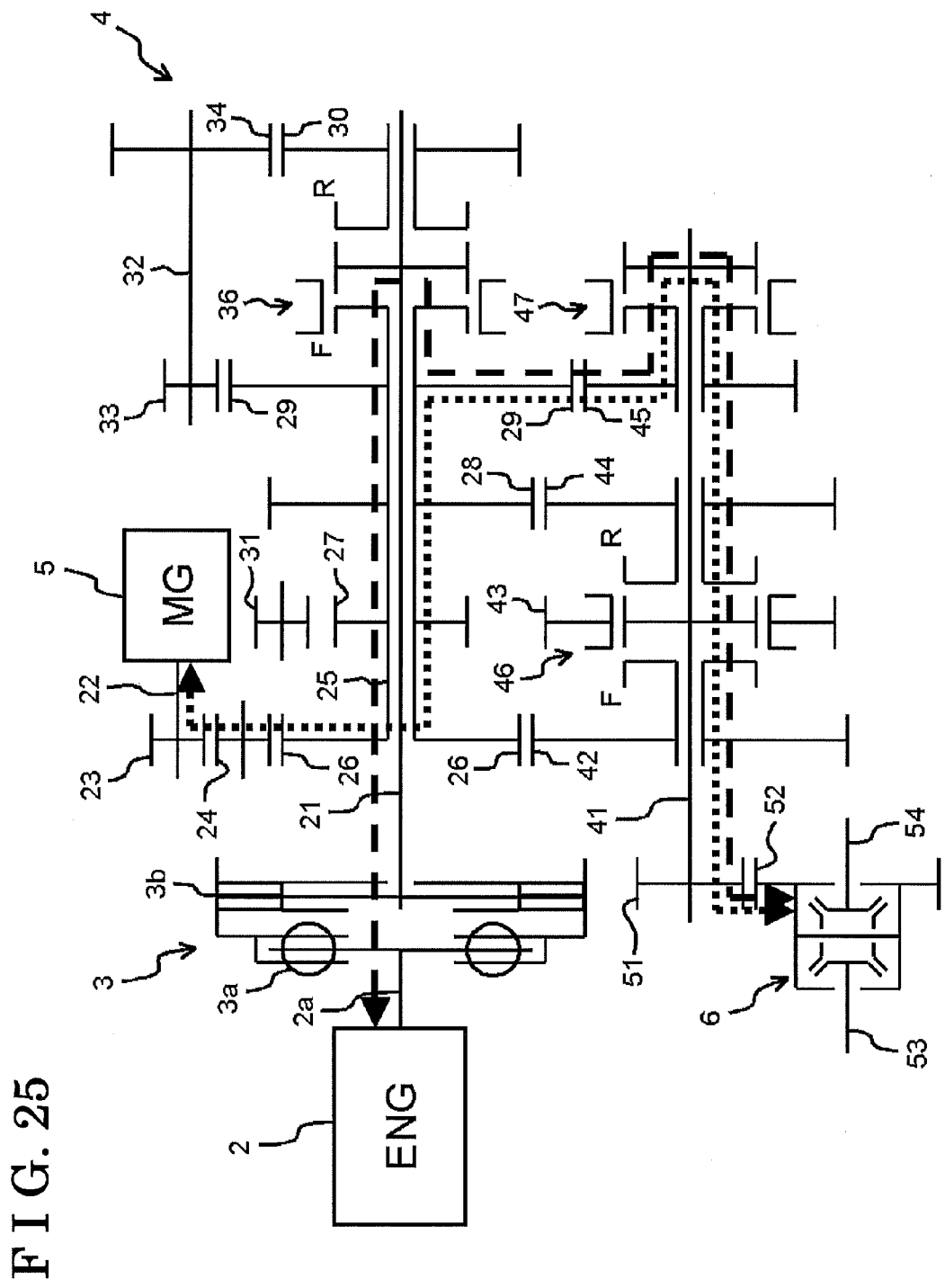
FIG. 25 is a schematic view illustrating a power transmitting path of the vehicle drive system according to the third embodiment when the vehicle drive system is in a 5th speed hybrid driving mode.

[5th speed hybrid driving mode] As illustrated in FIGS. 14 and 25, in a state where the vehicle drive system 1 is in a 5th speed hybrid driving mode (corresponding to a 5th speed HV driving mode), the clutch 3 is in the ON state (the engaged state), the first connecting-disconnecting mechanism 36 is in the ON state (the connected state) at the F-side, the second connecting-disconnecting mechanism 46 is in the neutral state, the third connecting-disconnecting mechanism 47 is in the ON state (the connected state), and the reverse idler gear 31 is in the OFF state (the disengaged state). In those circumstances, the power transmitting path is configured between the engine 2 and the differential mechanism 6 via the crankshaft 2a, the clutch 3, the input shaft 21, the first connecting-disconnecting mechanism 36, the shaft 25, the fourth drive gear 29, the fourth driven gear 45, the third connecting-disconnecting mechanism 47, and the output shaft 41. Moreover, the power transmitting path is configured between the motor generator 5 and the differential mechanism 6 via the input shaft 22, the input drive gear 23, the input idler gear 24, the first drive gear 26, the shaft 25, the fourth drive gear 29, the fourth driven gear 45, the third connecting-disconnecting mechanism 47, and the output shaft 41. As a result, the engine 2 may drive the hybrid vehicle or may exert the braking effect on the hybrid vehicle (engine braking). In addition, the motor generator 5 may drive the hybrid vehicle or may regenerate electric power.

The vehicle drive system 1 according to the third embodiment has effects similar to those of the vehicle drive system 1 according to the first embodiment. In addition, in a condition where the vehicle drive system 1 is in the 1st, 2nd, 2.5th, 3rd, 4th, and 5th speed HV driving modes, the motor generator 5 may assist the driving operation of the engine 2 for the hybrid vehicle and may regenerate electric power. Therefore, the motor generator 5 may generate electric power and start the engine 2 when the hybrid vehicle is not moving.

Figure 26:
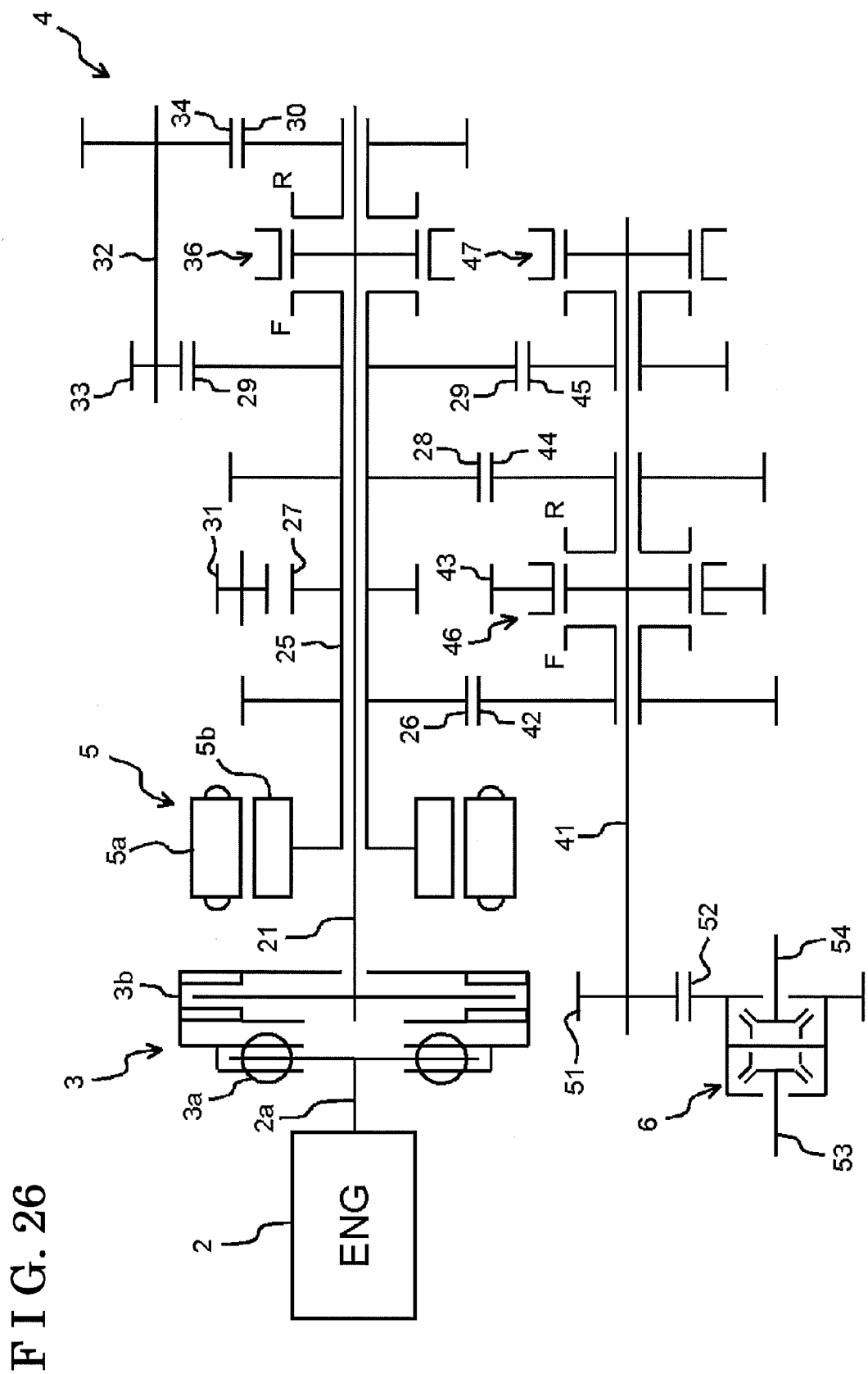
FIG. 26 is a schematic view illustrating a configuration of a power transmitting path of the vehicle drive system according to a fourth embodiment disclosed here.

The vehicle drive system 1 according to a fourth embodiment of the disclosure will be explained as follows with reference to FIG. 26.

The fourth embodiment is a modified example of the third embodiment. In the vehicle drive system 1 of the fourth embodiment, the input shaft 22, the input drive gear 23, and the input idler gear 24 according to the third embodiment (see FIG. 13) are not utilized as a means to transmit the driving force of the motor generator 5 to the shaft 25. Alternatively, a rotor 5b of the motor generator 5 is directly connected to the shaft 25 so that the driving force of the motor generator 5 is transmitted to the shaft 25. The motor generator 5 including a stator 5a and the rotor 5b. The motor generator 5 is configured so that the rotor 5b rotates at an inner circumferential side of the stator 5a. The motor generator 5 is arranged between the clutch 3 and the first drive gear 26. The stator 5a is fixed to the housing of the transmission 4. The rotor 5b integrally rotates with the shaft 25 at the inner circumferential side of the stator 5a. Other configurations and the operation of the motor generator 5 according to the fourth embodiment are similar to those of the motor generator 5 according to the third embodiment.

The vehicle drive system 1 of the fourth embodiment has effects similar to those of the vehicle drive system 1 of the third embodiment.

Figure 27:
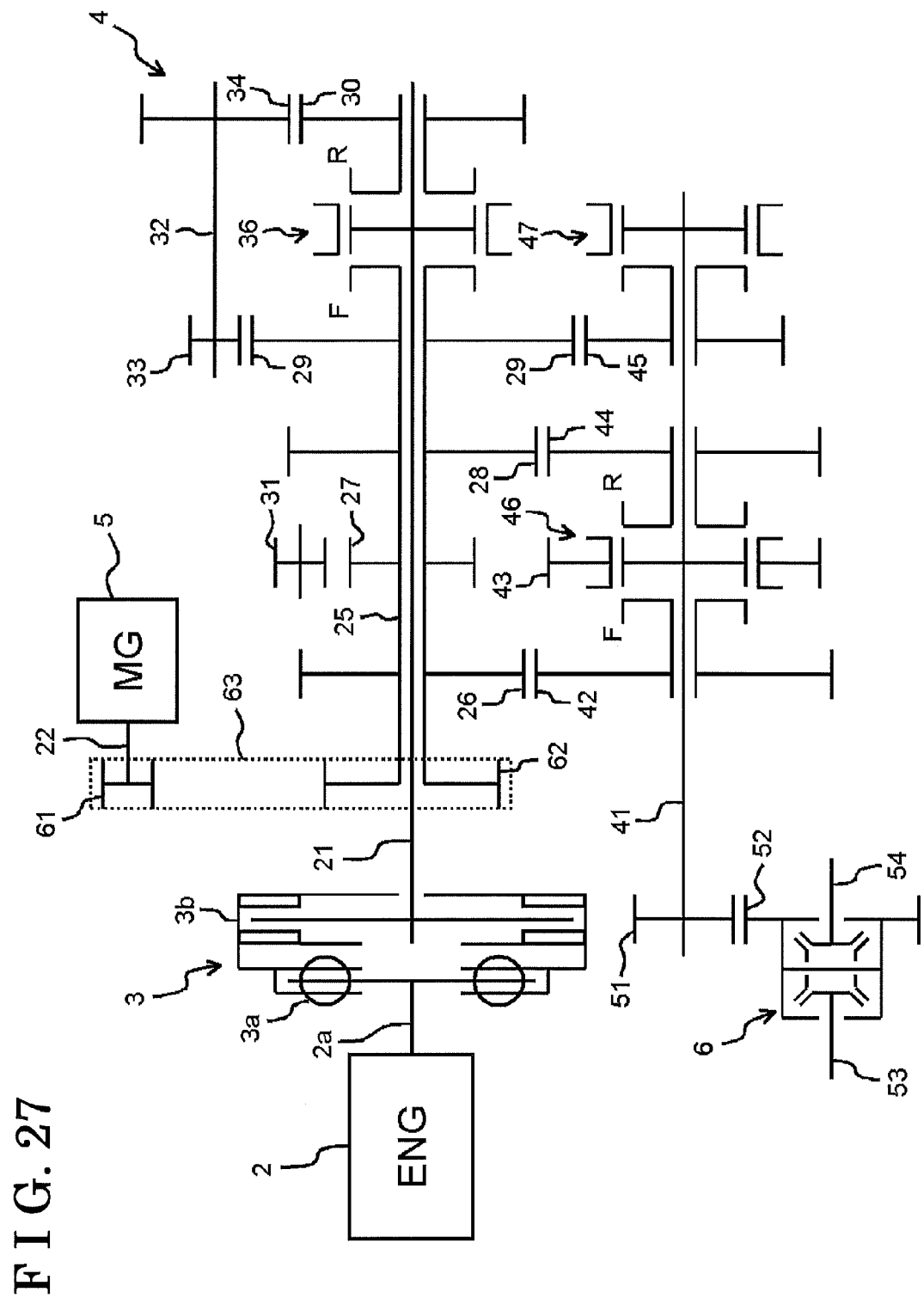
FIG. 27 is a schematic view illustrating a configuration of a power transmitting path of the vehicle drive system according to a fifth embodiment disclosed here.

The vehicle drive system 1 according to a fifth embodiment of the disclosure will be explained as follows with reference to FIG. 27.

In the vehicle drive system 1 of the fifth embodiment, the input drive gear 23 and the input idler gear 24 according to the third embodiment (see FIG. 13) are not utilized as the means to transmit the driving force of the motor generator 5 to the shaft 25. Alternatively, a drive sprocket 61 is attached to the input shaft 22 to which the driving force of the motor generator 5 is inputted. In addition, a driven sprocket 62 is attached to the shaft 25 and a chain 63 is wound around the drive sprocket 61 and the driven sprocket 62. The drive sprocket 61 integrally rotates with the input shaft 22 and engages with the chain 63. The driven sprocket 62 integrally rotates with the shaft 25 and engages with the chain 63. Other configurations and the operation of the motor generator 5 according to the fifth embodiment are similar to those of the motor generator 5 according to the third embodiment.

The vehicle drive system 1 of the fifth embodiment has effects similar to those of the vehicle drive system 1 of the third embodiment.

Figure 28:
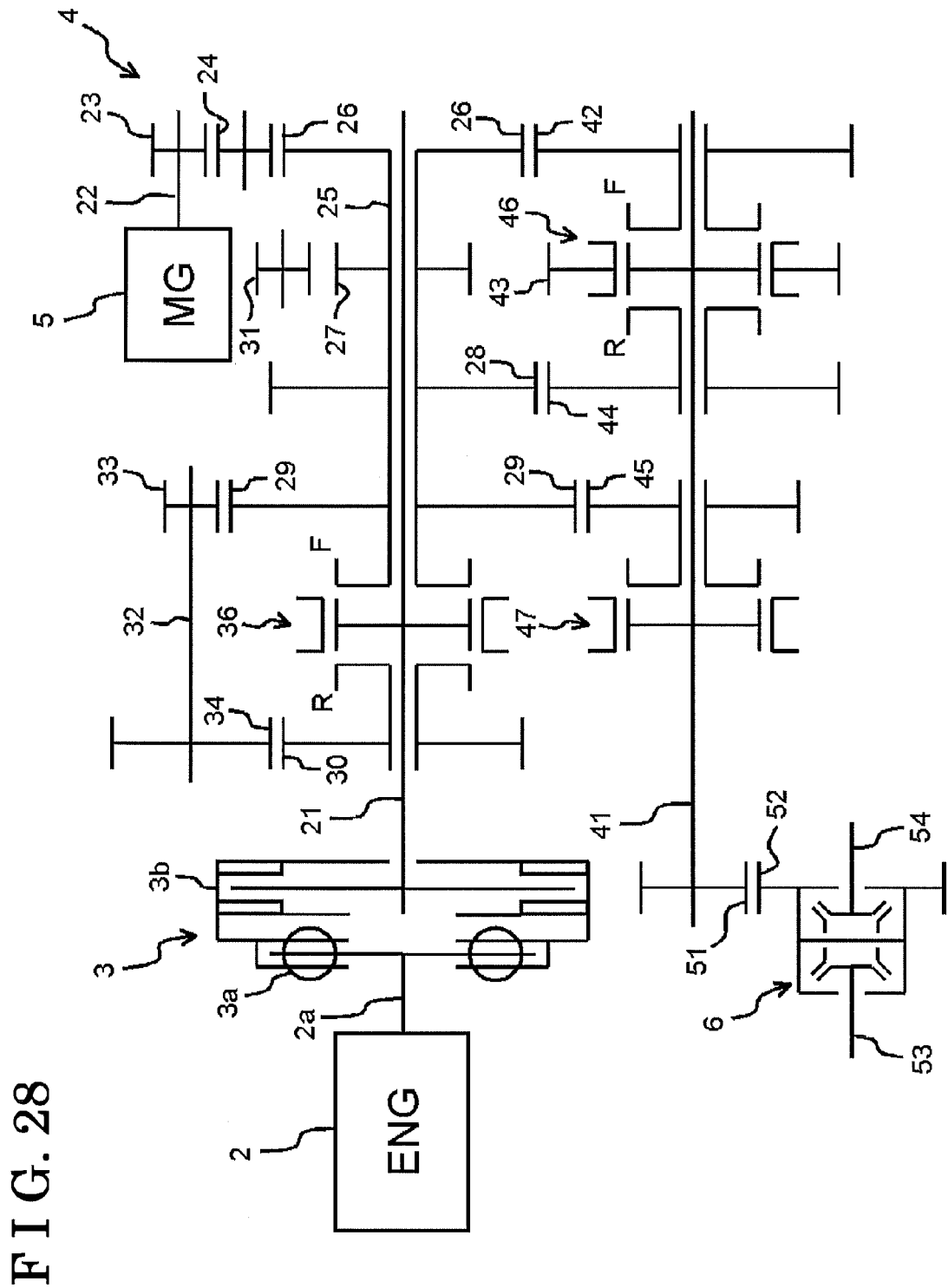
FIG. 28 is a schematic view illustrating a configuration of a power transmitting path of the vehicle drive system according to a sixth embodiment disclosed here.

The vehicle drive system 1 according to a sixth embodiment of the disclosure will be explained as follows with reference to FIG. 28.

The sixth embodiment is a modified example of the third embodiment. According to the vehicle drive system 1 of the third embodiment, as illustrated in FIG. 13, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side where the engine 2 is axially provided. On the other hand, according to the vehicle drive system 1 of the sixth embodiment, as illustrated in FIG. 28, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side opposite to the side where the engine 2 is axially provided. Further, according to the vehicle drive system 1 of the third embodiment, as illustrated in FIG. 13, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side where the engine 2 is axially provided. On the other hand, according to the vehicle drive system 1 of the sixth embodiment, as illustrated in FIG. 28, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side opposite to the side where the engine 2 is axially provided. Furthermore, according to the vehicle drive system 1 of the third embodiment, as illustrated in FIG. 13, the first idler gear 33 and the second idler gear 34 are arranged along the shaft 32 in the mentioned order from the side where the engine 2 is axially provided. On the other hand, according to the vehicle drive system 1 of the sixth embodiment, as illustrated in FIG. 28, the first idler gear 33 and the second idler gear 34 are arranged along the shaft 32 in the mentioned order from the side opposite to the side where the engine 2 is axially provided. Other configurations and effects of the vehicle drive system 1 of the sixth embodiment are similar to those of the vehicle drive system 1 of the third embodiment.

The vehicle drive system 1 according to the sixth embodiment has effects similar to those of the vehicle drive system 1 of the third embodiment.

Figure 29:
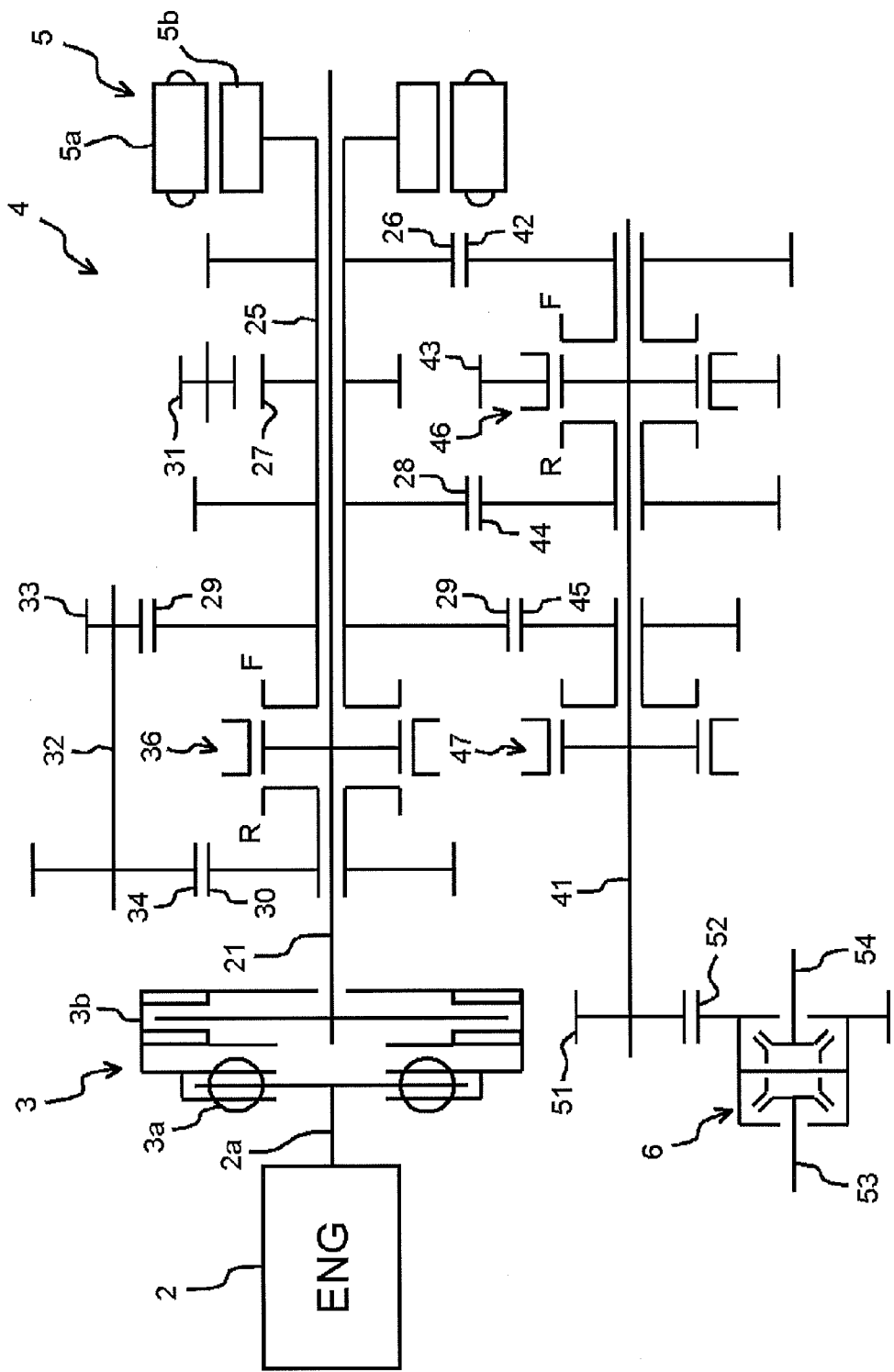
FIG. 29 is a schematic view illustrating a configuration of a power transmitting path of the vehicle drive system according to a seventh embodiment disclosed here.

The vehicle drive system 1 according to a seventh embodiment will be explained as follows with reference to FIG. 29.

The seventh embodiment is a modified example of the fourth embodiment. According to the vehicle drive system 1 of the fourth embodiment, as illustrated in FIG. 26, the motor generator 5, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side where the engine 2 is axially provided. On the other hand, according to the vehicle drive system 1 of the seventh embodiment, as illustrated in FIG. 29, the motor generator 5, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side opposite to the side where the engine 2 is axially provided. Further, according to the vehicle drive system 1 of the fourth embodiment, as illustrated in FIG. 26, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side where the engine 2 is axially provided. On the other hand, according to the vehicle drive system 1 of the seventh embodiment, as illustrated in FIG. 29, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side opposite to the side where the engine 2 is axially provided. Furthermore, according to the vehicle drive system 1 of the fourth embodiment, as illustrated in FIG. 26, the first idler gear 33 and the second idler gear 34 are arranged along the shaft 32 in the mentioned order from the side where the engine 2 is axially provided. On the other hand, according to the vehicle drive system 1 of the sixth embodiment, as illustrated in FIG. 29, the first idler gear 33 and the second idler gear 34 are arranged along the shaft 32 in the mentioned order from the side opposite to the side where the engine 2 is axially provided. Other configurations and effects of the vehicle drive system 1 of the seventh embodiment are similar to those of the vehicle drive system 1 of the fourth embodiment.

The vehicle drive system 1 according to the seventh embodiment has effects similar to those of the vehicle drive system 1 according to the fourth embodiment.

Figure 30:
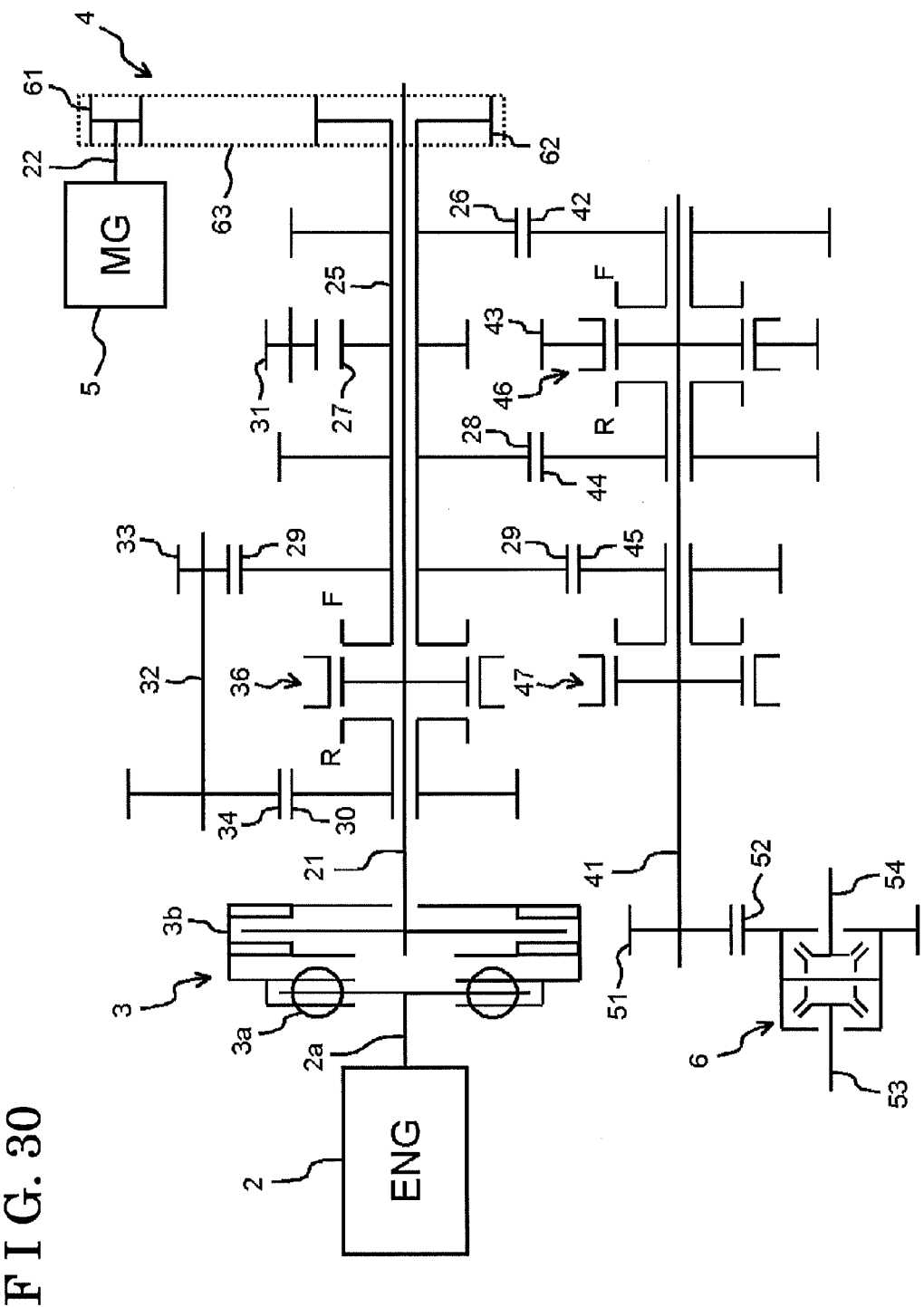
FIG. 30 is a schematic view illustrating a configuration of a power transmitting path of the vehicle drive system according to an eighth embodiment disclosed here.

The vehicle drive system 1 according to an eighth embodiment of the disclosure will be explained as follows with reference to FIG. 30.

The eighth embodiment is a modified example of the fifth embodiment. According to the vehicle drive system 1 of the fifth embodiment, as illustrated in FIG. 27, the driven sprocket 62, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side where the engine 2 is axially provided. On the other hand, according to the vehicle drive system 1 of the eighth embodiment, as illustrated in FIG. 30, the driven sprocket 62, the first drive gear 26, the second drive gear 27, the third drive gear 28, the fourth drive gear 29, the first connecting-disconnecting mechanism 36, and the fifth drive gear 30 are arranged along the input shaft 21 in the mentioned order from the side opposite to the side where the engine 2 is axially provided. Further, according to the vehicle drive system 1 of the fifth embodiment, as illustrated in FIG. 27, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side where the engine 2 is axially provided. On the other hand, according to the vehicle drive system 1 of the eighth embodiment, as illustrated in FIG. 30, the first driven gear 42, the second connecting-disconnecting mechanism 46 (including the second driven gear 43), the third driven gear 44, the fourth driven gear 45, and the third connecting-disconnecting mechanism 47 are arranged along the output shaft 41 in the mentioned order from the side opposite to the side where the engine 2 is axially provided. Furthermore, according to the vehicle drive system 1 of the fifth embodiment, as illustrated in FIG. 27, the first idler gear 33 and the second idler gear 34 are arranged along the shaft 32 in the mentioned order from the side where the engine 2 is axially provided. On the other hand, according to the vehicle drive system 1 of the eighth embodiment, as illustrated in FIG. 30, the first idler gear 33 and the second idler gear 34 are arranged along the shaft 32 in the mentioned order from the side opposite to the side where the engine 2 is axially provided. Other configurations and effects of the vehicle drive system 1 of the eighth embodiment are similar to those of the vehicle drive system 1 of the fifth embodiment.

The vehicle drive system 1 according to the eighth embodiment has effects similar to those of the vehicle drive system 1 according to the fifth embodiment.

As described above, according to the aforementioned embodiments, the vehicle drive system 1 includes the input shaft 21 to which the driving force of the engine 2 is inputted, the shaft 25 arranged coaxially with the input shaft 21 to idly rotate relative to the input shaft 21 and being connectable with the input shaft 21, the shaft 25 being provided with the plural drive gears 26, 28, and 29 having a different number of gear teeth from one another, the fifth drive gear 30 arranged coaxially with the input shaft 21 to idly rotate relative to the input shaft 21 and being connectable with the input shaft 21, the shaft 32 arranged parallel to the input shaft 21 and being provided with the first idler gear 33 and the second idler gear 34 that have a different number of gear teeth from each other, the first idler gear 33 engaging with a predetermined drive gear 29 of the plural drive gears 26, 28, and 29, the second idler gear 34 engaging with the fifth drive gear 30, the output shaft 41 arranged parallel to the input shaft 21 and outputting the driving force to the wheels 7 and 8, and the plural driven gears 42, 44, and 45 arranged coaxially with the output shaft 41 to idly rotate relative to the output shaft 41 and being connectable with the output shaft 41, the plural driven gears 42, 44, and 45 engaging with the plural drive gears 26, 28, and 29, respectively.

According to the aforementioned configuration, the vehicle drive system 1 of the embodiments may increase the number of gear stages while restraining increases in weight and costs to the minimum.

According to the aforementioned embodiments, the vehicle drive system 1 further includes the first connecting-disconnecting mechanism 36 selecting one of the shaft 25 and the fifth drive gear 30, the first connecting-disconnecting mechanism 36 selectively connecting and disconnecting the selected one of the shaft 25 and the fifth drive gear 30 to/from the input shaft 21.

According to the aforementioned embodiments, the vehicle drive system 1 further includes the second connecting-disconnecting mechanism 46 and the third connecting-disconnecting mechanism 47. The plural drive gears 26, 28, and 29 include the first drive gear 26 integrally rotating with the shaft 25, the third drive gear 28 integrally rotating with the shaft 25 and having the diameter different from the diameter of the first drive gear 26, and the fourth drive gear 29 integrally rotating with the shaft 25 and having the diameter different from the diameters of the first drive gear 26 and the third drive gear 28. The plural driven gears 42, 44, and 45 include the first driven gear 42 engaging with the first drive gear 26, the third driven gear 44 engaging with the third drive gear 28, and the fourth driven gear 45 engaging with the fourth drive gear 29. The second connecting-disconnecting mechanism 46 selects one of the first driven gear 42 and the third driven gear 44 to selectively connect and disconnect the selected one of the first driven gear 42 and the third driven gear 44 to/from the output shaft 41. The third connecting-disconnecting mechanism 47 selectively connects and disconnects the fourth driven gear 45 to/from the output shaft 41.

According to the aforementioned third, fourth, fifth, sixth, seventh, and eighth embodiments, the vehicle drive system 1 further includes the motor generator 5. The driving force of the motor generator 5 is inputted to the shaft 25.

According to the aforementioned third and sixth embodiments, the vehicle drive system 1 further includes the input drive gear 23 to which the driving force of the motor generator 5 is transmitted, and the input idler gear 24 engaging with the input drive gear 23 and the first drive gear 26.

According to the aforementioned fourth and seventh embodiments, the driving force of the motor generator 5 is directly inputted to the shaft 25.

According to the aforementioned fifth and eighth embodiments, the vehicle drive system 1 further includes the drive sprocket 61 to which the driving force of the motor generator 5 is transmitted, the driven sprocket 62 integrally rotating with the shaft 25, and the chain 63 engaging with and wound around the drive sprocket 61 and the driven sprocket 62.

According to the aforementioned first, third, fourth, and fifth embodiments, the first drive gear 26, the third drive gear 28, the fourth drive gear 29, the first connecting-disconnecting mechanism 36, and the fifth drive gear 30 are arranged along the input shaft 21 in the mentioned order from the side where the engine 2 is axially provided. The first driven gear 42, the second connecting-disconnecting mechanism 46, the third driven gear 44, the fourth driven gear 45, and the third connecting-disconnecting mechanism 47 are arranged along the output shaft 41 in the mentioned order from the side where the engine 2 is axially provided.

According to the aforementioned second, sixth, seventh, and eighth embodiments, the first drive gear 26, the third drive gear 28, the fourth drive gear 29, the first connecting-disconnecting mechanism 36, and the fifth drive gear 30 are arranged along the input shaft 21 in the mentioned order from the side opposite to the side where the engine 2 is axially provided. The first driven gear 42, the second connecting-disconnecting mechanism 46, the third driven gear 44, the fourth driven gear 45, and the third connecting-disconnecting mechanism 47 are arranged along the output shaft 41 in the mentioned order from the side opposite to the side where the engine 2 is axially provided.

According to the aforementioned embodiments, the vehicle drive system 1 further includes the second drive gear 27 arranged between the first drive gear 26 and the third drive gear 28 to rotate integrally rotate with the shaft 25, the second driven gear 43 integrally rotating with the output shaft 41 via the second connecting-disconnecting mechanism 46, and the reverse idler gear 31 axially movable and engageable with and disengageable from the second drive gear 27 and the second driven gear 43.

A vehicle drive system according to a ninth embodiment will be explained with reference to FIGS. 31 to 44 as follows.

As shown in FIG. 12, a vehicle drive system 1 for driving a hybrid vehicle includes an engine (ENG) (i.e., serving as a first drive source) 2 outputting a torque by an energy of combustion of a fuel, a motor-generator (MG) (i.e., serving as a second drive source) 5 outputting a torque by an electric energy. The vehicle drive system 1 includes a clutch (CL) 3, a transmission (TM) 4, the motor-generator 5, and a differential mechanism (DIF) 6 on a power transmitting path provided between the engine 2 and wheels 7, 8. The vehicle drive system 1 includes an inverter 10, a battery (BAT) 11, an engine control device (ENG-ECU) 12, a transmission control device (TM-ECU) 13', a motor-generator control device (MG-ECU) 14, a battery control device (BAT-ECU) 15, a hybrid control device (HV-ECU) 16, and a sensor 17. The inverter 10, the battery 11, the engine control device 12', the transmission control device 13', the motor-generator control device 14, the battery control device 15, the hybrid control device 16, and the sensor 17 selectively serve as a control system for the engine 2, the clutch 3, the transmission 4, and the motor-generator 5.

Figure 31:
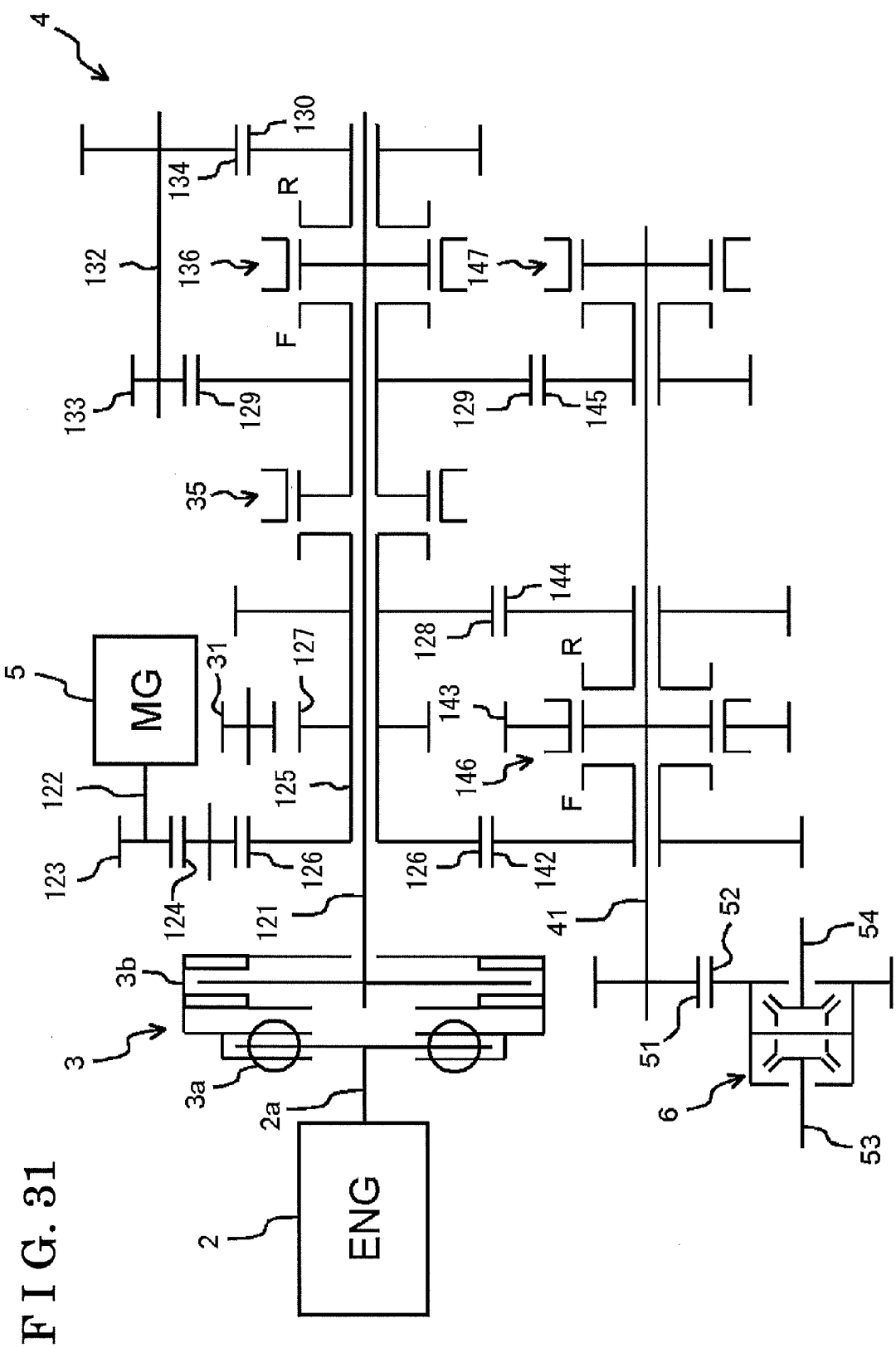
FIG. 31 is a schematic view showing a configuration of a power transmitting path of the vehicle drive system according to the ninth embodiment disclosed here.

The engine 2 is an internal combustion engine for outputting a torque from a crankshaft 2a by a combustion of fuel (e.g., hydrocarbon fuel, for example, gasoline, and diesel, or light oil) (see FIGS. 12 and 31). The torque of the crankshaft 2a is transmitted to an input side member of the clutch 3. The engine 2 includes various sensors (e.g., engine rotation sensor), and actuators (e.g., actuators for actuating a throttle valve and an injector). The engine 2 is communicably connected to the engine control device 12' and is configured to be controlled by the engine control device 12'.

The clutch 3 is provided on a power transmitting path between the engine 2 and the transmission 4, and is configured to connect and disconnect the engine 2 and the transmission 4 so that a torque is transmitted from the engine 2 to the transmission 4 (see FIGS. 12 and 31). The clutch 3 includes a damper 3a and a clutch portion 3b on a power transmitting path positioned between the crankshaft 2a and an input shaft 121 for first gear train. The damper portion 3a is configured to absorb a fluctuation torque, which is generated between an input side member integrally rotating with the crankshaft 2a and an intermediate member connected to an input side of the clutch portion 3b, by means of an elastic force. The clutch portion 3b is configured to transmit a torque from the intermediate member to the input shaft 121 for first gear train by an engagement of the intermediate member connected to an output side of the damper portion 3a and an output side member integrally rotating with the input shaft 121 for first gear train of the transmission 4. The clutch 3 is engaged and disengaged by a clutch actuator actuated by the transmission control device 13'.

The transmission 4 is a gear mechanism which changes a rotation speed, or torque of one of or both of the engine 2 and the motor generator 5 to output the torque to the differential mechanism 6 (see FIGS. 12 and 31). The transmission 4 includes three parallel shafts including the input shaft 121 for first gear train, an output shaft 41 arranged substantially in parallel to the input shaft 121 for first gear train, and a shaft 132 for first gear train arranged substantially in parallel to the input shaft 121 for first and second idler gears 133, 134 (first idler gear 133 for first gear train and second idler gear 134 for first gear train). The transmission 4 includes a five-speed parallel axes type transmission having three shafts, which is configured to establish five forward speed ratios (stages). The transmission 4 includes the input shaft 121 for first gear train, an input shaft 122 for second gear train, an input drive gear 123, an input idler gear 124, a shaft (i.e., serving as a predetermined rotational element) 125 for second gear train, a first drive gear (i.e., serving as a first drive gear for second gear train) 126, a second drive gear (i.e., serving as a third drive gear) 127, a third drive gear (i.e., serving as a second drive gear for second gear train) 128, a fourth drive gear (i.e., serving as a first drive gear for first gear train, serving as a predetermined rotational element) 129, a fifth drive gear (i.e., serving as a second drive gear for first gear train) 130, a reverse idler gear 31, the shaft 132 for first gear train, the first idler gear 133 for first gear train, the second idler gear 134 for first gear train, a main connecting-disconnecting mechanism 35, a first connecting-disconnecting mechanism 136 for first gear train (1st mechanism for 1st gear train), the output shaft 41, a first driven gear 142 for second gear train, a driven gear 143 for reverse, a second driven gear 144 for second gear train, a first driven gear 145 for first gear train, a first connecting-disconnecting mechanism 146 for second gear train (1st mechanism for 2nd gear train), and a second connecting-disconnecting mechanism 147 for first gear train (2nd mechanism for 1st gear train).

The input shaft 121 for first gear train is configured to be inputted with a torque from the engine 2 and integrally rotates with the output side member of the clutch 3 (see FIGS. 12 and 31). The first drive gear 126, the second drive gear 127, the third drive gear 128, the main connecting-disconnecting mechanism 35, the fourth drive gear 129, the first connecting-disconnecting mechanism 136 for first gear train, the fifth drive gear 130 are arranged on an outer circumference of the input shaft 121 for first gear train in the mentioned order from a side where the clutch 3 is positioned. The input shaft 121 for first gear train is rotatably supported by a housing of the transmission 4. The input shaft 121 for first gear train idly supports the tubular shaft 125 for second gear train which integrally rotates with the first drive gear 126, the second drive gear 127, and the third drive gear 128 so as to be idly rotatable. The input shaft 121 for first gear train idly supports the fourth drive gear 129 so as to be idly rotatable. The input shaft 121 for first gear train idly supports the fifth drive gear 130 so as to be idly rotatable. The input shaft 121 for first gear train is configured to selectively connect to either the fourth drive gear 129 or the fifth drive gear 130 by means of the first connecting-disconnecting mechanism 136 for first gear train which is positioned between the fourth drive gear 129 and the fifth drive gear 130.

The input shaft 122 for second gear train is configured to be inputted with a torque from the motor generator 5 (see FIGS. 12 and 31). The input shaft 122 for second gear train is rotatably supported by the housing of the transmission 4. The input shaft 122 for second gear train integrally rotates with the input drive gear 123. The input shaft 122 for second gear train serves as an element for a gear train for electric drive (i.e., serving as a second gear train), which is configured to transmit a torque outputted from the motor generator 5.

The input drive gear 123 is configured to rotate the input idler gear 124 by the torque outputted from the motor generator 5 (see FIG. 31). The input drive gear 123 integrally rotates with the input shaft 122 for second gear train. The input drive gear 123 is meshed with the input idler gear 124. The input drive gear 123 is an element of the gear train for electric drive (i.e., serving as a second gear train), which is configured to transmit a torque outputted from the motor generator 5.

The input idler gear 124 is configured to rotate the first drive gear 126 by the torque transmitted via the input drive gear 123 (see FIG. 31). The input idler gear 124 is rotatably supported by the housing of the transmission 4. The input idler gear 124 is engaged with the input drive gear 123 and the first drive gear 126. The input idler gear 124 is an element for the gear train for electric drive (i.e., serving as a second gear train), which is configured to transmit a torque outputted from the motor generator 5.

The shaft 125 for second gear train formed in a circular tubular shape is idly supported by the input shaft 121 for first gear train so as to be idly rotatable (see FIG. 31). The first drive gear 126, the second drive gear 127, and the third drive gear 128 are arranged on the shaft 125 for second gear train in the mentioned order from the side where the clutch 3 is provided. The shaft 125 for second gear train integrally rotates with the first drive gear 126, the second drive gear 127, and the third drive gear 128. The shaft 125 for second gear train is configured to be connected to the fourth drive gear 129 by means of the main connecting-disconnecting mechanism 35 arranged between the third drive gear 128 and the fourth drive gear 129. The shaft 125 for second gear train is an element for the gear train for electric drive (i.e., serving as a second gear train), which is configured to transmit a torque outputted from the motor generator 5.

The first drive gear 126 is configured to drive the first driven gear 142 for second gear train (see FIG. 31). The first drive gear 126 integrally rotates with the second drive gear 127 and the third drive gear 128 via the shaft 125 for second gear train. The first drive gear 126 is idly supported by the input shaft 121 for first gear train via the shaft 125 for second gear train so as to be idly rotatable. The first drive gear 126 is engaged with the input idler gear 124 and the first driven gear 142 for second gear train. A diameter of the first drive gear 126 is formed to be smaller than a diameter of the third drive gear 128. The first drive gear 126 is an element for the gear train for electric drive (i.e., serving as a second gear train), which is configured to transmit a torque outputted from the motor generator 5.

The second drive gear 127 drives the driven gear 143 for reverse via a reverse idler gear 31 when being engaged with the reverse idler gear 31 (see FIG. 31). The second drive gear 127 is engaged with the reverse idler gear 31 when operating the vehicle in a backward direction, and is not engaged with the reverse idler gear 31 in other drive modes than a reverse mode. The second drive gear 127 integrally rotates with the first drive gear 126 and the third drive gear 128 via the shaft 125 for second gear train. The second drive gear 127 is idly supported by the input shaft 121 for first gear train via the shaft 125 for second gear train so as to be idly rotatable.

The third drive gear 128 is configured to drive the second driven gear 144 for second gear train (see FIG. 31). The third drive gear 128 integrally rotates with the first drive gear 126 and the second drive gear 127 via the shaft 125 for second gear train. The third drive gear 128 is idly supported by the input shaft 121 for first gear train via the shaft 125 for second gear train. The third drive gear 128 is engaged with the second driven gear 144 for second gear train. A diameter of the third drive gear 128 is formed to be greater than a diameter of the first drive gear 126. The third drive gear 128 is an element for the gear train for electric drive (i.e., serving as a second gear train), which is configured to transmit a torque outputted from the motor generator 5.

The fourth drive gear 129 is configured to drive the first driven gear 145 for first gear train (see FIG. 31). The fourth drive gear 129 is idly supported by the input shaft 121 for first gear train so as to be idly rotatable. The fourth drive gear 129 is configured to be connected to the shaft 125 for second gear train by means of the main connecting-disconnecting mechanism 35. The fourth drive gear 129 is configured to be connected to the input shaft 121 for first gear train by means of the first connecting-disconnecting mechanism 136 for first gear train. The fourth drive gear 129 is engaged with the first idler gear 133 for first gear train and the first driven gear 145 for first gear train. A diameter of the fourth drive gear 129 is formed to be greater than a diameter of the fifth drive gear 130. The fourth drive gear 129 is an element for a gear train for engine drive (engine drive mode) (i.e., serving as a first gear train).

The fifth drive gear 130 is configured to drive the second idler gear 134 for first gear train (see FIG. 31). The fifth drive gear 130 is idly supported by the input shaft 121 for first gear train so as to be idly rotatable. The fifth drive gear 130 is configured to be connected to the input shaft 121 for first gear train by means of the first connecting-disconnecting mechanism 136 for first gear train. The fifth drive gear 130 is engaged with the second idler gear 134 for first gear train. The diameter of the fifth drive gear 130 is formed to be smaller than the diameter of the fourth drive gear 129. The fifth drive gear 130 is an element for the gear train for engine drive (i.e., serving as a first gear train).

The reverse idler gear 31 drives the driven gear 143 for reverse by receiving a torque via the second drive gear 127 when engaging with the second drive gear 127 and the driven gear 143 for reverse (see FIG. 31). The reverse idler gear 31 is movable in an axial direction. When operating the vehicle in the backward direction, the reverse idler gear 31 is engaged with the second drive gear 127 and the driven gear 143 for reverse. The reverse idler gear 31 is not engaged with neither the second drive gear 127 nor the second driven gear so as to idly rotate when the drive mode other than the reverse mode is selected. The reverse idler gear 31 is rotatably supported by the housing of the transmission 4. The reverse idler gear 31 is moved in the axial direction by a gear shifting actuator. The gear shifting actuator is actuated by the transmission control device 13'.

The shaft 132 for first gear train is arranged substantially in parallel with the input shaft 121 for first gear train at a position at which the fourth drive gear 129 and the fifth drive gear 130 are arranged in an axial direction (see FIG. 31). The shaft 132 for first gear train is rotatably supported by the housing of the transmission 4. The first idler gear 133 for first gear train and the second idler gear 134 for first gear train are provided on an outer periphery of the shaft 132 for first gear train in the mentioned order from the side of the clutch 3. The shaft 132 for first gear train integrally rotates with the first idler gear 133 for first gear train and the second idler gear 134 for first gear train. The shaft 132 for first gear train is an element for the gear train for engine drive (i.e., serving as a first gear train).

The first idler gear 133 for first gear train is configured to drive the fourth drive gear 129

(See FIG. 31). The first idler gear 133 for first gear train integrally rotates with the shaft 132 for first gear train and the second idler gear 134 for first gear train, and is rotatably supported by the housing of the transmission 4 via the shaft 132 for first gear train. The first idler gear 133 for first gear train is engaged with the fourth drive gear 129. A diameter of the first idler gear 133 for first gear train is formed to be smaller than a diameter of the second idler gear 134 for first gear train. The first idler gear 133 for first gear train is an element for the gear train for engine drive (i.e., serving as a first gear train).

The second idler gear 134 for first gear train is configured to receive the torque transmitted via the fifth drive gear 130 (see FIG. 31). The second idler gear 134 for first gear train integrally rotates with the shaft 132 for first gear train and the first idler gear 133 for first gear train and is rotatably supported by the housing of the transmission 4 via the shaft 132 for first gear train. The second idler gear 134 for first gear train is geared with the fifth drive gear 130. The diameter of the second idler gear 134 for first gear train is formed to be greater than the diameter of the first idler gear 133 for first gear train. The second idler gear 134 for first gear train is an element for the gear train for engine drive (i.e., serving as a first gear train).

The main connecting-disconnecting mechanism 35 is configured to selectively connect and disconnect the shaft 125 for second gear train, which integrally rotates with the first drive gear 126, the second drive gear 127, and the third drive gear 128, with/from the fourth drive gear 129 (see FIG. 31). The main connecting-disconnecting mechanism 35 is configured to disconnect the gear train for electric drive (corresponding to 122, 123, 124, 125, 126, 128, 142, 144, 146 in FIG. 31) (i.e., serving as a second gear train) and the gear train for engine drive (corresponding to 121, 129, 130, 132, 133, 134, 136, 145, 147 in FIG. 31) (i.e., serving as a first gear train). The main connecting-disconnecting mechanism 35 is provided between the third drive gear 128 and the fourth drive gear 129. The main connecting-disconnecting mechanism 35 connects the fourth drive gear 129 and the shaft 125 for second gear train by engaging a sleeve, which engages with the fourth drive gear 129 via a spline, with the shaft 125 for second gear train by means of a spline so that the fourth drive gear 129 and the shaft 125 for second gear train integrally rotate. On the other hand, the main connecting-disconnecting mechanism 35 disconnects the fourth drive gear 129 and the shaft 125 for second gear train by disengaging the spline engagement of the sleeve from the shaft 125 for second gear train so that the fourth drive gear 129 and the shaft 125 for second gear train are assumed to be relatively rotatable. A switching operation of the main connecting-disconnecting mechanism 35 is performed by the gear shifting actuator. The gear shifting actuator is controlled by the transmission control device 13'.

The first connecting-disconnecting mechanism 136 for first gear train is configured to select the fourth drive gear 129 or the fifth drive gear 130 and is configured to connect and disconnect the selected fourth drive gear 129 or the fifth drive gear 130 relative to the input shaft 121 for first gear train (see FIG. 31). The first connecting-disconnecting mechanism 136 for first gear train is provided between the fourth drive gear 129 and the fifth drive gear 130. The first connecting-disconnecting mechanism 136 for first gear train is configured to move a sleeve, which splines with the input shaft 121 for first gear train, towards an F side (front side) to engage with the fourth drive gear 129 via a spline, thus connecting the input shaft 121 for first gear train and the fourth drive gear 129 so that the input shaft 121 for first gear train and the fourth drive gear 129 integrally rotate. The first connecting-disconnecting mechanism 136 for first gear train is configured to move the sleeve, which splines with the input shaft 121 for first gear train, to an R side (rear side) to engage with the fifth drive gear 130 via a spline, thus connecting the input shaft 121 for first gear train and the fifth drive gear 130 so that the input shaft 121 for first gear train and the fifth drive gear 130 integrally rotate. A switching operation of the first connecting-disconnecting mechanism 136 for first gear train is performed by the gear shifting actuator. The gear shifting actuator is controlled by the transmission control device 13'.

The output shaft 41 is configured to output the torque which is inputted to the transmission 4 and changed by changing speed ratios to the differential mechanism 6 (see FIGS. 12 and 31). The first driven gear 142 for second gear train, the first connecting-disconnecting mechanism 146 for second gear train (including the driven gear 143 for reverse), the second driven gear 144 for second gear train, the first driven gear 145 for first gear train, and the second connecting-disconnecting mechanism 147 for first gear train are arranged on an outer periphery of the output shaft 41 in the mentioned order from a side at which the engine 2 is provided (i.e., from the left in FIG. 31). The output shaft 41 is rotatably supported by the housing of the transmission 4. The output shaft 41 idly supports the first driven gear 142 for second gear train so as to be idly rotatable. The output shaft 41 is selectively connected to one of the first driven gear 142 for second gear train and the second driven gear 144 for second gear train which is selected by the first connecting-disconnecting mechanism 146 for second gear train provided between the first driven gear 142 for second gear train and the second driven gear 144 for second gear train. The output shaft 41 integrally rotates with the driven gear 143 for reverse mounted to a sleeve, which engages with the output shaft 41 via a spline at the first connecting-disconnecting mechanism 146 for second gear train. The output shaft 41 idly supports the second driven gear 144 for second gear train so as to be idly rotatable. The output shaft 41 is configured to be connected to the first driven gear 145 for first gear train by means of the second connecting-disconnecting mechanism 147 for first gear train. An output drive gear 51 is mounted to the output shaft 41 at a portion closer to the engine (i.e., leftward in FIG. 31) relative to the first driven gear 142 for second gear train, and integrally rotates with the output drive gear 51. Alternatively, the output drive gear 51 may be mounted to the output shaft 41 at a portion closer to a side opposite to the side where the engine 2 is provided (i.e., rightward in FIG. 31) relative to the second connecting-disconnecting mechanism 147 for first gear train.

The first driven gear 142 for second gear train is configured to be driven by the first drive gear 126 (see FIG. 31). The first driven gear 142 for second gear train is idly supported by the output shaft 41 so as to be idly rotatable. The first driven gear 142 for second gear train is configured to be connected to the output shaft 41 by means of the first connecting-disconnecting mechanism 146 for second gear train. The first driven gear 142 for second gear train is geared with the first drive gear 126. A diameter of the first driven gear 142 for second gear train is formed to be greater than a diameter of the second driven gear 144 for second gear train. The first driven gear 142 for second gear train is an element for the gear train for electric drive, which is configured to transmit a torque outputted from the motor generator 5.

The driven gear 143 for reverse is driven by the second drive gear 127 via the reverse idler gear 31 when meshing with the reverse idler gear 31 (see FIG. 31). The driven gear 143 for reverse is meshed with the reverse idler gear 31 when operating the vehicle in a backward direction, and is not meshed with the reverse idler gear 31 in other drive modes than a reverse mode. The driven gear 143 for reverse is mounted to the sleeve, which is engaged with the output shaft 41 via the spline at the first connecting-disconnecting mechanism 146 for second gear train, and integrally rotates to the sleeve and the output shaft 41.

The second driven gear 144 for second gear train is configured to be driven by the third drive gear 128 (see FIG. 31). The second driven gear 144 for second gear train is idly supported by the output shaft 41 so as to be rotatable. The second driven gear 144 for second gear train is configured to be connected to the output shaft 41 by means of the first connecting-disconnecting mechanism 146 for second gear train. The second driven gear 144 for second gear train is meshed with the third drive gear 128. The diameter of the second driven gear 144 for second gear train is formed to be smaller than the diameter of the first driven gear 142 for second gear train. The second driven gear 144 for second gear train is an element for the gear train for electric drive, which is configured to transmit a torque outputted from the motor generator 5.

The first driven gear 145 for first gear train is configured to be driven by the fourth drive gear 129 (see FIG. 31). The first driven gear 145 for first gear train is idly supported by the output shaft 41 so as to be rotatable. The first driven gear 145 for first gear train is configured to be connected to the output shaft 41 by means of the second connecting-disconnecting mechanism 147 for first gear train. The first driven gear 145 for first gear train is meshed with the fourth drive gear 129. The first driven gear 145 for first gear train is an element for the gear train for engine drive (i.e., serving as a first gear train).

The first connecting-disconnecting mechanism 146 for second gear train is configured to select the first driven gear 142 for second gear train or the second driven gear 144 for second gear train and is configured to connect and disconnect the selected first driven gear 142 for second gear train or the second driven gear 144 for second gear train relative to the output shaft 41 (see FIG. 31). The first connecting-disconnecting mechanism 146 for second gear train is provided between the first driven gear 142 for second gear train and the second driven gear 144 for second gear train. The first connecting-disconnecting mechanism 146 for second gear train is configured to move a sleeve, which splines with the output shaft 41, to an F side (front side) to engage with the first driven gear 142 for second gear train via a spline, thus connecting the output shaft 41 and the first driven gear 142 for second gear train so that the output shaft 41 and the first driven gear 142 for second gear train integrally rotate. The first connecting-disconnecting mechanism 146 for second gear train is configured to move the sleeve, which engages with output shaft 41 via the spline, to an R side (rear side) to engage with the second driven gear 144 for second gear train via a spline, thus connecting the output shaft 41 and the second driven gear 144 for second gear train so that the output shaft 41 and the second driven gear 144 for second gear train integrally rotate. The driven gear 143 for reverse is mounted to the sleeve at the first connecting-disconnecting mechanism 146 for second gear train, and the sleeve integrally rotates with the driven gear 143 for reverse. A switching operation of the first connecting-disconnecting mechanism 146 for second gear train is performed by the gear shifting actuator. The gear shifting actuator is controlled by the transmission control device 13'.

The second connecting-disconnecting mechanism 147 for first gear train is configured to connect and disconnect the output shaft 41 and the first driven gear 145 for first gear train (see FIG. 31). The second connecting-disconnecting mechanism 147 for first gear train connects the first driven gear 145 for first gear train and the output shaft 41 by engaging a sleeve, which engages with the output shaft 41 via a spline, with the first driven gear 145 for first gear train via a spline so that the first driven gear 145 for first gear train and the output shaft 41 integrally rotate. On the other hand, the second connecting-disconnecting mechanism 147 for first gear train disconnects the first driven gear 145 for first gear train and the output shaft 41 by disconnecting the spline engagement of the sleeve and the first driven gear 145 for first gear train so that the first driven gear 145 for first gear train and the output shaft 41 are assumed to be relatively rotatable. A switching operation of the second connecting-disconnecting mechanism 147 for first gear train is performed by the gear shifting actuator. The gear shifting actuator is controlled by the transmission control device 13'.

The motor generator 5 is a synchronous generator-motor which serves as an electric motor and an electric generator (see FIGS. 12 and 31). The motor generator 5 charges the battery 11 via the inverter 10 and the battery 11 applies electricity to the motor generator 5 via the inverter 10. An output shaft of the motor generator 5 is connected to the input shaft 122 for second gear train and integrally rotates with the input shaft 122 for second gear train. The motor generator 5 is configured to generate electricity using a torque transmitted from the engine 2 via the transmission 4 to charge the battery 11, is configured to regenerate using the torque transmitted from the wheels 7, 8 via the shafts 53, 54, the differential mechanism 6, and the transmission 4 to charge the battery 11, and is configured to output the torque using an electric power from the battery 11. An angular sensor for detecting a rotation angle of the output shaft, and various sensors, for example, a rotation speed sensor are built in the motor generator 5. The various sensors are communicatively connected to the motor-generator control device 14. The motor generator 5 is controlled by the motor-generator control device 14 via the inverter 10.

The differential mechanism 6 is configured to differentially transmit the torque inputted from the output shaft 41 of the transmission 4 to the shafts 53, 54 (see FIGS. 12 and 31). The differential mechanism 6 includes the output drive gear 51 integrally rotating with the output shaft 41 of the transmission 4. The differential mechanism 6 includes a ring gear 52 which is configured to engage with the output drive gear 51. The differential mechanism 6 differentially distributes the torque, which is inputted from the ring gear 52, to the shafts 53, 54. The shaft 53 integrally rotates with the wheel 7. The shaft 54 integrally rotates with the wheel 8.

The inverter 10 is configured to control an operation (i.e., a drive operation, a power generating operation, a regenerating operation) of the motor generator 5 in accordance with a control signal from the motor-generator control device 14 (see FIG. 12). The inverter 10 is electrically connected to the battery 11 via a boost converter.

The battery 11 is a secondary battery which is rechargeable (electrifiable) (see FIG. 12). The battery 11 is electrically connected to the motor generator 5 via the boost converter and the inverter 10.

The engine control device 12' is a computer (electronic control unit) for controlling the operation of the engine 2 (see FIG. 12). The engine control device 12' is connected to various actuators built in the engine 2 (e.g., an actuator for driving a throttle valve and/or an injector), various sensors (e.g., an engine rotation sensor), and the hybrid control device 16 so as to communicate. The engine control device 12' performs a control transaction on the basis of a predetermined program (including a database and/or a map) in accordance with a control signal from the hybrid control device 16.

The transmission control device 13' is a computer (electronic control unit) for controlling an operation of the clutch 3 and the transmission 4 (including the connecting-disconnecting mechanisms 35, 36, 46, 47 and the reverse idler gear 31 in FIG. 31) (see FIG. 12). The transmission control device 13' is connected to various actuators, various sensors (e.g., a rotation sensor), and the hybrid control device 16 so as to communicate. The transmission control device 13' performs a control transaction on the basis of a predetermined program (including a database and a shift map in accordance with a control signal from the hybrid control device 16.

The motor-generator control device 14 is a computer (an electronic control unit) for controlling an operation of the motor-generator 5 via the inverter 10 (see FIG. 12). The motor-generator control device 14 is connected to the inverter 10, various sensors (e.g., an angular sensor), and the hybrid control device 16 so as to communicate. The motor-generator control device 14 performs a control transaction on the basis of a predetermined program (including a database and/or a map) in accordance with a control signal from the hybrid control device 16.

The battery control device 15 is a computer (an electronic control unit) for monitoring a charging and discharging state of the battery 11 (see FIG. 12). The battery control device 15 is connected to the hybrid control device 16 so as to communicate. The battery control device 15 performs a control transaction on the basis of a predetermined program (including a database and/or a map) in accordance with a control signal from the hybrid control device 16.

The hybrid control device 16 is a computer (an electronic control unit) for controlling the operations of the engine control device 12', the transmission control device 13', the motor-generator control device 14, and the battery control device 15 (see FIG. 12). The hybrid control device 16 is connected to various sensors 17 (e.g., a vehicle speed sensor and a throttle position sensor), the engine control device 12', the transmission control device 13', the motor-generator control device 14, and the battery control device 15 so as to communicate. The hybrid control device 16 outputs a control signal to the engine control device 12', the transmission control device 13', the motor-generator control device 14, and the battery control device 15 on the basis of a predetermined program (including a database and/or a map) in accordance with a predetermined state of the vehicle. The hybrid control device 16 controls a start and a stop of the engine 2 via the engine control device 12', controls an operation of the clutch 3 via the transmission control device 13', a switching operation of the connecting-disconnecting mechanisms 35, 36, 46, 47 shown in FIG. 31, and a motion of the reverse idler gear 31, controls the actuation, the power generation, and the regeneration of the motor-generator 5 via the motor-generator control device 14, and monitors the battery 11 via the battery control device 15.

Drive modes of the vehicle drive system according to the ninth embodiment disclosed here will be explained with reference to FIGS. 32 to 44.

Figure 33:
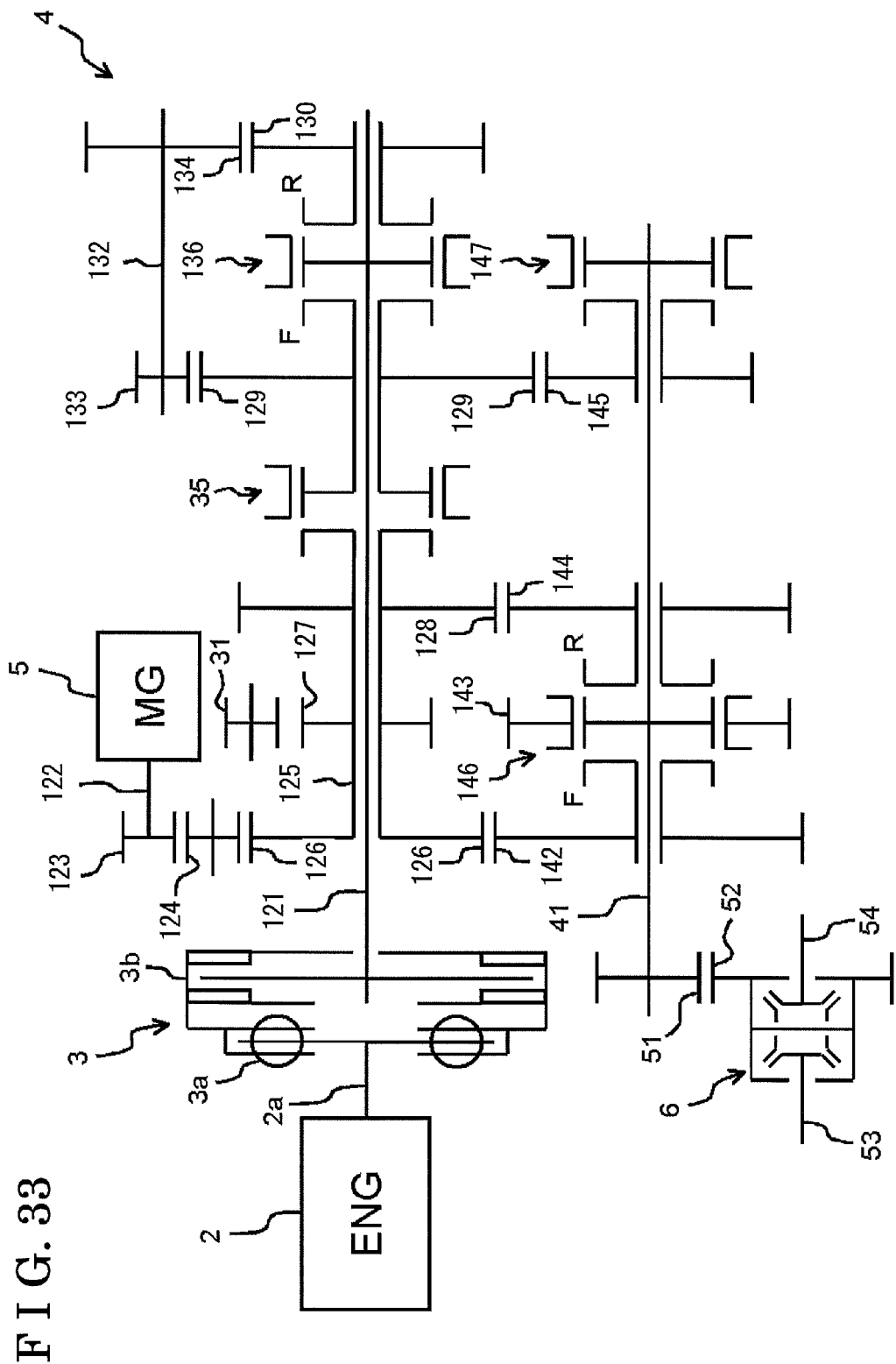
FIG. 33 is a schematic view showing a power transmitting path of the vehicle drive system when the vehicle drive system is in a neutral mode according to the ninth embodiment disclosed here.

First, a neutral mode will be explained as follows. Referring to FIGS. 32 and 33, during the neutral mode, the clutch 3 is disengaged (OFF), the main connecting-disconnecting mechanism 35 is disconnected (OFF), the first connecting-disconnecting mechanism 136 for first gear train is in neutral, the first connecting-disconnecting mechanism 146 for second gear train is in neutral, the second connecting-disconnecting mechanism 147 for first gear train is disconnected (OFF), and the reverse idler gear 31 is disengaged (OFF). Thus, during the neutral mode, the power is not transmitted among the engine 2, the motor generator 5, and the differential mechanism 6.

Figure 34:
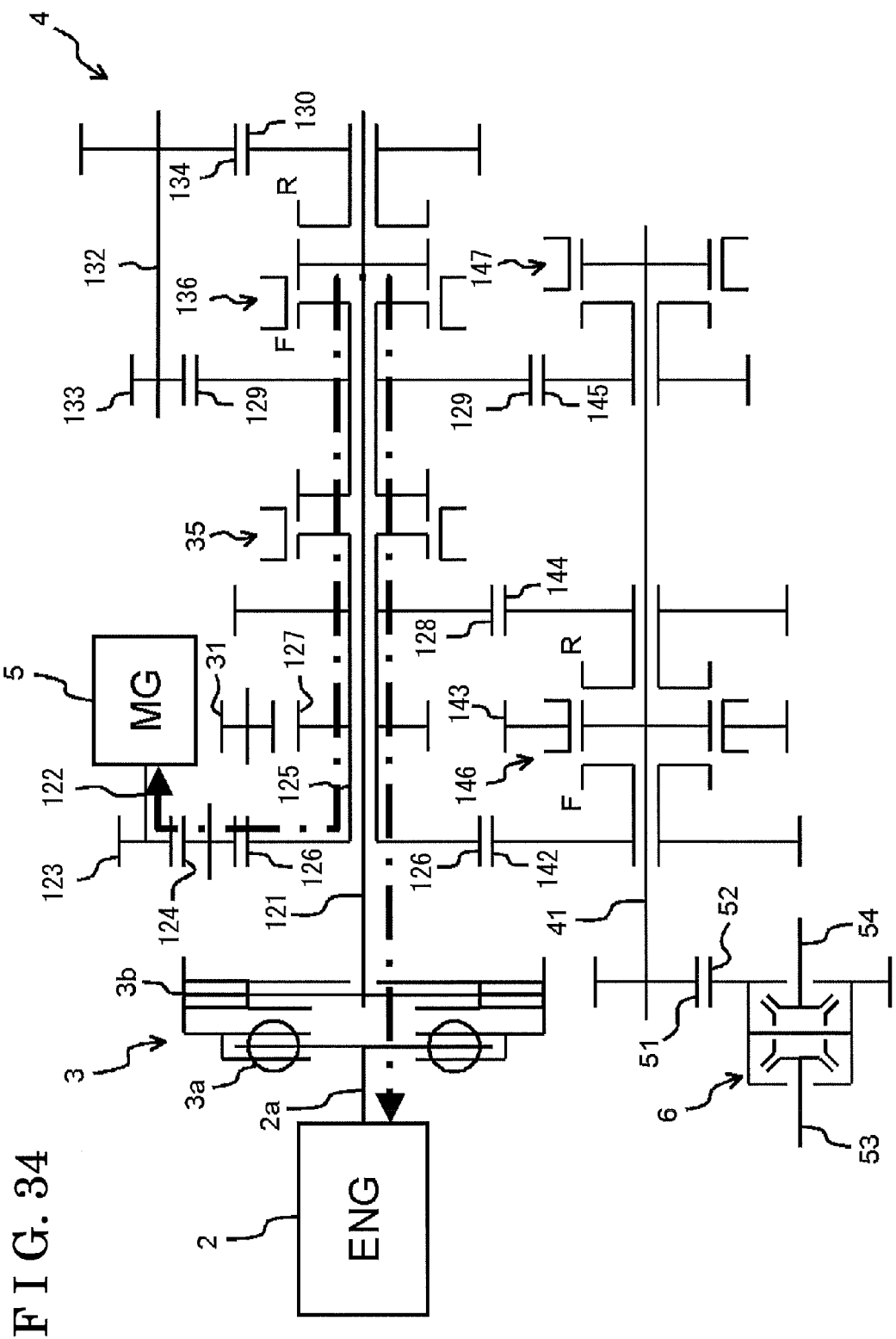
FIG. 34 is a schematic view showing a power transmitting path of the vehicle drive system when the vehicle drive system is in a stop (start/power generation) mode according to the ninth embodiment disclosed here.

Second, a stop (start/power generation) mode will be explained as follows. As shown in FIGS. 32 and 34, during the stop (start/power generation) mode, in case of starting the engine 2 using the torque outputted from the motor generator 5 and in case of generating an electric power by the motor generator 5 using the torque outputted from the engine 2, the clutch 3 is engaged (ON) while the vehicle is not in motion, the main connecting-disconnecting mechanism 35 is connected (ON), the first connecting-disconnecting mechanism 136 for first gear train is connected to the F side (ON at the F side), the first connecting-disconnecting mechanism 146 for second gear train is in neutral, the second connecting-disconnecting mechanism 147 for first gear train is disconnected (OFF), and the reverse idler gear 31 is disengaged (OFF). Thus, during the stop (start/power generation) mode, a power transmitting path is established between the engine 2 and the motor generator 5 via the crankshaft 2a, the clutch 3, the input shaft 121 for first gear train, the first connecting-disconnecting mechanism 136 for first gear train, the fourth drive gear 129, the main connecting-disconnecting mechanism 35, the shaft 125 for second gear train, the first drive gear 126, the input idler gear 124, the input drive gear 123, and the input shaft 122 for second gear train. In those circumstances, a power transmitting path is not established between the engine 2 and the differential mechanism 6 and between the motor generator 5 and the differential mechanism 6. In those circumstances, by actuating the motor generator 5 when the engine 2 is in a stopped state, the engine 2 can be started. Further, when the engine 2 is driven, in those circumstances, the electric power is generated by the motor generator 5.

Figure 35:
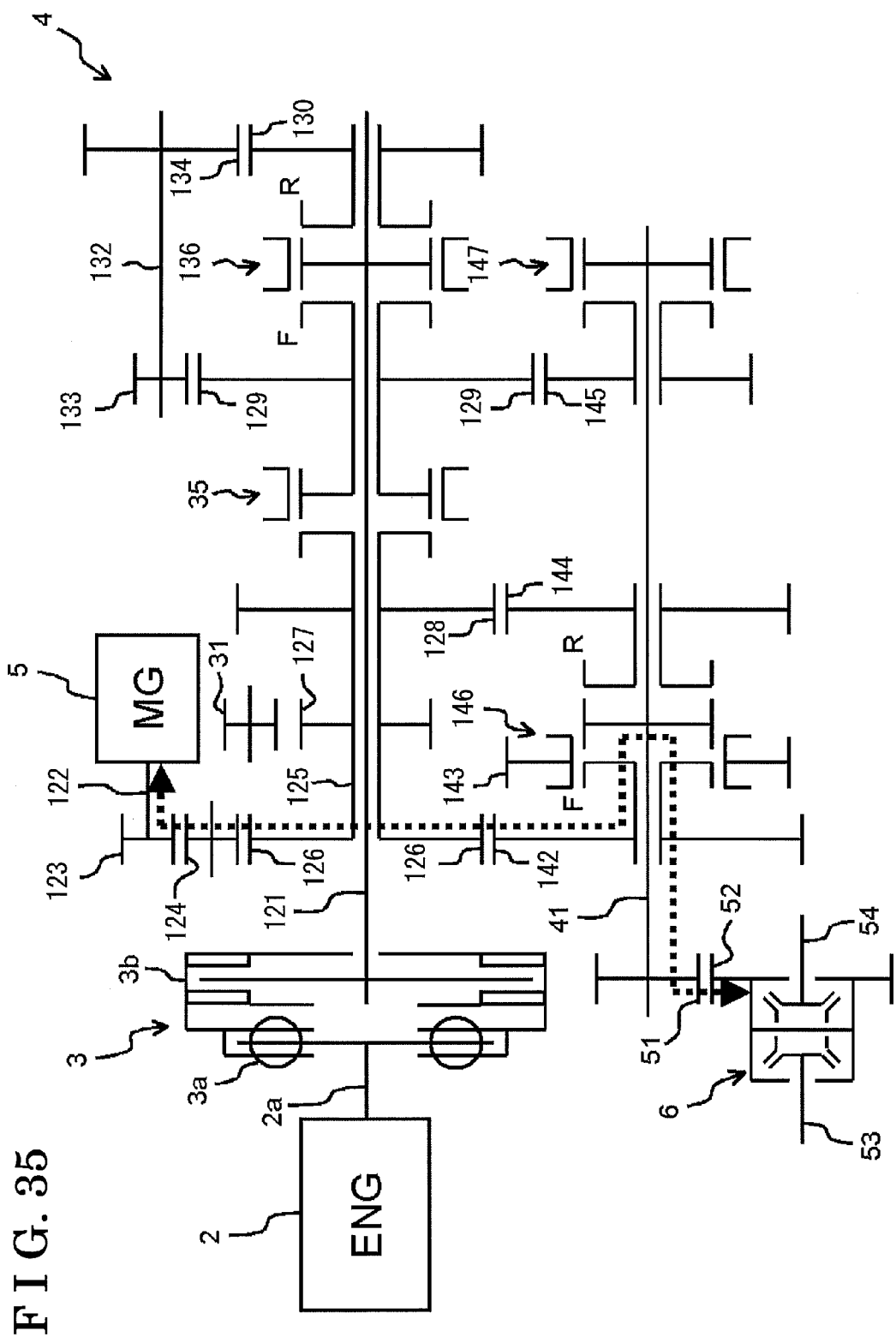
FIG. 35 is a schematic view showing a power transmitting path of the vehicle drive system when the vehicle drive system is in a 1st speed EV driving mode according to the ninth embodiment disclosed here.

Third, a 1st speed EV (electric vehicle) driving mode will be explained as follows. As shown in FIGS. 32 and 35, during the 1st speed EV driving mode, the clutch 3 is disengaged (OFF), the main connecting-disconnecting mechanism 35 is disconnected (OFF), the first connecting-disconnecting mechanism 136 for first gear train is in neutral, the first connecting-disconnecting mechanism 146 for second gear train is connected at the F side (ON at the F side), the second connecting-disconnecting mechanism 147 for first gear train is disconnected (OFF), and the reverse idler gear 31 is disengaged (OFF). Thus, during the 1st speed EV driving mode, a power transmitting path is established between the motor generator 5 and the differential mechanism 6 via the input shaft 122 for second gear train, the input drive gear 123, the input idler gear 124, the first drive gear 126, the first driven gear 142 for second gear train, the first connecting-disconnecting mechanism 146 for second gear train, and the output shaft 41. A power transmitting path is not established between the engine 2 and the motor generator 5 and between the engine 2 and the differential mechanism 6. Thus, the motor generator 5 can perform driving or regeneration, that is, the motor generator 5 drives the vehicle or regenerates the electricity. Further, because the main connecting-disconnecting mechanism 35 is disconnected (OFF), according to the foregoing construction, the gear train for engine drive (engine drive mode) (121, 129, 130, 132, 133, 134, 136 in FIG. 35) does not operate, thus reducing the number of meshed gears and an inertia weight. In those circumstances, the EV (electric vehicle) driving mode is defined as a state in which the vehicle travels in a state where only the motor generator 5 can be actuated among the motor generator 5 and the engine 2.

Figure 36:
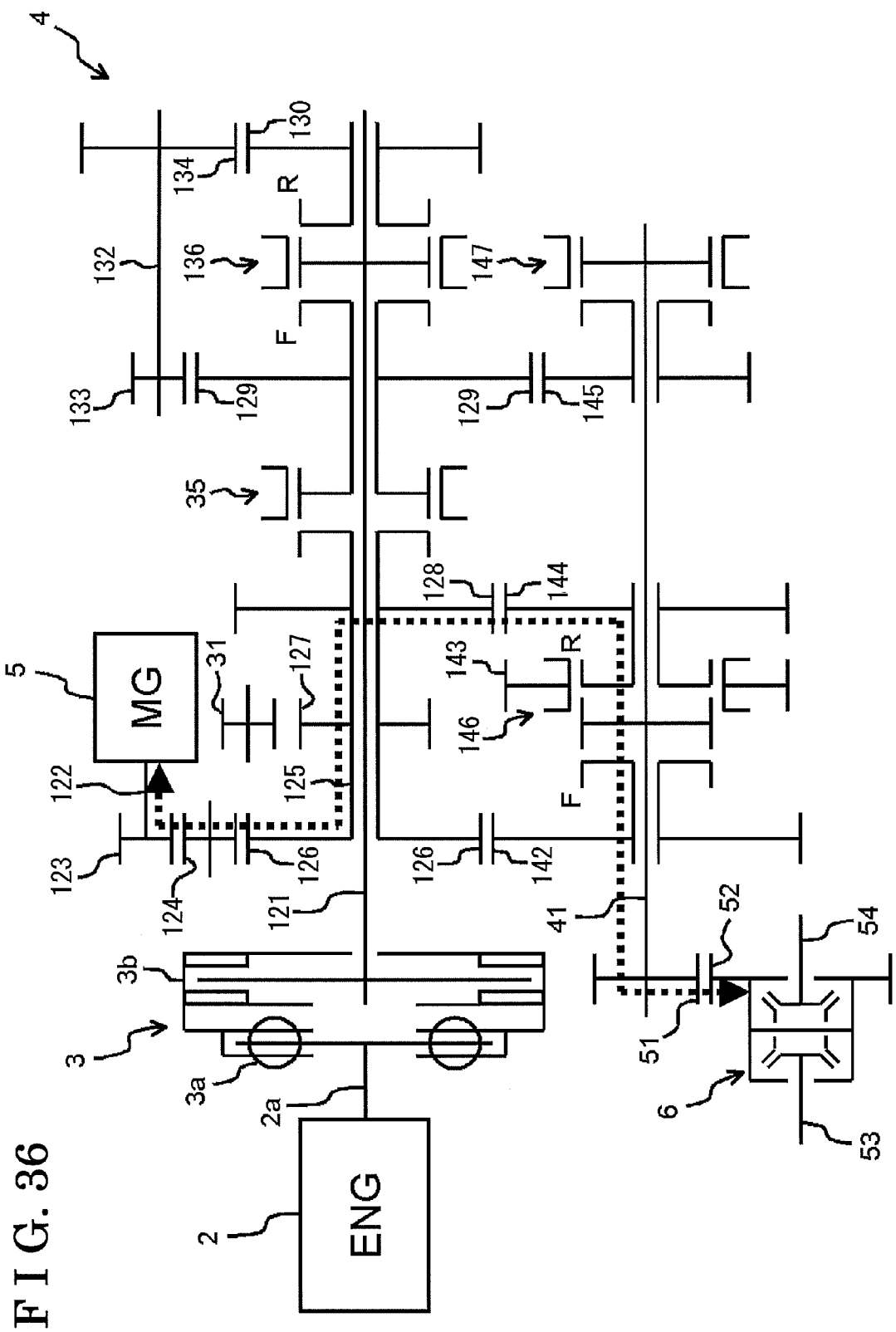
FIG. 36 is a schematic view showing a power transmitting path of the vehicle drive system when the vehicle drive system is in a 2nd speed EV driving mode according to the ninth embodiment disclosed here.

Fourth, a 2nd speed EV driving mode will be explained as follows. Referring to FIGS. 32 and 36, during the 2nd speed EV driving mode, the clutch 3 is disengaged (OFF), the main connecting-disconnecting mechanism 35 is disconnected (OFF), the first connecting-disconnecting mechanism 136 for first gear train is in neutral, the first connecting-disconnecting mechanism 146 for second gear train is connected at the R side (ON at the R side), the second connecting-disconnecting mechanism 147 for first gear train is disconnected (OFF), and the reverse idler gear 31 is disengaged (OFF). Thus, during the 2nd speed EV driving mode, a power transmitting path is established between the motor generator 5 and the differential mechanism 6 via the input shaft 122 for second gear train, the input drive gear 123, the input idler gear 124, the first drive gear 126, the shaft 125 for second gear train, the third drive gear 128, the second driven gear 144 for second gear train, the first connecting-disconnecting mechanism 146 for second gear train, and the output shaft 41. A power transmitting path is not established between the engine 2 and the motor generator 5 and between the engine 2 and the differential mechanism 6. Thus, the motor generator 5 can perform driving or regeneration, that is, the motor generator 5 drives the vehicle or regenerates the electricity. Further, because the main connecting-disconnecting mechanism 35 is disconnected (OFF), according to the foregoing construction, the gear train for engine drive (121, 129, 130, 132, 133, 134, 136 in FIG. 36) does not operate, thus reducing the number of meshed gears and an inertia weight.

Figure 37:
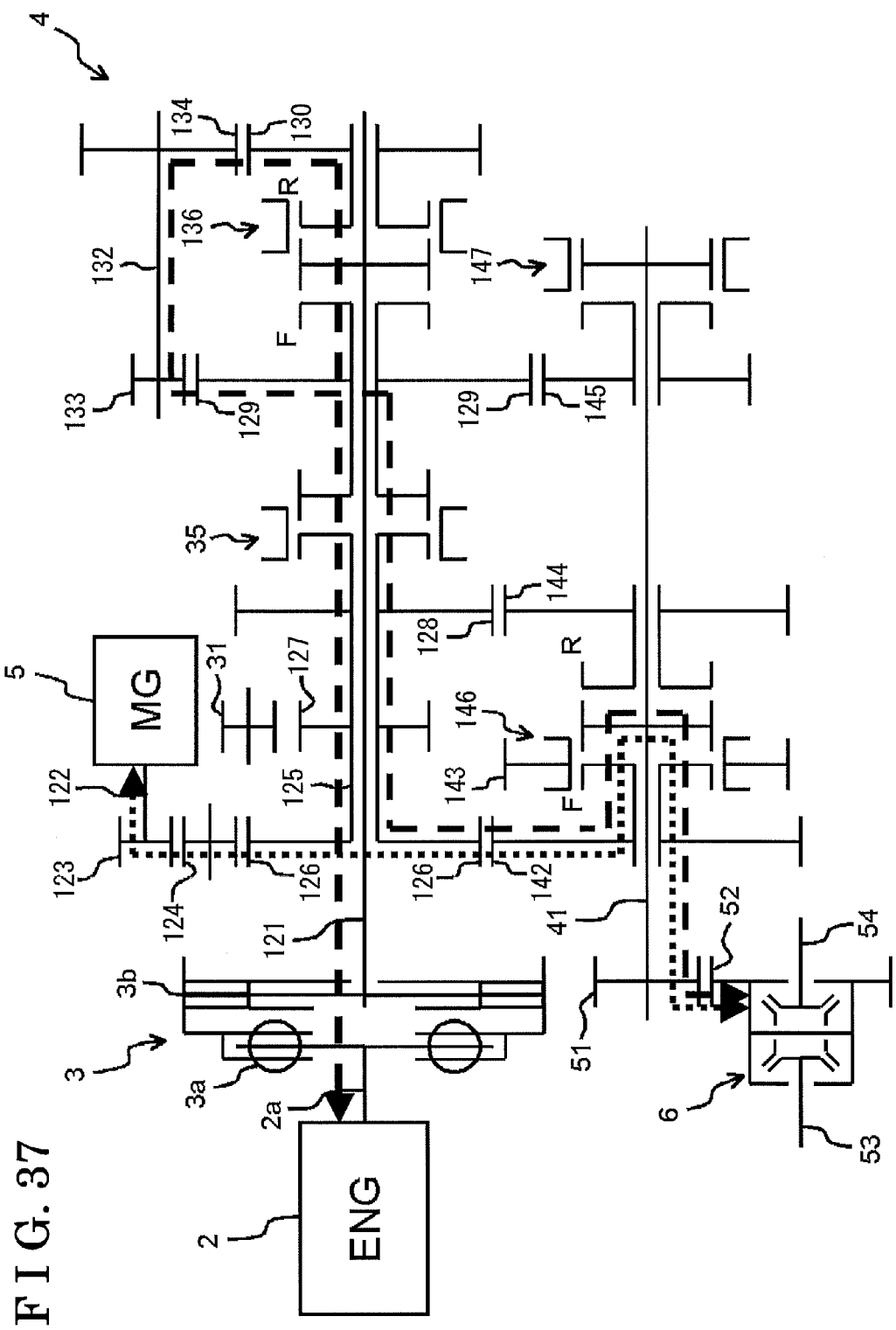
FIG. 37 is a schematic view showing a power transmitting path of the vehicle drive system when the vehicle drive system is in a 1st speed hybrid driving mode according to the ninth embodiment disclosed here.

Fifth, a 1st speed hybrid driving mode (hybrid vehicle (HV) driving mode) will be explained as follows. Referring to FIGS. 32 and 37, during the 1st speed hybrid driving mode, the clutch 3 is engaged (ON), the main connecting-disconnecting mechanism 35 is connected (ON), the first connecting-disconnecting mechanism 136 for first gear train is connected at the R side (ON at the R side), the first connecting-disconnecting mechanism 146 for second gear train is connected at the F side (ON at the F side), the second connecting-disconnecting mechanism 147 for first gear train is disconnected (OFF), and the reverse idler gear 31 is disengaged (OFF). Thus, a power transmitting path is established between the engine 2 and the differential mechanism 6 via the crankshaft 2a, the clutch 3, the input shaft 121 for first gear train, the first connecting-disconnecting mechanism 136 for first gear train, the fifth drive gear 130, the second idler gear 134 for first gear train, the shaft 132 for first gear train, the first idler gear 133 for first gear train, the fourth drive gear 129, the main connecting-disconnecting mechanism 35, the shaft 125 for second gear train, the first drive gear 126, the first driven gear 142 for second gear train, the first connecting-disconnecting mechanism 146 for second gear train, and the output shaft 41. A power transmitting path is established between the motor generator 5 and the differential mechanism 6 via the input shaft 122 for second gear train, the input drive gear 123, the input idler gear 124, the first drive gear 126, the first driven gear 142 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. According to the 1st speed hybrid driving mode, in addition to the gear train for engine drive (121, 129, 130, 132, 133, 134, 136 in FIG. 37), the gear train for electric drive (125, 126, 142, 146 in FIG. 37) is used between the engine 2 and the differential mechanism 6 by connecting the fourth drive gear 129 and the shaft 125 for second gear train by means of the main connecting-disconnecting mechanism 35. In those circumstances, the HV (hybrid vehicle) driving mode is defined as a state in which the vehicle travels in a state where the both of the engine 2 and the motor generator 5 can be driven/actuated.

Figure 38:
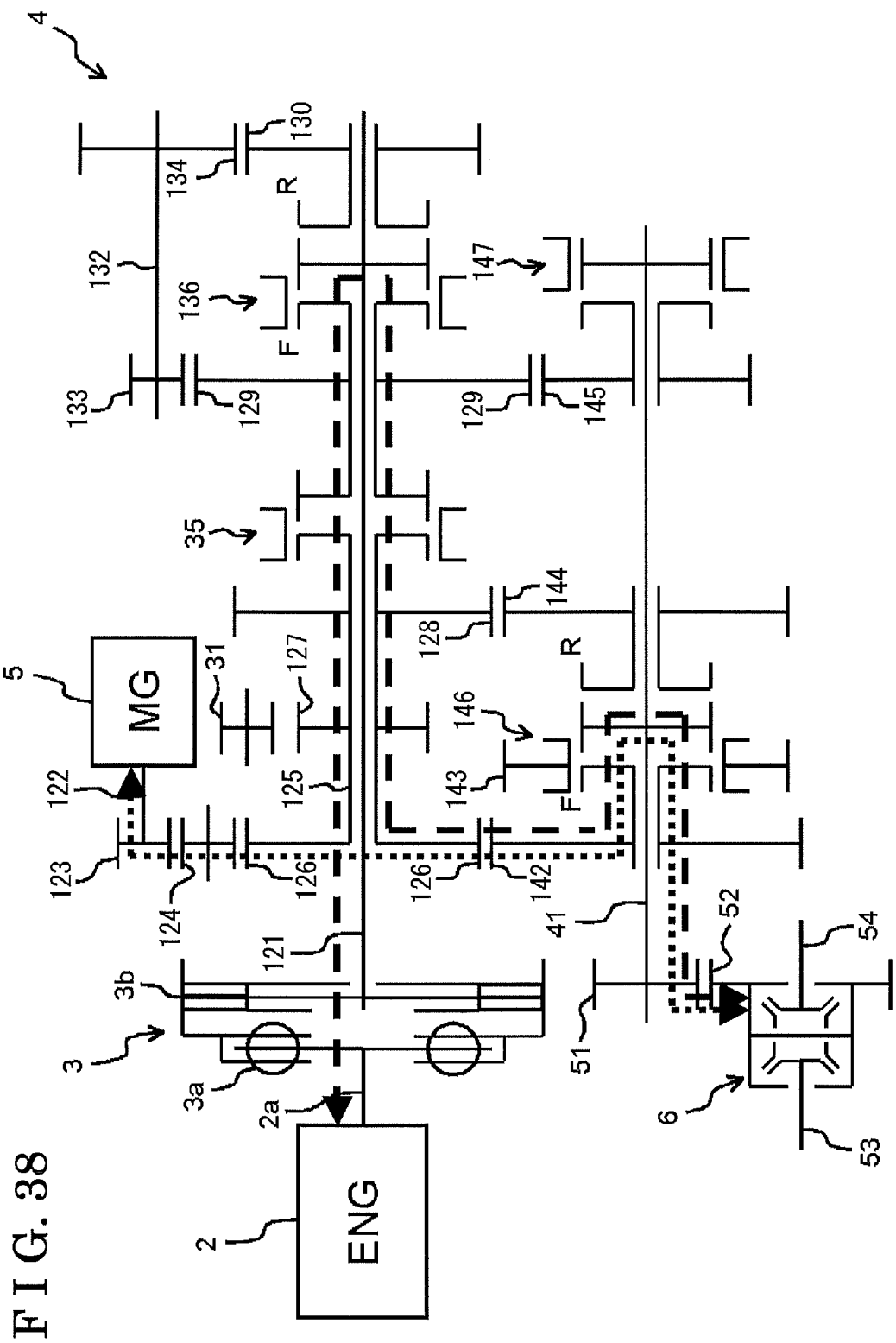
FIG. 38 is a schematic view showing a power transmitting path of the vehicle drive system when the vehicle drive system is in a 2nd speed hybrid driving mode according to the ninth embodiment disclosed here.

Sixth, a 2nd speed hybrid driving mode (hybrid vehicle (HV) driving mode) will be explained as follows. As shown in FIGS. 32 and 38, during the 2nd speed hybrid driving mode, the clutch 3 is engaged (ON), the main connecting-disconnecting mechanism 35 is connected (ON), the first connecting-disconnecting mechanism 136 for first gear train is connected at the F side (ON at the F side), the first connecting-disconnecting mechanism 146 for second gear train is connected at the F side (ON at the F side), the second connecting-disconnecting mechanism 147 for first gear train is disconnected (OFF), and the reverse idler gear 31 is disengaged (OFF). Thus, a power transmitting path is established between the engine 2 and the differential mechanism 6 via the crankshaft 2a, the clutch 3, the input shaft 121 for first gear train, the first connecting-disconnecting mechanism 136 for first gear train, the fourth drive gear 129, the main connecting-disconnecting mechanism 35, the shaft 125 for second gear train, the first drive gear 126, the first driven gear 142 for second gear train, the first connecting-disconnecting mechanism 146 for second gear train, and the output shaft 41. A power transmitting path is established between the motor generator 5 and the differential mechanism 6 via the input shaft 122 for second gear train, the input drive gear 123, the input idler gear 124, the first drive gear 126, the first driven gear 142 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. Further, according to the construction of the embodiment, because the power transmitting path between the motor generator 5 and the differential mechanism 6 does not change during the gear shifting (during the change in gear stages) between the 1st speed hybrid driving mode and the 2nd speed hybrid driving mode, a discontinuation of the torque is not generated. In those circumstances, during the 2nd speed hybrid driving mode, in addition to the gear train for engine drive (121, 129, 136 in FIG. 38), the gear train for electric drive (125, 126, 142, 146 in FIG. 38) is applied to transmit the torque between the engine 2 and the differential mechanism 6 by the connection of the fourth drive gear 129 and the shaft 125 for second gear train by means of the main connecting-disconnecting mechanism 35.

Figure 39:
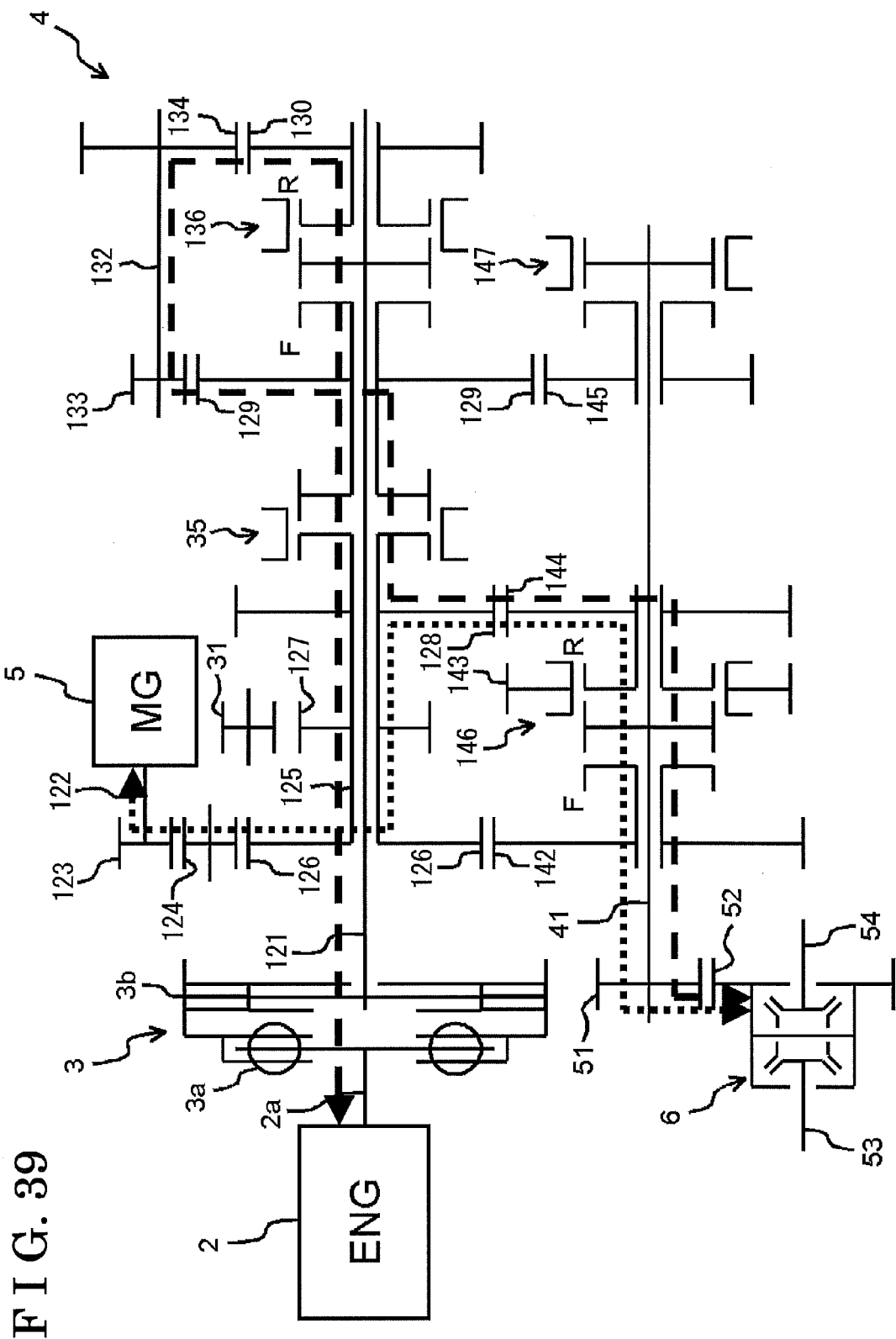
FIG. 39 is a schematic view showing a power transmitting path of the vehicle drive system when the vehicle drive system is in a 2.5th speed hybrid driving mode according to the ninth embodiment disclosed here.

Seventh, a 2.5th speed hybrid driving mode (hybrid vehicle (HV) driving mode) will be explained as follows. As shown in FIGS. 32 and 39, during the 2.5th speed hybrid driving mode, the clutch 3 is engaged (ON), the main connecting-disconnecting mechanism 35 is connected (ON), the first connecting-disconnecting mechanism 136 for first gear train is connected at the R side (ON at the R side), the first connecting-disconnecting mechanism 146 for second gear train is connected at the R side (ON at the R side), the second connecting-disconnecting mechanism 147 for first gear train is disconnected (OFF), and the reverse idler gear 31 is disengaged (OFF). A power transmitting path is established between the engine 2 and the differential mechanism 6 via the crankshaft 2a, the clutch 3, the input shaft 121 for first gear train, the first connecting-disconnecting mechanism 136 for first gear train, the fifth drive gear 130, the second idler gear 134 for first gear train, the shaft 132 for first gear train, the first idler gear 133 for first gear train, the fourth drive gear 129, the main connecting-disconnecting mechanism 35, the shaft 125 for second gear train, the third drive gear 128, the second driven gear 144 for second gear train, the first connecting-disconnecting mechanism 146 for second gear train, and the output shaft 41. A power transmitting path is established between the motor generator 5 and the differential mechanism 6 via the input shaft 122 for second gear train, the input drive gear 123, the input idler gear 124, the first drive gear 126, the shaft 125 for second gear train, the third drive gear 128, the second driven gear 144 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. In those circumstances, during the 2.5th speed hybrid driving mode, in addition to the gear train for engine drive (121, 129, 130, 132, 133, 134, 136 in FIG. 39), the gear train for electric drive (125, 128, 144, 146 in FIG. 39) is applied to transmit the torque between the engine 2 and the differential mechanism 6 by the connection of the fourth drive gear 129 and the shaft 125 for second gear train by means of the main connecting-disconnecting mechanism 35. Alternatively, the 2.5th speed hybrid driving mode may be omitted.

Figure 40:
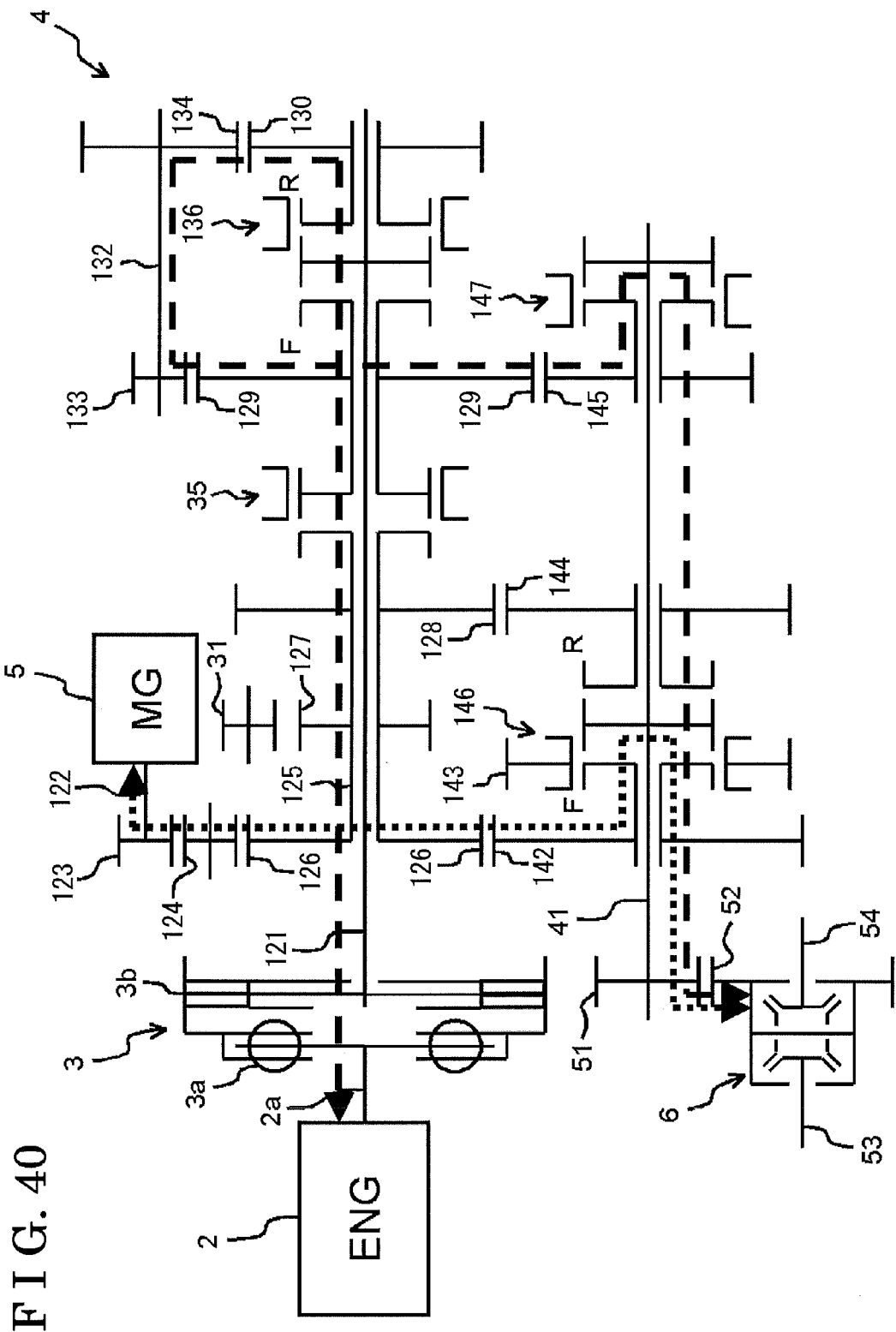
FIG. 40 is a schematic view showing a power transmitting path of the vehicle drive system when the vehicle drive system is in a 3rd speed hybrid driving mode according to the ninth embodiment disclosed here.

Eighth, a 3rd speed hybrid driving mode (hybrid vehicle (HV) driving mode) will be explained as follows. As shown in FIGS. 32 and 40, during the 3rd speed hybrid driving mode, the clutch 3 is engaged (ON), the main connecting-disconnecting mechanism 35 is disconnected (OFF), the first connecting-disconnecting mechanism 136 for first gear train is connected at the R side (ON at the R side), the first connecting-disconnecting mechanism 146 for second gear train is connected at the F side (ON at the F side), the second connecting-disconnecting mechanism 147 for first gear train is connected (ON), and the reverse idler gear 31 is disengaged (OFF). A power transmitting path is established between the engine 2 and the differential mechanism 6 via the crankshaft 2a, the clutch 3, the input shaft 121 for first gear train, the first connecting-disconnecting mechanism 136 for first gear train, the fifth drive gear 130, the second idler gear 134 for first gear train, the shaft 132 for first gear train, the first idler gear 133 for first gear train, the fourth drive gear 129, the first driven gear 145 for first gear train, the second connecting-disconnecting mechanism 147 for first gear train, and the output shaft 41. A power transmitting path is established between the motor generator 5 and the differential mechanism 6 via the input shaft 122 for second gear train, the input drive gear 123, the input idler gear 124, the first drive gear 126, the first driven gear 142 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. Further, because the power transmitting path between the motor generator 5 and the differential mechanism 6 does not change during the gear shifting (during the change in gear stages) between the 2nd speed hybrid driving mode and the 3rd speed hybrid driving mode, a discontinuation of the torque is not generated. In those circumstance, during the 3rd speed hybrid driving mode, the gear train for engine drive (129, 130, 132, 133, 134, 136, 145, 147 in FIG. 40) is independent from the gear train for electric drive (122, 123, 124, 125, 126, 128, 142, 144, 146 in FIG. 40).

Figure 41:
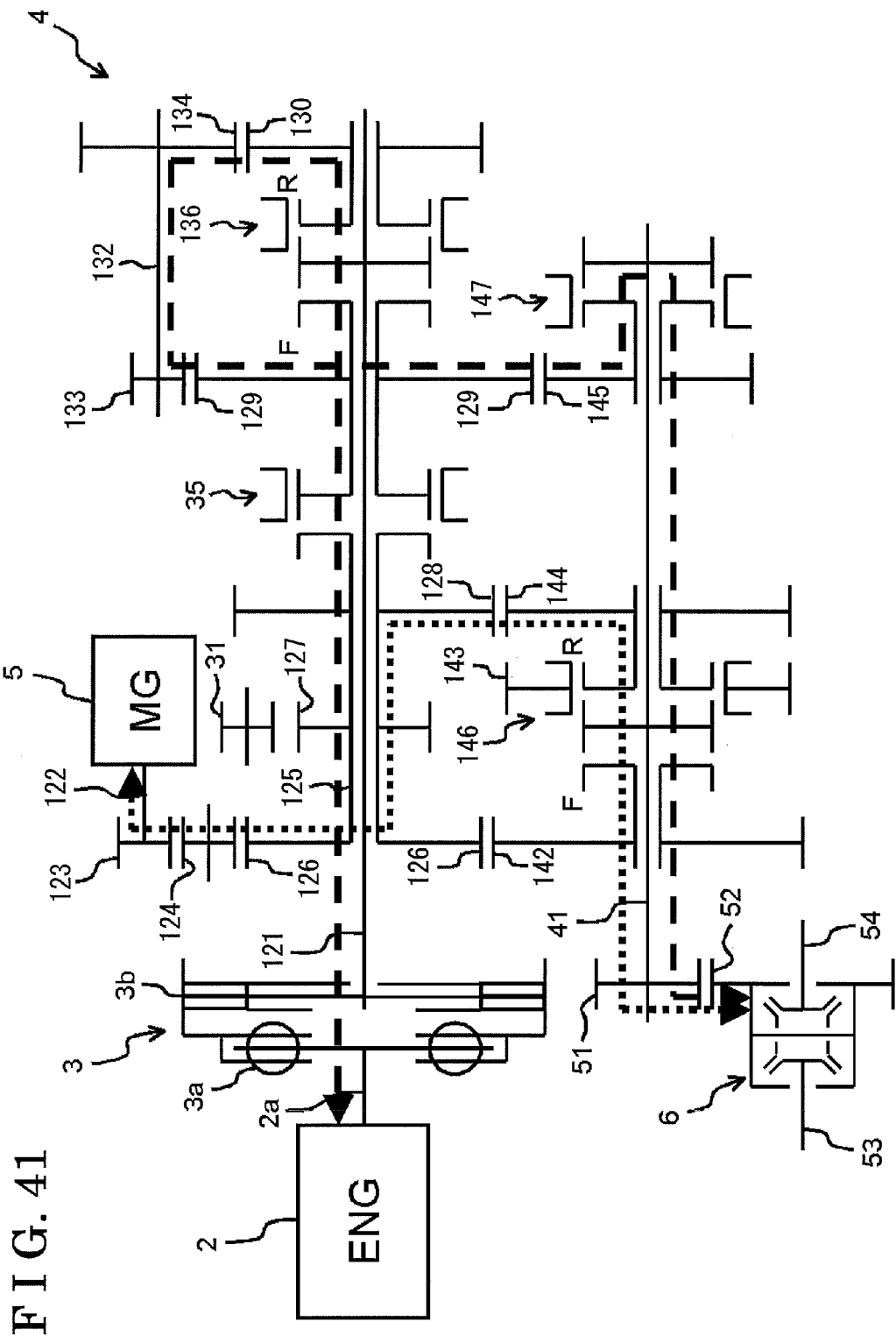
FIG. 41 is a schematic view showing a power transmitting path of the vehicle drive system when the vehicle drive system is in a pre-3rd speed hybrid driving mode according to the ninth embodiment disclosed here.

Ninth, a pre-3rd speed hybrid driving mode (hybrid vehicle (HV) driving mode) will be explained as follows. The pre-3rd hybrid driving mode is defined as a mode adapted to be applied prior to shifting to the 3rd speed hybrid driving mode and as a mode adapted to be applied when shifting from the 3rd speed hybrid driving mode to another driving mode. As shown in FIGS. 32 and 41, during the pre-3rd speed hybrid driving mode, the clutch 3 is engaged (ON), the main connecting-disconnecting mechanism 35 is disconnected (OFF), the first connecting-disconnecting mechanism 136 for first gear train is connected at the R side (ON at the R side), the first connecting-disconnecting mechanism 146 for second gear train is connected at the R side (ON at the R side), the second connecting-disconnecting mechanism 147 for first gear train is connected (ON), and the reverse idler gear 31 is disengaged (OFF). Thus, during the pre-3rd speed hybrid driving mode, a power transmitting path is established between the engine 2 and the differential mechanism 6 via the crankshaft 2a, the clutch 3, the input shaft 121 for first gear train, the first connecting-disconnecting mechanism 136 for first gear train, the fifth drive gear 130, the second idler gear 134 for first gear train, the shaft 132 for first gear train, the first idler gear 133 for first gear train, the fourth drive gear 129, the first driven gear 145 for first gear train, the second connecting-disconnecting mechanism 147 for first gear train, and the output shaft 41. A power transmitting path is established between the motor generator 5 and the differential mechanism 6 via the input shaft 122 for second gear train, the input drive gear 123, the input idler gear 124, the first drive gear 126, the shaft 125 for second gear train, the third drive gear 128, the second driven gear 144 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. Further, because the power transmitting path between the engine 2 and the differential mechanism 6 does not change during the gear shifting (during the change in gear stages) between the 3rd speed hybrid driving mode and the pre-3rd speed hybrid driving mode, a discontinuation of the torque is not generated. In those circumstances, during the pre-3rd speed hybrid driving mode, the gear train for engine drive (129, 130, 132, 133, 134, 145, 147 in FIG. 41) is independent from the gear train for electric drive (122, 123, 124, 125, 126, 128, 144, 146 in FIG. 41).

Figure 42:
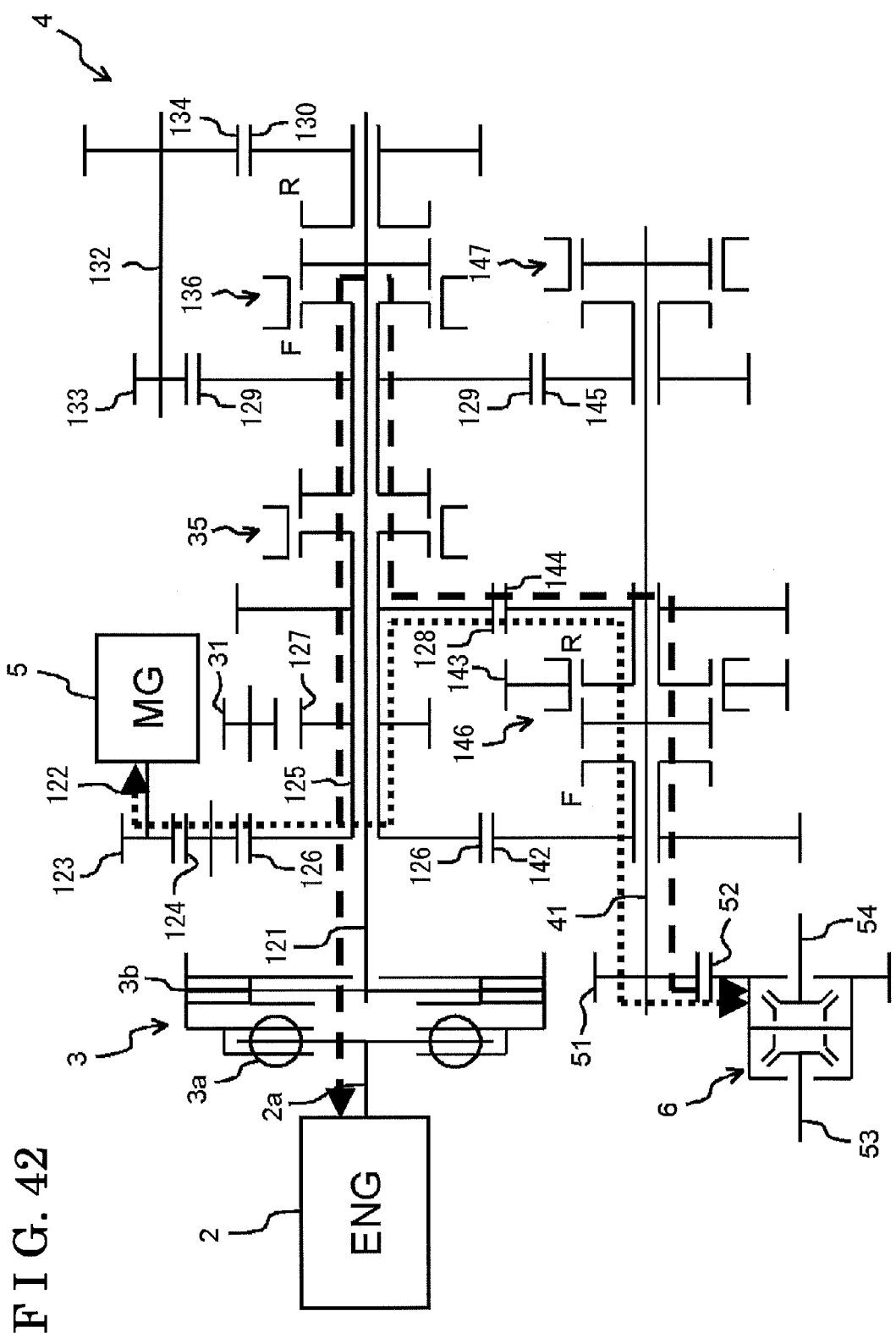
FIG. 42 is a schematic view showing a power transmitting path of the vehicle drive system when the vehicle drive system is in a 4th speed hybrid driving mode according to the ninth embodiment disclosed here.

Tenth, a 4th speed hybrid driving mode (hybrid vehicle (HV) driving mode) will be explained as follows. As shown in FIGS. 32 and 42, during the 4th speed hybrid driving mode, the clutch 3 is engaged (ON), the main connecting-disconnecting mechanism 35 is connected (ON), the first connecting-disconnecting mechanism 136 for first gear train is connected at the F side (ON at the F side), the first connecting-disconnecting mechanism 146 for second gear train is connected at the R side (ON at the R side), the second connecting-disconnecting mechanism 147 for first gear train is disconnected (OFF), and the reverse idler gear 31 is disengaged (OFF). A power transmitting path is established between the engine 2 and the differential mechanism 6 via the crankshaft 2a, the clutch 3, the input shaft 121 for first gear train, the first connecting-disconnecting mechanism 136 for first gear train, the fourth drive gear 129, the main connecting-disconnecting mechanism 35, the shaft 125 for second gear train, the third drive gear 128, the second driven gear 144 for second gear train, the first connecting-disconnecting mechanism 146 for second gear train, and the output shaft 41. A power transmitting path is established between the motor generator 5 and the differential mechanism 6 via the input shaft 122 for second gear train, the input drive gear 123, the input idler gear 124, the first drive gear 126, the shaft 125 for second gear train, the third drive gear 128, the second driven gear 144 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. Further, because the power transmitting path between the motor generator 5 and the differential mechanism 6 does not change during the gear shifting (during the change in gear stages) between the pre-3rd speed hybrid driving mode and the 4th speed hybrid driving mode, a discontinuation of the torque is not generated. According to the construction of the embodiment, when gear-shifting between the 3rd speed hybrid driving mode and the 4th speed hybrid driving mode, a discontinuation of the torque is prevented by shifting gears by way of the pre-3rd speed hybrid driving mode. In those circumstances, during the 4th speed hybrid driving mode, in addition to the gear train for engine drive (121, 129, 136 in FIG. 42), the gear train for electric drive (125, 128, 144, 146 in FIG. 42) is applied to transmit the torque between the engine 2 and the differential mechanism 6 by the connection of the fourth drive gear 129 and the shaft 125 for second gear train by means of the main connecting-disconnecting mechanism 35.

Figure 43:
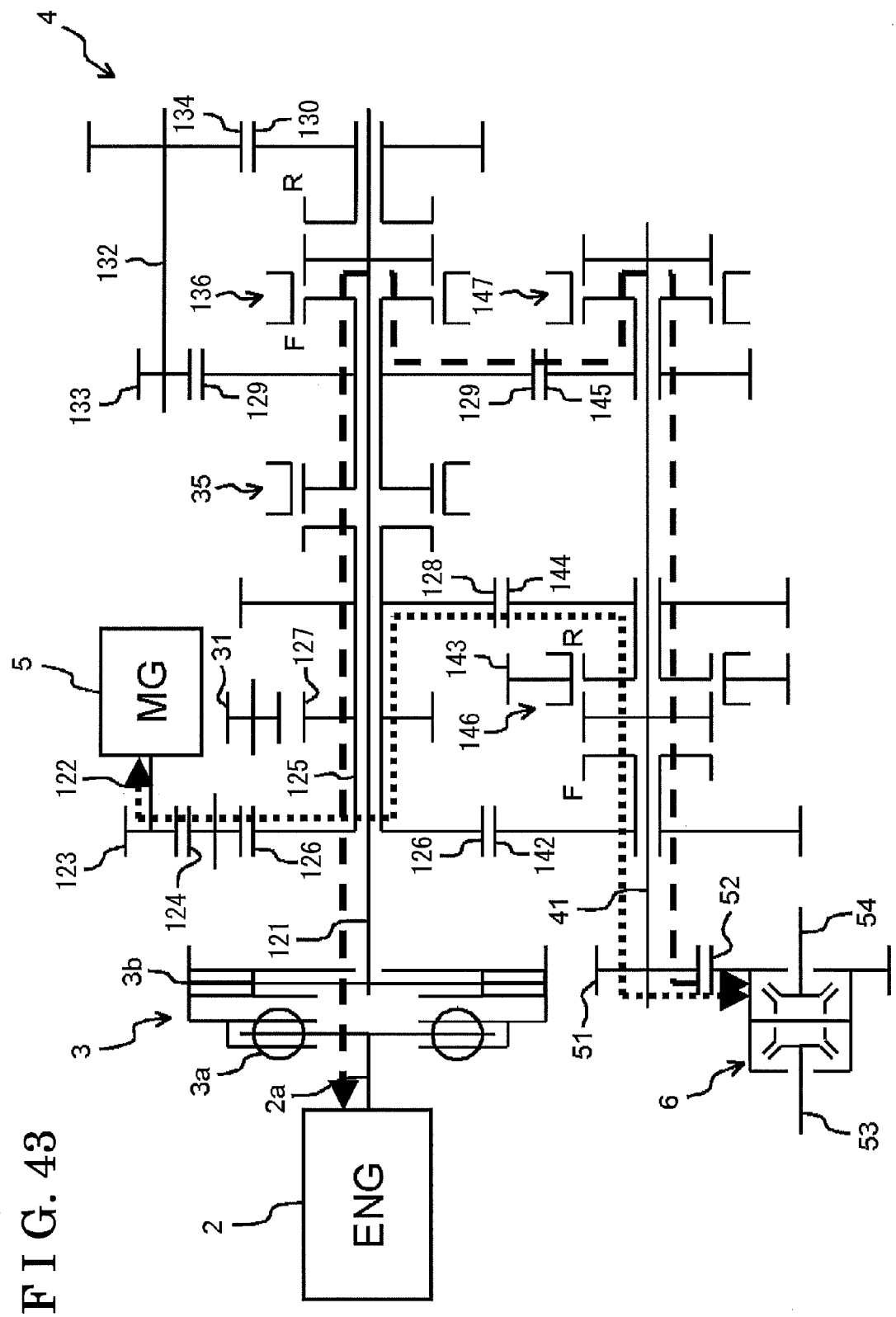
FIG. 43 is a schematic view showing a power transmitting path of the vehicle drive system when the vehicle drive system is in a 5th speed hybrid driving mode according to the ninth embodiment disclosed here.

Eleventh, a 5th speed hybrid driving mode (hybrid vehicle (HV) driving mode) will be explained as follows. As shown in FIGS. 32 and 43, during the 5th speed hybrid driving mode, the clutch 3 is engaged (ON), the main connecting-disconnecting mechanism 35 is disconnected (OFF), the first connecting-disconnecting mechanism 136 for first gear train is connected at the F side (ON at the F side), the first connecting-disconnecting mechanism 146 for second gear train is connected at the R side (ON at the R side), the second connecting-disconnecting mechanism 147 for first gear train is connected (ON), and the reverse idler gear 31 is disengaged (OFF). A power transmitting path is established between the engine 2 and the differential mechanism 6 via the crankshaft 2a, the clutch 3, the input shaft 121 for first gear train, the first connecting-disconnecting mechanism 136 for first gear train, the fourth drive gear 129, the first driven gear 145 for first gear train, the second connecting-disconnecting mechanism 147 for first gear train, and the output shaft 41. A power transmitting path is established between the motor generator 5 and the differential mechanism 6 via the input shaft 122 for second gear train, the input drive gear 123, the input idler gear 124, the first drive gear 126, the shaft 125 for second gear train, the third drive gear 128, the second driven gear 144 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. Further, because the power transmitting path between the motor generator 5 and the differential mechanism 6 does not change during the gear shifting (during the change in gear stages) between the 4th speed hybrid driving mode and the 5th speed hybrid driving mode, a discontinuation of the torque is not generated. In those circumstances, during the 5th speed hybrid driving mode, the gear train for engine drive (121, 129, 136, 145, 147 in FIG. 43) is independent from the gear train for electric drive (122, 123, 124, 125, 126, 128, 144, 146 in FIG. 43).

Figure 44:
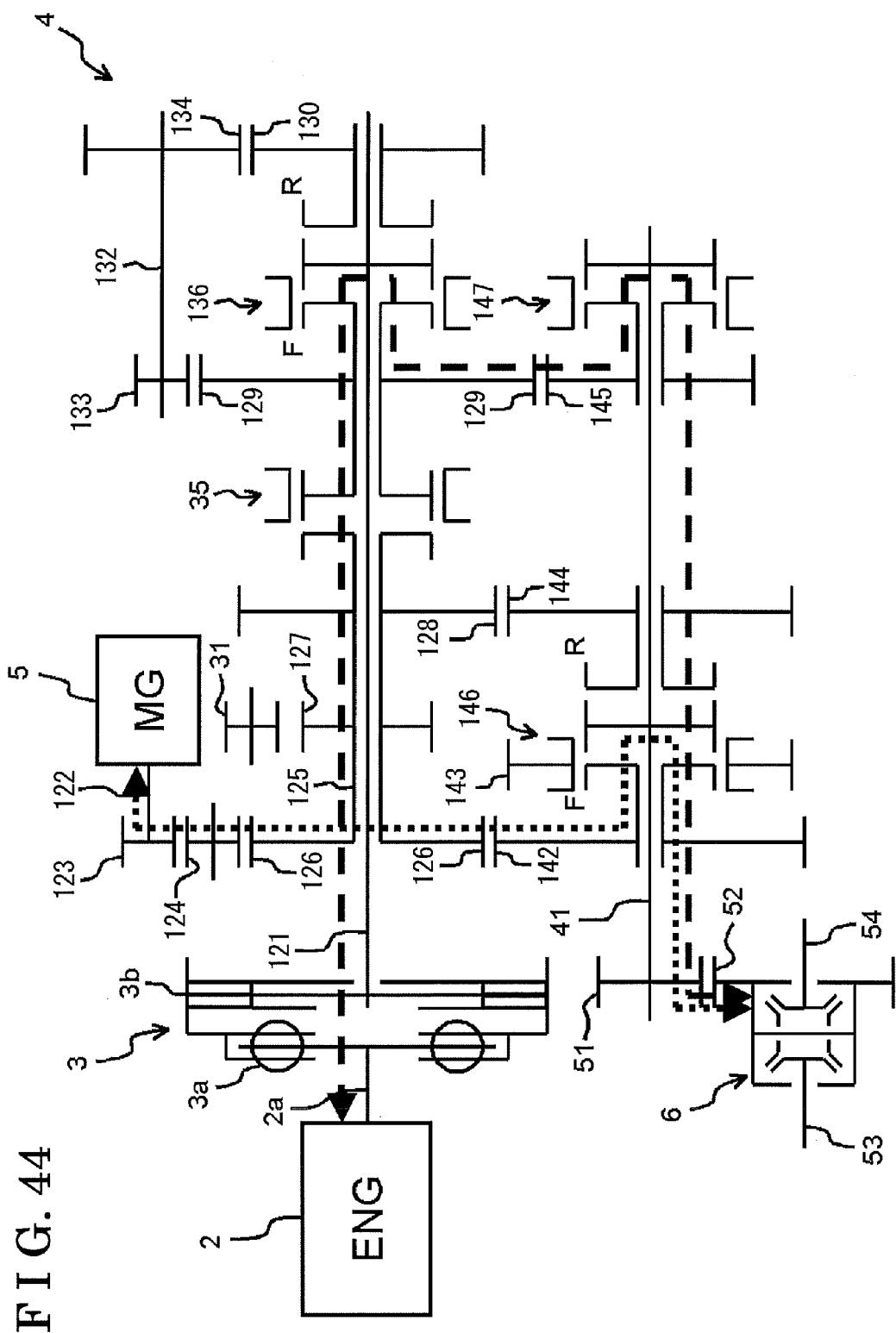
FIG. 44 is a schematic view showing a power transmitting path of the vehicle drive system when the vehicle drive system is in a pre-5th speed hybrid driving mode according to the ninth embodiment disclosed here.

Twelfth, a pre-5th speed hybrid driving mode (hybrid vehicle (HV) driving mode) will be explained as follows. The pre-5th hybrid driving mode is defined as a mode adapted to be applied prior to shifting to the 5th speed hybrid driving mode and as a mode adapted to be applied when shifting from the 5th speed hybrid driving mode to another driving mode. As shown in FIGS. 32 and 44, during the pre-5th speed hybrid driving mode, the clutch 3 is engaged (ON), the main connecting-disconnecting mechanism 35 is disconnected (OFF), the first connecting-disconnecting mechanism 136 for first gear train is connected at the F side (ON at F side), the first connecting-disconnecting mechanism 146 for second gear train is connected at the F side (ON at the F side), the second connecting-disconnecting mechanism 147 for first gear train is connected (ON), and the reverse idler gear 31 is disengaged (OFF). Thus, during the pre-5th speed hybrid driving mode, a power transmitting path is established between the engine 2 and the differential mechanism 6 via the crankshaft 2a, the clutch 3, the input shaft 121 for first gear train, the first connecting-disconnecting mechanism 136 for first gear train, the fourth drive gear 129, the first driven gear 145 for first gear train, the second connecting-disconnecting mechanism 147 for first gear train, and the output shaft 41. A power transmitting path is established between the motor generator 5 and the differential mechanism 6 via the input shaft 122 for second gear train, the input drive gear 123, the input idler gear 124, the first drive gear 126, the first driven gear 142 for second gear train, the first connecting-disconnecting mechanism 146 for second gear train, and the output shaft 41. Thus, the engine 2 can perform the driving or engine braking, that is, the engine 2 may drive the vehicle or may exert the braking effect upon the vehicle, and the motor generator 5 can perform driving or regeneration, that is, the motor generator 5 drives the vehicle or regenerates the electricity. Further, because the power transmitting path between the engine 2 and the differential mechanism 6 does not change during the gear shifting (change in gear stages) between the 5th speed hybrid driving mode and the pre-5th speed hybrid driving mode, a discontinuation of the torque is not generated. In those circumstances, during the pre-5th speed hybrid driving mode, the gear train for engine drive (121, 129, 136, 145, 147 in FIG. 44) is independent from the gear train for electric drive (122, 123, 124, 125, 126, 142, 146 in FIG. 44).

In case of shifting gears (gear stages) from the 5th speed hybrid driving mode (see FIG. 43) to the 3rd speed hybrid driving mode (see FIG. 40) skipping the 4th speed, the drive modes are shifted from the 5th speed hybrid driving mode (see FIG. 43) to the pre-5th speed hybrid driving mode (see FIG. 44), then to the 3rd speed hybrid driving mode (see FIG. 40). According to the foregoing construction, because the power transmitting path between the engine 2 and the differential mechanism 6 does not change when shifting from the 5th speed hybrid driving mode (see FIG. 43) to the pre-5th speed hybrid driving mode (see FIG. 44), a discontinuation of the torque is not generated, and because the power transmitting path between the motor generator 5 and the differential mechanism 6 does not change when shifting from the pre-5th speed hybrid driving mode (see FIG. 44) to the 3rd speed hybrid drive(see FIG. 40), a discontinuation of the torque is not generated.

Alternatively, in case of shifting gears from the 5th speed hybrid driving mode (see FIG. 43) to the 3rd speed hybrid driving mode (see FIG. 40) skipping the 4th speed, the drive modes may be shifted from the 5th speed hybrid driving mode (see FIG. 43) to the pre-3rd speed hybrid driving mode (see FIG. 41), then to the 3rd speed hybrid driving mode (see FIG. 40). According to the foregoing construction, because the power transmitting path between the motor generator 5 and the differential mechanism 6 does not change when shifting from the 5th speed hybrid driving mode (see FIG. 43) to the pre-3rd speed hybrid driving mode (see FIG. 41), a discontinuation of the torque is not generated, and because the power transmitting path between the engine 2 and the differential mechanism 6 does not change when shifting from the pre-3rd speed hybrid driving mode (see FIG. 41) to the 3rd speed hybrid driving mode (see FIG. 40), a discontinuation of the torque is not generated.

Further, in case of shifting gears from the 5th speed hybrid driving mode (see FIG. 43) to the 2nd speed hybrid driving mode (see FIG. 38) skipping the 4th speed and the 3rd speed, the drive modes may be shifted from the 5th speed hybrid driving mode (see FIG. 43) to the pre-5th speed hybrid driving mode (see FIG. 44), then to the 2nd speed hybrid driving mode (see FIG. 38). According to the foregoing construction, because the power transmitting path between the engine 2 and the differential mechanism 6 does not change when shifting from the 5th speed hybrid driving mode (see FIG. 43) to the pre-5th speed hybrid driving mode (see FIG. 44), a discontinuation of the torque is not generated, and because the power transmitting path between the motor generator 5 and the differential mechanism 6 does not change when shifting from the pre-5th speed hybrid driving mode (see FIG. 44) to the 2nd speed hybrid driving mode (see FIG. 38), a discontinuation of the torque is not generated.

Further, in case of shifting gears from the 5th speed hybrid driving mode (see FIG. 43) to the 1st speed hybrid driving mode (see FIG. 37) skipping the 4th speed, the 3rd speed, and the 2nd speed, the drive modes may be shifted from the 5th speed hybrid driving mode (see FIG. 43) to the pre-5th speed hybrid driving mode (see FIG. 44), then to the 1st speed hybrid driving mode (see FIG. 37). According to the foregoing construction, because the power transmitting path between the engine 2 and the differential mechanism 6 does not change when shifting from the 5th speed hybrid driving mode (see FIG. 43) to the pre-5th speed hybrid driving mode (see FIG. 44) a discontinuation of the torque is not generated, and because the power transmitting path between the motor generator 5 and the differential mechanism 6 does not change when shifting from the pre-5th speed hybrid driving mode (see FIG. 44) to the 1st speed hybrid driving mode(see FIG. 37), a discontinuation of the torque is not generated.

According to the construction of the ninth embodiment, the gear train for electric drive by the motor generator 5 (122, 123, 124, 126, 125, 128, 132, 144 in FIG. 31) and the gear train for engine drive (129, 130, 132, 133, 134, 145, 147 in FIG. 31) are configured to be disconnected by means of the main connecting-disconnecting mechanism 35. Meanwhile, according to a known construction of a hybrid drive system which includes a gear train for electric drive which is not for an exclusive use for an EV (electric vehicle) driving and is configured not to be disconnected from a gear train for engine drive, inertia of, for example, gears and frictional clutches of the gear train for engine drive is assumed to be increased during the EV driving, and thus energy efficiency declines. However, according to the construction of the embodiment, energy efficiency (e.g., reduction of the number of meshed gears and enhancement of the fuel efficiency by the reduction of the inertia weight) during the electric drive is enhanced while restraining an increase in a manufacturing cost and an increase in weight to the minimum.

According to the construction of the ninth embodiment, because the gear train for electric drive (122, 123, 124, 125, 126, 128, 142, 144, 146 in FIG. 31) transmitting a torque outputted from the motor generator 5 is included, by shifting gears from the 5th speed hybrid driving mode (gear stage) to the 3rd speed hybrid driving mode (gear stage) skipping the 4th speed via the pre-5th speed hybrid driving mode or the pre-3rd speed hybrid driving mode, the power transmitting path between the motor generator 5 and the differential mechanism 6 does not change from the pre-5th speed hybrid driving mode to the 3rd speed hybrid drive and the power transmitting path between the motor generator 5 and the differential mechanism 6 does not change from the 5th speed hybrid driving mode to the pre-3rd speed hybrid driving mode. Accordingly, a discontinuation of the torque can be prevented by an assistance of the motor generator 5.

According to the construction of the ninth embodiment, because the vehicle drive system includes the gear train for electric drive (122, 123, 124, 125, 126, 128, 142, 144, 146 in FIG. 31) transmitting a torque outputted from the motor generator 5 and shares the gear train for electric drive as a part of the gear train for engine drive at a lower speed stages (e.g., 1st speed stage, 2nd speed stage) for the hybrid driving mode, by shifting gears from the 5th speed hybrid driving mode to the 1st speed hybrid driving mode (gear stage) or to the 2nd speed hybrid driving mode (gear stage) skipping the 3rd speed and 4th speed stages via the pre-5th speed hybrid driving mode (gear stage), the power transmitting path between the motor generator 5 and the differential mechanism 6 does not change from the pre-5th speed hybrid driving mode to the 1st speed hybrid driving mode (gear stage) or to the 2nd speed hybrid driving mode (gear stage). Accordingly, a discontinuation of the torque can be prevented by an assistance of the motor generator.

Further, according to the construction of the ninth embodiment, with a simple three parallel shafts construction which includes the first and second idler gears 133, 134 for first gear train instead of a planetary gear in the transmission 4, an axial length is reduced and five speed stages can be achieved while restraining a manufacturing cost and an increase in weight to the minimum.

According to the ninth embodiment, because the gear train for electric drive (122, 123, 124, 126, 125, 128, 142, 144 in FIG. 31) is shared as a part of the gear train for engine drive by connecting the main connecting-disconnecting mechanism 35 during the 1st speed hybrid driving mode and the 2nd speed hybrid driving mode, an axial length is reduced and five speed stages can be achieved while restraining a manufacturing cost and an increase in weight to the minimum.

According to the ninth embodiment, because the gear train for electric drive (122, 123, 124, 126, 125, 128, 142, 144 in FIG. 31) by the motor generator 5 and the gear train for engine drive (129, 130, 132, 133, 134, 145, 147 in FIG. 31) (engine drive mode) are configured to be disconnected by means of the main connecting-disconnecting mechanism 35, an increase in a manufacturing cost and an increase in weight can be restrained to the minimum, an axial length is reduced, and five speed stages can be achieved while enhancing energy efficiency (e.g., reduction of the number of meshed gears and enhancement of the fuel efficiency by the reduction of the inertia weight) during the EV (electric vehicle) driving mode.

According to the construction of the ninth embodiment, because the torque of the motor generator 5 can be inputted to the gear train for electric drive (122, 123, 124, 126, 125, 128, 142, 144 in FIG. 31) via the input shaft 122 for second gear train, the input drive gear 123, and the input idler gear 124 and because of the application of the first connecting-disconnecting mechanism 146 for second gear train (alternatively, may be applied together with the main connecting-disconnecting mechanism 35), a multiple speed stages during the EV driving mode/HV driving mode can be achieved with a reduced space and lower manufacturing cost.

According to the construction of the ninth embodiment, because the regeneration and the assist by the motor generator 5 can be performed at all of the shift stages (1st to 5th speeds of hybrid driving mode) and the gear train for electric drive (122, 123, 124, 126, 125, 128, 142, 144 in FIG. 31) can be disconnected from the gear train for engine drive by the main connecting-disconnecting mechanism 35, the efficiency (fuel efficiency) is enhanced by disconnecting the gear train for electric drive from the gear train for engine drive when the assistance of the motor generator 5 is not necessary. Further, because the gear train for electric drive (122, 123, 124, 126, 125, 128, 142, 144 in FIG. 31) can be connected to the gear train for engine drive by the main connecting-disconnecting mechanism 35 when necessity arises, the power generation and the start of the engine can be achieved when the vehicle is in a stopped state.

Further, according to the construction of the ninth embodiment, the vehicle can travel in a reverse direction by the engine 2 when the main connecting-disconnecting mechanism 35 is connected (ON), the first connecting-disconnecting mechanism 136 for first gear train is connected (ON), and the reverse idler gear 31 is engaged (ON).

Further, according to the construction of the ninth embodiment, because the gear train for electric drive (122, 123, 124, 126, 125, 128, 142, 144 in FIG. 31) is assumed to be independent from the gear train for engine drive (129, 130, 132, 133, 134, 145 in FIG. 31) at the 5th speed hybrid driving mode, the motor generator 5 can be disconnected during the 5th speed by positioning the first connecting-disconnecting mechanism 146 for second gear train in a neutral state.

Further, according to the construction of the ninth embodiment, by applying the pre-shifting by the gear train for electric drive (122, 123, 124, 126, 125, 128, 142, 144 in FIG. 31) transmitting a torque outputted from the motor generator 5, a discontinuation of the torque during the gear shifting to the 1st speed, the 2nd speed, the 3rd speed, the 4th speed and to the 5th speed is avoidable by the assistance of the motor generator 5. Particularly, a driver tends to feel uncomfortable if the torque is discontinued during an upshift operation, however, according to the construction of the embodiment, a discontinuation of the torque during upshifting is avoidable.

Figure 45:
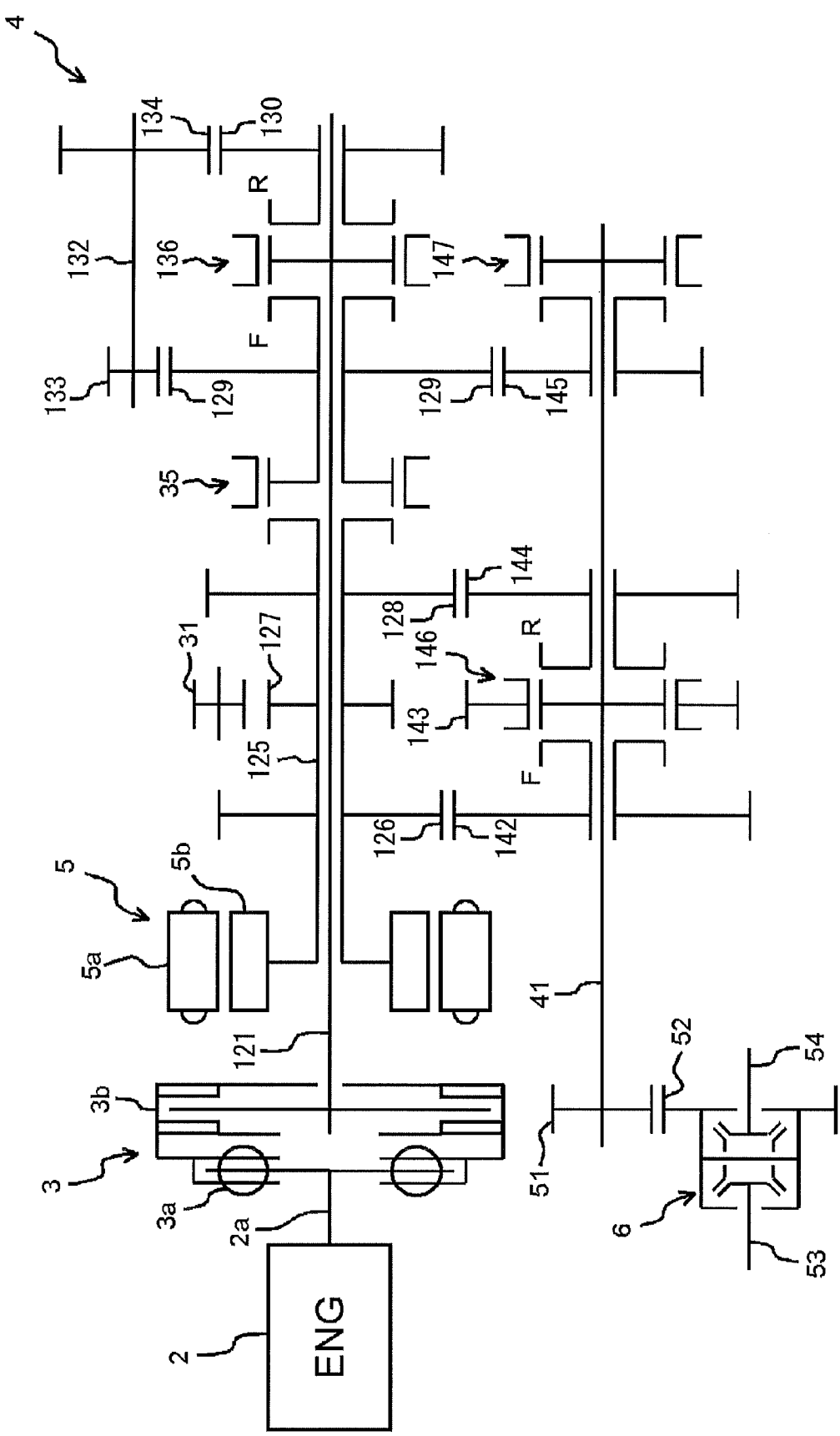
FIG. 45 is a schematic view of a configuration of a power transmitting path of the vehicle drive system according to a tenth embodiment disclosed here.

A vehicle drive system according to a tenth embodiment will be explained with reference to FIG. 45. The tenth embodiment is a modified example of the ninth embodiment. As shown in FIG. 45, instead of adopting the input shaft 122 for second gear train, the input drive gear 123, the input idler gear 124 (see FIG. 31; ninth embodiment) as a means for transmitting the torque of the motor generator 5 to the shaft 125 for second gear train, according to the construction of the tenth embodiment, a rotor 5b of the motor generator 5 is directly connected to the shaft 125 for second gear train. The motor generator 5 in which the rotor 5b rotates inside a stator 5a is positioned between the clutch 3 and the first drive gear 126. The stator 5a is fixed to the housing of the transmission 4. The rotor 5b integrally rotates with the shaft 125 for second gear train inside the stator 5a. Other constructions and operations of the vehicle drive system according to the tenth embodiment are similar to the ninth embodiment.

According to the construction of the tenth embodiment, similar advantages and effects to the ninth embodiment can be attained.

Figure 46:
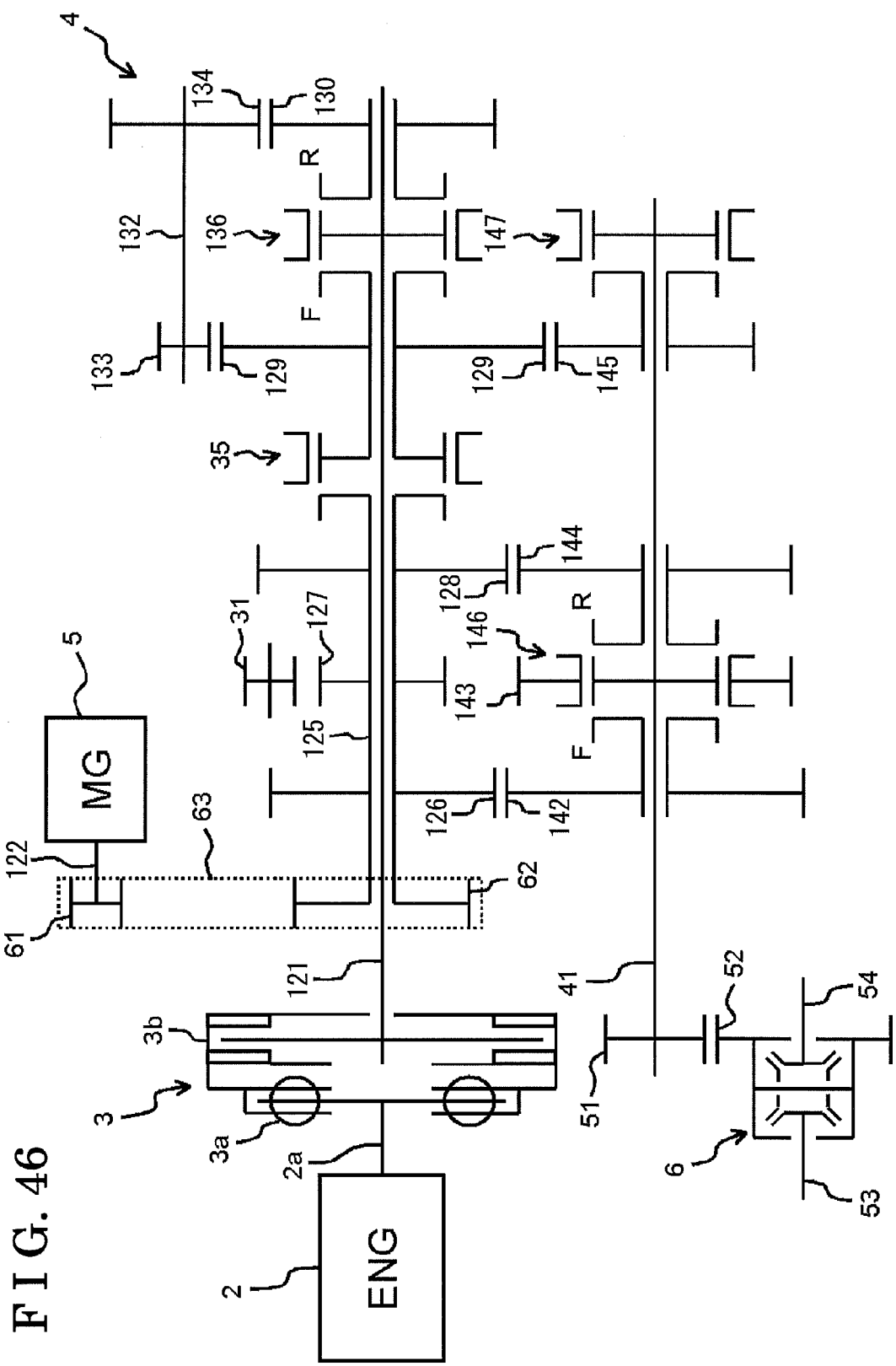
FIG. 46 is a schematic view of a configuration of a power transmitting path of the vehicle drive system according to an eleventh embodiment disclosed here.

A vehicle drive system according to an eleventh embodiment will be explained with reference to FIG. 46. The eleventh embodiment is a modified example of the ninth embodiment. As shown in FIG. 46, instead of adopting the input drive gear 123 and the input idler gear 124 (see FIG. 31; ninth embodiment) as a means for transmitting the torque of the motor generator 5 to the shaft 125 for second gear train, according to the construction of the eleventh embodiment, a drive sprocket 61 is provided (mounted) to the input shaft 122 for second gear train to which the torque of the motor generator 5 is inputted, a driven sprocket 62 is provided (mounted) to the shaft 125 for second gear train, and a chain 63 is engaged with and wound around the drive sprocket 61 and the driven sprocket 62. The drive sprocket 61 integrally rotates with the input shaft 122 for second gear train and is meshed with the chain 63. The driven sprocket 62 integrally rotates with the shaft 125 for second gear train and is meshed with the chain 63. Other constructions and operations of the vehicle drive system according to the eleventh embodiment are similar to the ninth embodiment.

According to the construction of the eleventh embodiment, advantages and effects similar to the ninth embodiment can be attained.

Figure 47:
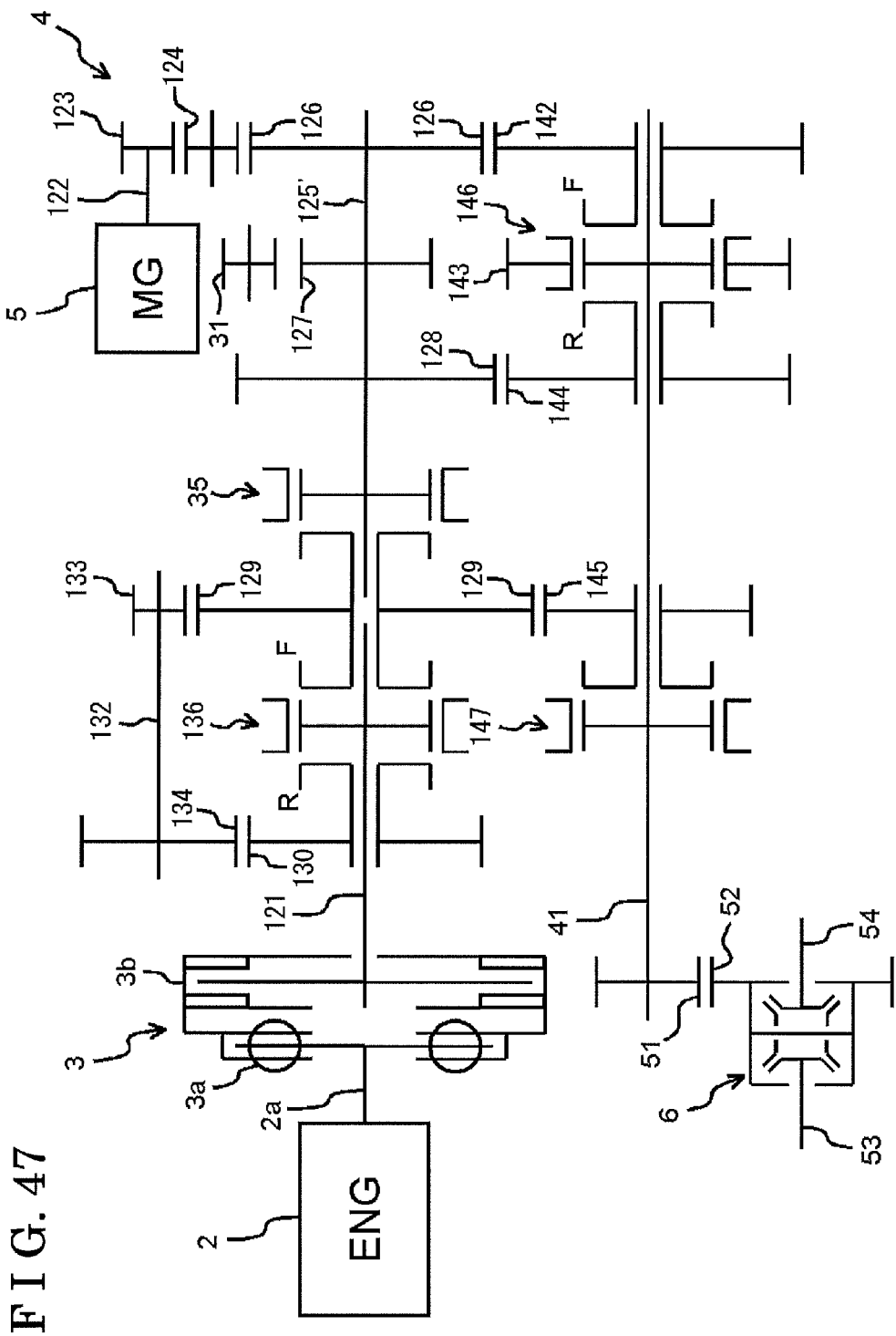
FIG. 47 is a schematic view of a configuration of a power transmitting path of the vehicle drive system according to a twelfth embodiment disclosed here.

A vehicle drive system according to a twelfth embodiment will be explained with reference to FIG. 47. The twelfth embodiment is a modified example of the ninth embodiment. In stead of arranging the first drive gear 126, the second drive gear 127, the third drive gear 128, the main connecting-disconnecting mechanism 35, the fourth drive gear 129, the first connecting-disconnecting mechanism 136 for first gear train, and the fifth drive gear 130 on the input shaft 121 for first gear train in the mentioned order from the side that the engine 2 is provided (see FIG. 31; ninth embodiment), according to the construction of the twelfth embodiment, the first drive gear 126, the second drive gear 127, the third drive gear 128, the main connecting-disconnecting mechanism 35, the fourth drive gear 129, the first connecting-disconnecting mechanism 136 for first gear train, and the fifth drive gear 130 are arranged on the input shaft 121 for first gear train in the mentioned order from the side opposite to the side where the engine 2 is provided. Further, according to the twelfth embodiment, instead of arranging the first driven gear 42, the first connecting-disconnecting mechanism 146 for second gear train (including the driven gear 143 for reverse), the second driven gear 144 for second gear train, the first driven gear 145 for first gear train, and the second connecting-disconnecting mechanism 147 for first gear train on the output shaft 41 in the mentioned order from the side that the engine 2 is provided, the first driven gear 42, the first connecting-disconnecting mechanism 146 for second gear train (including the driven gear 143 for reverse), the second driven gear 144 for second gear train, the first driven gear 145 for first gear train, and the second connecting-disconnecting mechanism 147 for first gear train are arranged on the output shaft 41 in the mentioned order from the side opposite to the side where the engine 2 is provided. Further, according to the twelfth embodiment, instead of arranging the first idler gear 133 for first gear train and the second idler gear 134 for first gear train on the shaft 132 for first gear train in the mentioned order from the side where the engine 2 is provided (see FIG. 31; ninth embodiment), the first idler gear 133 for first gear train and the second idler gear 134 for first gear train are arranged on the shaft 132 for first gear train in the mentioned order from the side opposite to the side where the engine 2 is provided. Further, instead of the shaft 125 for second gear train which is formed in a cylindrical shape having a hollow therein and provided on the outer periphery of the input shaft 121 for first gear train (see FIG. 31; ninth embodiment), according to the twelfth embodiment, the input shaft 121 for first gear train extends inside the fourth drive gear 129, a shaft 125' for second gear train is formed in a solid cylindrical shape, or a rod shape, and the shaft 125' for second gear train extends inside the fourth drive gear 129. Other constructions and operations of the twelfth embodiment are similar to the ninth embodiment.

According to the twelfth embodiment, advantages and effects similar to the ninth embodiment can be attained.

Figure 48:
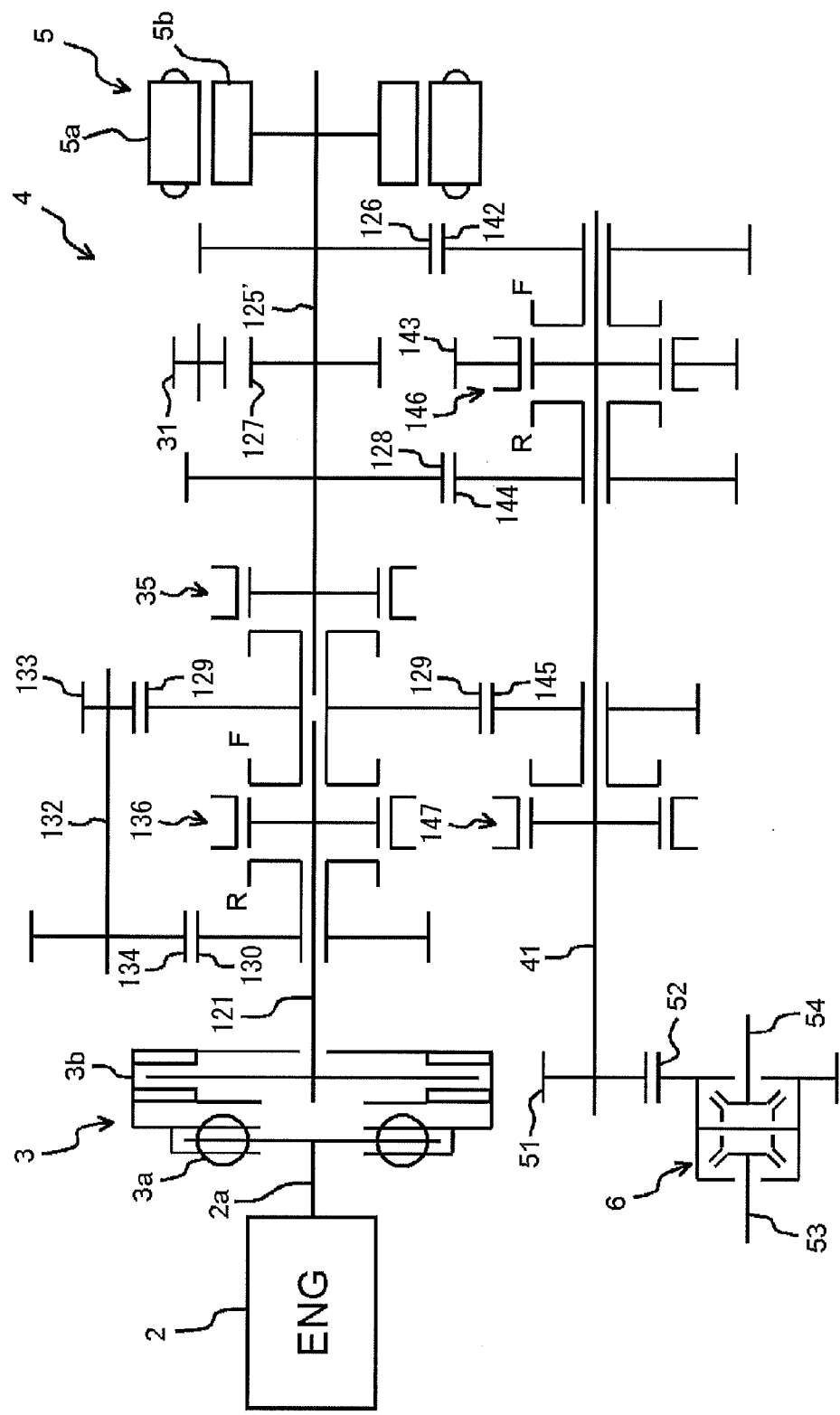
FIG. 48 is a schematic view of a configuration of a power transmitting path of the vehicle drive system according to a thirteenth embodiment disclosed here.

A vehicle drive system according to a thirteenth embodiment will be explained with reference to FIG. 48. The thirteenth embodiment is a modified example of the tenth embodiment. In stead of arranging the motor generator 5, the first drive gear 126, the second drive gear 127, the third drive gear 128, the main connecting-disconnecting mechanism 35, the fourth drive gear 129, the first connecting-disconnecting mechanism 136 for first gear train, and the fifth drive gear 130 on the input shaft 121 for first gear train in the mentioned order from the side that the engine 2 is provided (see FIG. 45; tenth embodiment), according to the construction of the thirteenth embodiment, the motor generator 5, the first drive gear 126, the second drive gear 127, the third drive gear 128, the main connecting-disconnecting mechanism 35, the fourth drive gear 129, the first connecting-disconnecting mechanism 136 for first gear train, and the fifth drive gear 130 are arranged on the input shaft 121 for first gear train in the mentioned order from the side opposite to the side where the engine 2 is provided. Further, according to the thirteenth embodiment, instead of arranging the first driven gear 142 for second gear train, the first connecting-disconnecting mechanism 146 for second gear train (including the driven gear 143 for reverse), the second driven gear 144 for second gear train, the first driven gear 145 for first gear train, and the second connecting-disconnecting mechanism 147 for first gear train on the output shaft 41 in the mentioned order from the side that the engine 2 is provided, the first driven gear 142 for second gear train, the first connecting-disconnecting mechanism 146 for second gear train (including the driven gear 143 for reverse), the second driven gear 144 for second gear train, the first driven gear 145 for first gear train, and the second connecting-disconnecting mechanism 147 for first gear train are arranged on the output shaft 41 in the mentioned order from the side opposite to the side where the engine 2 is provided. Further, according to the thirteenth embodiment, instead of arranging the first idler gear 133 for first gear train and the second idler gear 134 for first gear train on the shaft 132 for first gear train in the mentioned order from the side where the engine 2 is provided (see FIG. 45; tenth embodiment), the first idler gear 133 for first gear train and the second idler gear 134 for first gear train are arranged on the shaft 132 for first gear train in the mentioned order from the side opposite to the side where the engine 2 is provided. Further, instead of the shaft 125 for second gear train which is formed in a cylindrical shape being hollow therein and provided on the outer periphery of the input shaft 121 for first gear train (see FIG. 45; tenth embodiment), according to the thirteenth embodiment, the input shaft 121 for first gear train extends inside the fourth drive gear 129, the shaft 125' for second gear train is formed in a solid cylindrical shape, or a rod shape, and the shaft 125' for second gear train extends inside the fourth drive gear 129. Other constructions and operations of the thirteenth embodiment are similar to the tenth embodiment.

According to the thirteenth embodiment, advantages and effects similar to the tenth embodiment can be attained.

Figure 49:
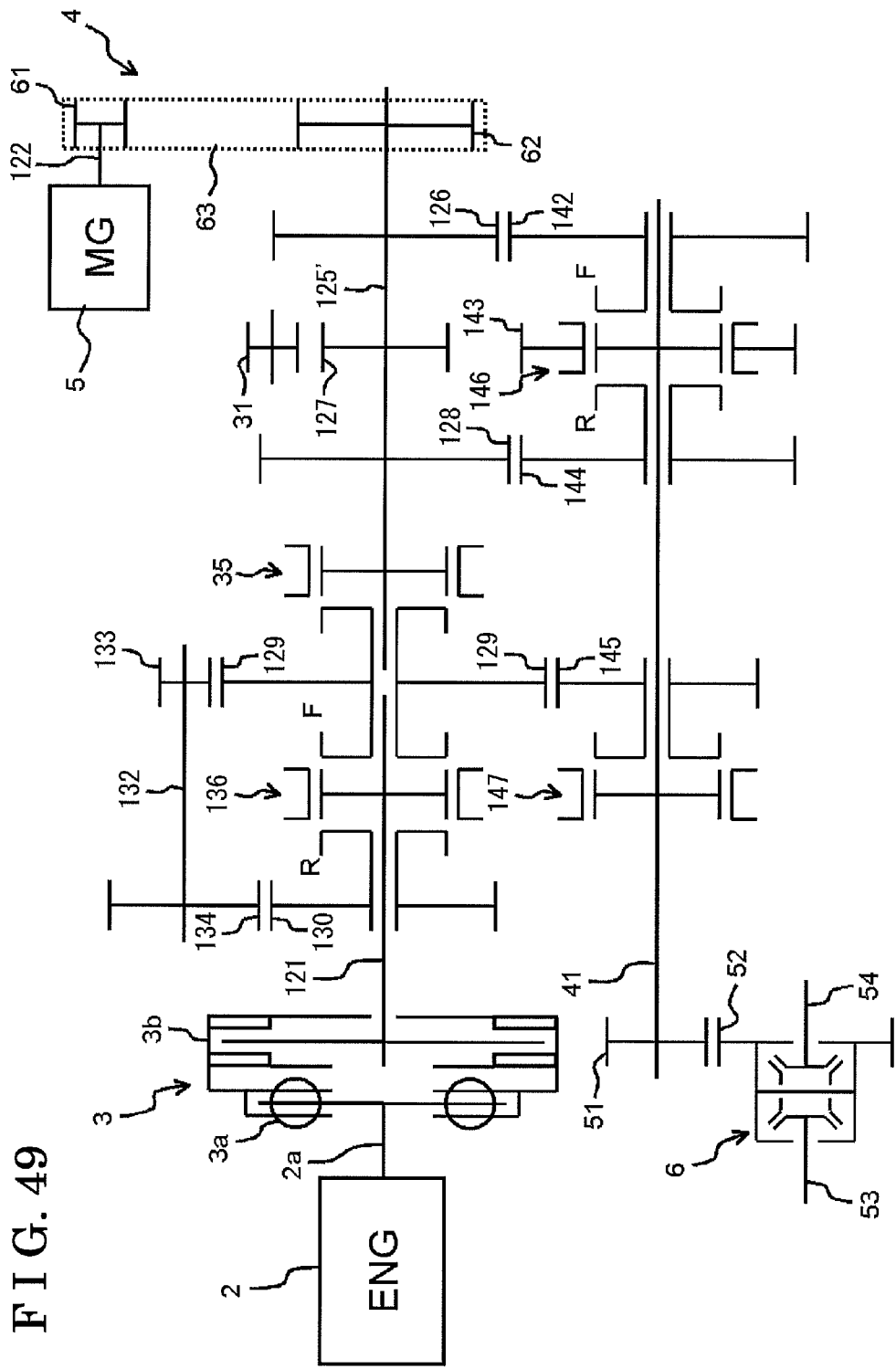
FIG. 49 is a schematic view of a configuration of a power transmitting path of the vehicle drive system according to a fourteenth embodiment disclosed here.

A vehicle drive system according to a fourteenth embodiment will be explained with reference to FIG. 49. The fourteenth embodiment is a modified example of the eleventh embodiment. Instead of arranging the driven sprocket 62, the first drive gear 126, the second drive gear 127, the third drive gear 128, the main connecting-disconnecting mechanism 35, the fourth drive gear 129, the first connecting-disconnecting mechanism 136 for first gear train, and the fifth drive gear 130 on the input shaft 121 for first gear train in the mentioned order from the side where the engine 2 is provided (see FIG. 46; eleventh embodiment), according to the fourteenth embodiment, the driven sprocket 62, the first drive gear 126, the second drive gear 127, the third drive gear 128, the main connecting-disconnecting mechanism 35, the fourth drive gear 129, the first connecting-disconnecting mechanism 136 for first gear train, and the fifth drive gear 130 are arranged on the input shaft 121 for first gear train in the mentioned order from the side opposite to the side where the engine 2 is provided. Further, instead of arranging the first driven gear 142 for second gear train, the first connecting-disconnecting mechanism 146 for second gear train (including the driven gear 143 for reverse), the second driven gear 144 for second gear train, the first driven gear 145 for first gear train and the second connecting-disconnecting mechanism 147 for first gear train on the output shaft 41 in the mentioned order from the side where the engine 2 is provided (see FIG. 46; eleventh embodiment), according to the fourteenth embodiment, the first driven gear 142 for second gear train, the first connecting-disconnecting mechanism 146 for second gear train (including the driven gear 143 for reverse), the second driven gear 144 for second gear train, the first driven gear 145 for first gear train and the second connecting-disconnecting mechanism 147 for first gear train are arranged on the output shaft 41 in the mentioned order from the side opposite to the side where the engine 2 is provided. Further, instead of arranging the first idler gear 133 for first gear train and the second idler gear 134 for first gear train on the shaft 132 for first gear train in the mentioned order from the side where the engine 2 is provided (see FIG. 46; eleventh embodiment), according to the fourteenth embodiment, the first idler gear 133 for first gear train and the second idler gear 134 for first gear train are arranged on the shaft 132 for first gear train in the mentioned order from the side opposite to the side where the engine 2 is provided. Further, instead of the shaft 125 for second gear train which is formed in a cylindrical shape being hollow therein and provided on the outer periphery of the input shaft 121 for first gear train (see FIG. 46; eleventh embodiment), according to the fourteenth embodiment, the input shaft 121 for first gear train extends inside the fourth drive gear 129, the shaft 125' for second gear train is formed in a solid cylindrical shape, or a rod shape, and the shaft 125' for second gear train extends inside the fourth drive gear 129. Other constructions and operations of the fourteenth embodiment are similar to the eleventh embodiment.

According to the fourteenth embodiment, advantages and effects similar to the eleventh embodiment can be attained.

According to the construction of the embodiment, the vehicle drive system includes the first gear train (gear train for engine drive 121, 129, 130, 132, 133, 134, 136, 145, 147) for transmitting a driving force outputted from the first drive source (engine 2) as a torque to the output shaft 41, the first gear train (gear train for engine drive 121, 129, 130, 132, 133, 134, 136, 145, 147) establishing multiple shift stages, the second gear train (gear train for electric drive 125, 125', 126, 128, 142, 144, 146) for transmitting a driving force outputted from the second drive source (motor generator 5) as a torque to the output shaft 41, the second gear train (gear train for electric drive 125, 125', 126, 128, 142, 144, 146) establishing multiple shift stages, and the main connecting-disconnecting mechanism 35 connecting and disconnecting the predetermined rotational element (fourth drive gear 129) provided at the first gear train (gear train for engine drive 121, 129, 130, 132, 133, 134, 136, 145, 147) and the predetermined rotational element (shaft 125, 125' for second gear train) provided at the second gear train (gear train for electric drive 125, 125', 126, 128, 142, 144, 146).

According to the disclosure, because the second gear train (gear train for electric drive 125, 125', 126, 128, 142, 144, 146) driven by the second drive source (motor generator 5) and the first gear train (gear train for engine drive 121, 129, 130, 132, 133, 134, 136, 145, 147) driven by the first drive source (engine 2) can be disconnected by means of the main connecting-disconnecting mechanism (main connecting-disconnecting mechanism 35), energy efficiency when a vehicle travels by the second drive source (e.g., fuel efficiency by the reduction of the number of meshed gears and the reduction of the inertial weight) can be enhanced while restraining an increase in manufacturing cost and an increase in weight to the minimum.

According to the construction of the embodiment, the vehicle drive system is configured to transmit the torque from the first drive source (engine 2) to the output shaft 41 via the first gear train (gear train for engine drive 121, 129, 130, 132, 133, 134, 136, 145, 147), the main connecting-disconnecting mechanism 35, and the second gear train (gear train for electric drive 125, 125', 126, 128, 142, 144, 146), and to transmit the torque from the second drive source (motor generator 5) to the output shaft 41 via the second gear train (gear train for electric drive 125, 125', 126, 128, 142, 144, 146) when the predetermined rotational element (fourth drive gear 129) at the first gear train (gear train for engine drive 121, 129, 130, 132, 133, 134, 136, 145, 147) and the predetermined rotational element (shaft 125, 125' for second gear train) at the second gear train (gear train for electric drive 125, 125', 126, 128, 142, 144, 146) are connected by the main connecting-disconnecting mechanism 35. Further, the vehicle drive system is configured to transmit the torque from the first drive source (engine 2) to the output shaft 41 via the first gear train (gear train for engine drive 121, 129, 130, 132, 133, 134, 136, 145, 147), and to transmit the torque from the second drive source (motor generator 5) to the output shaft 41 via the second gear train (gear train for electric drive 125, 125', 126, 128, 142, 144, 146) when the predetermined rotational element (fourth drive gear 129) at the first gear train (gear train for engine drive 121, 129, 130, 132, 133, 134, 136, 145, 147) and the predetermined rotational element (shaft 125, 125' for second gear train) at the second gear train (gear train for electric drive 125, 125', 126, 128, 142, 144, 146) are disconnected by the main connecting-disconnecting mechanism 35.

According to the construction of the embodiment, the first gear train (gear train for engine drive 121, 129, 130, 132, 133, 134, 136, 145, 147) includes the input shaft 121 for first gear train to which the torque from the first drive source (engine 2) is inputted, the first drive gear for first gear train (fourth drive gear 129) idly provided to be rotatable relative to the input shaft 121 for first gear train, the second drive gear (fifth drive gear 130) for first gear train idly provided to be rotatable relative to the input shaft 121 for first gear train and having a diameter different from a diameter of the first drive gear for first gear train (fourth drive gear 129), the first connecting-disconnecting mechanism 136 for first gear train selecting one of the first drive gear for first gear train (fourth drive gear 129) and the second drive gear (fifth drive gear 130) for first gear train for connecting and disconnecting the selected drive gear relative to the input shaft 121 for first gear train, the first idler gear 133 for first gear train meshed with the first drive gear for first gear train (fourth drive gear 129), the second idler gear 134 for first gear train meshed with the second drive gear (fifth drive gear 130) for first gear train and integrally rotating with the first idler gear 133 for first gear train, the first driven gear 145 for first gear train idly provided to be rotatable relative to the output shaft 41 and meshed with the first drive gear for first gear train (fourth drive gear 129), and the second connecting-disconnecting mechanism 147 for first gear train connecting and disconnecting the first driven gear 145 for first gear train relative to the output shaft 41. The predetermined rotational element provided at the first gear train (gear train for engine drive 121, 129, 130, 132, 133, 134, 136, 145, 147) is the first drive gear for first gear train (fourth drive gear 129).

According to the embodiment, the second gear train (gear train for electric drive 125, 125', 126, 128, 142, 144, 146) includes the shaft 125, 125' for second gear train to which the torque from the second drive source (motor generator 5) is inputted, the first drive gear for second gear train (first drive gear 126) integrally rotating with the shaft 125, 125' for second gear train, a second drive gear for second gear train (third drive gear 128) integrally rotating with the shaft 125, 125' for second gear train and having a diameter different from a diameter of the first drive gear for second gear train (first drive gear 126), the first driven gear 142 for second gear train idly provided to be rotatable relative to the output shaft 41 and meshed with the first drive gear for second gear train (first drive gear 126), the second driven gear 144 for second gear train idly provided to be rotatable relative to the output shaft 41 and meshed with the second drive gear for second gear train (third drive gear 128), and the first connecting-disconnecting mechanism 146 for second gear train selecting one of the first driven gear 142 for second gear train and the second driven gear 144 for second gear train for connecting and disconnecting the selected driven gear relative to the output shaft 41. The predetermined rotational element provided at the second gear train (gear train for electric drive 125, 125', 126, 128, 142, 144, 146) is the shaft 125, 125' for second gear train.

According to the embodiment, the shaft 125, 125' for second gear train is idly provided to be rotatable relative to the input shaft 121 for first gear train.

According to the embodiment, the vehicle drive system includes the input drive gear 123 to which the torque from the second drive source (motor generator 5) is transmitted, and the input idler gear 124 meshed with the input drive gear 123 and the first drive gear for second gear train (first drive gear 126).

According to the embodiment, the torque from the second drive source (motor generator 5) is directly inputted to the shaft 125, 125' for second gear train.

According to the embodiment, the vehicle drive system includes the drive sprocket 61 to which the torque from the second drive source (motor generator 5) is transmitted, the driven sprocket 62 integrally rotating with the shaft 125, 125' for second gear train, and the chain 63 engaged with and wound around the drive sprocket 61 and the driven sprocket 62.

According to the embodiment, the first drive gear for second gear train (first drive gear 126), the second drive gear for second gear train (third drive gear 128), the main connecting-disconnecting mechanism 35, the first drive gear for first gear train (fourth drive gear 129), the first connecting-disconnecting mechanism 136 for first gear train, and the second drive gear (fifth drive gear 130) for first gear train are arranged on the input shaft 121 for first gear train in the mentioned order from a side where the first drive source (engine 2) is provided. The first driven gear 142 for second gear train, the first connecting-disconnecting mechanism 146 for second gear train, the second driven gear 144 for second gear train, the first driven gear 145 for first gear train, and the second connecting-disconnecting mechanism 147 for first gear train are arranged on the output shaft 41 in the mentioned order from the side where the first drive source (engine 2) is provided.

According to the embodiment, the first drive gear for second gear train (first drive gear 126), the second drive gear for second gear train (third drive gear 128), the main connecting-disconnecting mechanism 35, the first drive gear for first gear train (fourth drive gear 129), the first connecting-disconnecting mechanism 136 for first gear train, and the second drive gear (fifth drive gear 130) for first gear train are arranged on the input shaft 121 for first gear train in the mentioned order from a side opposite to the side where the first drive source (engine 2) is provided. The first driven gear 142 for second gear train, the first connecting-disconnecting mechanism 146 for second gear train, the second driven gear 144 for second gear train, the first driven gear 145 for first gear train, and the second connecting-disconnecting mechanism 147 for first gear train are arranged on the output shaft 41 in the mentioned order from the side opposite to the side where the first drive source (engine 2) is provided.

According to the embodiment, the second gear train (gear train for electric drive 125, 125', 126, 128, 142, 144, 146) includes the third drive gear for second gear train (second drive gear 127) provided between the first drive gear for second gear train (first drive gear 126) and the second drive gear for second gear train (third drive gear 128) and integrally rotating with the shaft 125, 125' for second gear train, the driven gear 143 for reverse integrally rotating with the output shaft 41 via the first connecting-disconnecting mechanism 146 for second gear train, and the reverse idler gear 31 movable in an axial direction and selectively engaging with and disengaging from the third drive gear for second gear train (second drive gear 127) and the driven gear 143 for reverse.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle drive system, comprising:
   a first gear train for transmitting a driving force outputted from a first drive source as a torque to an output shaft, the first gear train establishing a plurality of shift stages;
   a second gear train for transmitting a driving force outputted from a second drive source as a torque to the output shaft, the second gear train establishing a plurality of shift stages; and
   a main connecting-disconnecting mechanism connecting and disconnecting a predetermined rotational element provided at the first gear train and a predetermined rotational element provided at the second gear train;
   wherein the vehicle drive system is configured to transmit the torque from the first drive source to the output shaft via the first gear train, the main connecting-disconnecting mechanism, and the second gear train, and to transmit the torque from the second drive source to the output shaft via the second gear train when the predetermined rotational element at the first gear train and the predetermined rotational element at the second gear train are connected by the main connecting-disconnecting mechanism;
   wherein the vehicle drive system is configured to transmit the torque from the first drive source to the output shaft via the first gear train, and to transmit the torque from the second drive source to the output shaft via the second gear train when the predetermined rotational element at the first gear train and the predetermined rotational element at the second gear train are disconnected by the main connecting-disconnecting mechanism;
   wherein the first gear train includes an input shaft for first gear train to which the torque from the first drive source is inputted, a first drive gear for first gear train idly provided to be rotatable relative to the input shaft for first gear train, a second drive gear for first gear train idly provided to be rotatable relative to the input shaft for first gear train and having a diameter different from a diameter of the first drive gear for first gear train, a first connecting-disconnecting mechanism for first gear train selecting one of the first drive gear for first gear train and the second drive gear for first gear train for connecting and disconnecting the selected drive gear relative to the input shaft for first gear train, a first idler gear for first gear train meshed with the first drive gear for first gear train, a second idler gear for first gear train meshed with the second drive gear for first gear train and integrally rotating with the first idler gear for first gear train, a first driven gear for first gear train idly provided to be rotatable relative to the output shaft and meshed with the first drive gear for first gear train, and a second connecting-disconnecting mechanism for first gear train connecting and disconnecting the first driven gear for first gear train relative to the output shaft; and
   wherein the predetermined rotational element provided at the first gear train is the first drive gear for first gear train.

2. The vehicle drive system according to claim 1, wherein the second gear train includes a shaft for second gear train to which the torque from the second drive source is inputted, a first drive gear for second gear train integrally rotating with the shaft for second gear train, a second drive gear for second gear train integrally rotating with the shaft for second gear train and having a diameter different from a diameter of the first drive gear for second gear train, a first driven gear for second gear train idly provided to be rotatable relative to the output shaft and meshed with the first drive gear for second gear train, a second driven gear for second gear train idly provided to be rotatable relative to the output shaft and meshed with the second drive gear for second gear train, and a first connecting-disconnecting mechanism for second gear train selecting one of the first driven gear for second gear train and the second driven gear for second gear train for connecting and disconnecting the selected driven gear relative to the output shaft; and wherein
   the predetermined rotational element provided at the second gear train is the shaft for second gear train.

3. The vehicle drive system according to claim 2, wherein the shaft for second gear train is idly provided to be rotatable relative to the input shaft for first gear train.

4. The vehicle drive system according to claim 2, further comprising:
   an input drive gear to which the torque from the second drive source is transmitted; and
   an input idler gear meshed with the input drive gear and the first drive gear for second gear train.

5. The vehicle drive system according to claim 2, wherein the torque from the second drive source is directly inputted to the shaft for second gear train.

6. The vehicle drive system according to claim 2, further comprising:

a drive sprocket to which the torque from the second drive source is transmitted;

a driven sprocket integrally rotating with the shaft for second gear train; and a chain engaged with and wound around the drive sprocket and the driven sprocket.

7. The vehicle drive system according to claim 2, wherein the first drive gear for second gear train, the second drive gear for second gear train, the main connecting-disconnecting mechanism, the first drive gear for first gear train, the first connecting-disconnecting mechanism for first gear train, and the second drive gear for first gear train are arranged on the input shaft for first gear train in the mentioned order from a side where the first drive source is provided; and wherein the first driven gear for second gear train, the first connecting-disconnecting mechanism for second gear train, the second driven gear for second gear train, the first driven gear for first gear train, and the second connecting-disconnecting mechanism for first gear train are arranged on the output shaft in the mentioned order from the side where the first drive source is provided.

8. The vehicle drive system according to claim 2, wherein the first drive gear for second gear train, the second drive gear for second gear train, the main connecting-disconnecting mechanism, the first drive gear for first gear train, the first connecting-disconnecting mechanism for first gear train, and the second drive gear for first gear train are arranged on the input shaft for first gear train in the mentioned order from a side opposite to the side where the first drive source is provided; and wherein the first driven gear for second gear train, the first connecting-disconnecting mechanism for second gear train, the second driven gear for second gear train, the first driven gear for first gear train, and the second connecting-disconnecting mechanism for first gear train are arranged on the output shaft in the mentioned order from the side opposite to the side where the first drive source is provided.

* * * * *